(12) United States Patent
Kitagawa et al.

(10) Patent No.: US 11,661,352 B2
(45) Date of Patent: May 30, 2023

(54) WATER TREATMENT APPARATUS MANAGEMENT SYSTEM AND HOUSEHOLD WATER TREATMENT APPARATUS

(71) Applicant: WOTA Corp., Tokyo (JP)

(72) Inventors: Riki Kitagawa, Tokyo (JP); Shohei Okudera, Tokyo (JP)

(73) Assignee: WOTA Corp., Tokyo (JP)

( * ) Notice: Subject to any disclaimer, the term of this patent is extended or adjusted under 35 U.S.C. 154(b) by 459 days.

(21) Appl. No.: 16/127,018

(22) Filed: Sep. 10, 2018

(65) Prior Publication Data

US 2019/0031530 A1    Jan. 31, 2019

Related U.S. Application Data

(63) Continuation of application No. PCT/JP2017/010015, filed on Mar. 13, 2017.

(30) Foreign Application Priority Data

Mar. 11, 2016    (JP) .............................. JP2016-049041

(51) Int. Cl.
*C02F 1/00* (2023.01)
*C02F 1/44* (2023.01)
(Continued)

(52) U.S. Cl.
CPC .............. *C02F 1/008* (2013.01); *C02F 1/003* (2013.01); *C02F 1/28* (2013.01); *C02F 1/283* (2013.01);
(Continued)

(58) Field of Classification Search
CPC .. C02F 1/008; C02F 1/003; C02F 1/28; C02F 1/283; C02F 1/441; C02F 1/00;
(Continued)

(56) References Cited

U.S. PATENT DOCUMENTS

| 2009/0078621 A1 | 3/2009 | Nicolai et al. |
| 2012/0000858 A1 | 1/2012 | Butler et al. |

(Continued)

FOREIGN PATENT DOCUMENTS

| CN | 204039078 U | 12/2014 |
| CN | 104922965 A * | 9/2015 ............. B01D 35/00 |

(Continued)

OTHER PUBLICATIONS

JP 2003 164851 English translation, Matsuo Naoto, Jun. 2003.*

(Continued)

*Primary Examiner* — Akash K Varma
(74) *Attorney, Agent, or Firm* — JCIP; Joseph G. Chu; Jeremy I. Maynard

(57) ABSTRACT

A water treatment apparatus management system which manages a household water treatment apparatus located at or near a place of water use, and treats water before treatment with at least one type of filter to produce treated water for the place of water use. The system includes: a filter information storage unit storing information regarding an in-service filter used in the household water treatment apparatus; an information receiver receiving information regarding performance change of the in-service filter from the household water treatment apparatus; and a water type estimation means that estimates a water type of the water before treatment based on the information regarding performance change and the information regarding the in-service filter. The information regarding the in-service filter includes reference information of performance change of the same or the same type of filter as the in-service filter for each of plural types of reference water before treatment.

12 Claims, 10 Drawing Sheets

(51) Int. Cl.
  *C02F 1/28* (2023.01)
  *E03F 9/00* (2006.01)
  *C02F 101/30* (2006.01)
  *C02F 103/00* (2006.01)
  *C02F 103/08* (2006.01)
(52) U.S. Cl.
  CPC ............... *C02F 1/441* (2013.01); *E03F 9/00* (2013.01); *C02F 2101/306* (2013.01); *C02F 2103/001* (2013.01); *C02F 2103/007* (2013.01); *C02F 2103/08* (2013.01); *C02F 2201/005* (2013.01); *C02F 2209/445* (2013.01); *C02F 2307/06* (2013.01); *C02F 2307/12* (2013.01)
(58) Field of Classification Search
  CPC .................. C02F 1/44; C02F 2101/306; C02F 2103/001; C02F 2103/007; C02F 2103/08; C02F 2201/005; C02F 2209/445; C02F 2209/00; C02F 2209/005; C02F 2209/006; C02F 2307/06; C02F 2307/12; E03F 9/00; B01D 61/02
  USPC ........................................................ 210/85
  See application file for complete search history.

(56) References Cited

U.S. PATENT DOCUMENTS

| | | | | |
|---|---|---|---|---|
| 2015/0251922 | A1* | 9/2015 | Schuster | ............ B01D 35/1573 210/739 |
| 2016/0340207 | A1 | 11/2016 | Schuster | |

FOREIGN PATENT DOCUMENTS

| | | | | | |
|---|---|---|---|---|---|
| JP | S61042457 | U | | 3/1986 | |
| JP | H07024492 | U | | 5/1995 | |
| JP | H10000459 | A | | 1/1998 | |
| JP | H10118637 | A | | 5/1998 | |
| JP | H10160701 | A | | 6/1998 | |
| JP | H10296235 | A | | 11/1998 | |
| JP | 2002011468 | A | | 1/2002 | |
| JP | 2002205070 | A | | 7/2002 | |
| JP | 2003103250 | A | | 4/2003 | |
| JP | 2003 164851 | | * | 6/2003 | ............... C02F 1/00 |
| JP | 2003164851 | A | | 6/2003 | |
| JP | 2004177122 | A | | 6/2004 | |
| JP | 2006177060 | A | | 7/2006 | |
| JP | 2009518176 | A | | 5/2009 | |
| JP | 2009262134 | A | | 11/2009 | |
| JP | 201386034 | A | | 5/2013 | |
| JP | 2014004550 | A | | 1/2014 | |
| JP | 2015188767 | A | | 11/2015 | |
| KR | 20050017974 | A | * | 2/2005 | ........... B01D 35/143 |
| WO | 2007049495 | A1 | | 5/2007 | |
| WO | 2011077815 | A1 | | 6/2011 | |
| WO | 2015134887 | A1 | | 9/2015 | |
| WO | 2016011975 | A1 | | 1/2016 | |

OTHER PUBLICATIONS

CN 104922965A English description translation, Sep. 2015, Chen et al.*
KR 20050017974A English description translation, Feb. 2005, Park Jin Woo.*
Written Opinion of ISA and International Search Report of PCT/JP2017/010015.
Extended European Search Report for European Patent Application No. 17763456.5.
Notice of Reasons for Refusal dated Jan. 23, 2023 for Japanese Application No. 2021-180252.

* cited by examiner

WATER TREATMENT APPARATUS MANAGEMENT SYSTEM AND HOUSEHOLD WATER TREATMENT APPARATUS

CROSS-REFERENCE TO RELATED APPLICATIONS

This application is based on and claims priority to Japanese Patent Application No. 2016-049041 filed on Mar. 11, 2016 and International Application No. PCT/JP2017/010015 filed on Mar. 13, 2017, the entire contents of which are incorporated herein by reference.

TECHNICAL FIELD

The present invention relates to a management system for a household water treatment apparatus that treats water before treatment with at least one type of filter and feeds treated water to a place of water use. This invention also relates to the household water treatment apparatus and a water treatment system.

BACKGROUND ART

Water supply and sewerage systems in Japan seem to have been appropriately established. Most current water supply and sewerage systems in countries such as Japan are huge, and the systems are based on pipe networks established under plans spanning decades (refer to, for example, PTL 1).

CITATION LIST

Patent Literature

{PTL 1}
Japanese Unexamined Patent Application, Publication No. 2006-177060

SUMMARY OF INVENTION

A first aspect of the present invention is a water treatment apparatus management system which manages a household water treatment apparatus that is located at or near a place of water use and that treats water before treatment with at least one type of filter to produce treated water to be fed to the place of water use, the system comprising: an information receiver that receives, from the household water treatment apparatus, information regarding performance change of an in-service filter being actually used in the household water treatment apparatus; a memory device that stores reference information of performance change, the information indicating how performance of a same or a same type of filter as the in-service filter changes by each of multiple types of water before treatment; and a control unit that estimates a water type of the water before treatment, not only based on the information regarding performance change received from the household water treatment apparatus but based on the information regarding performance change received from the household water treatment apparatus and also the reference information of performance change stored in the memory device, wherein the multiple types of water before treatment include at least one of water used at the place of water use and water taken from natural water such as river water, swamp water, lake water, seawater, and rainwater, wherein the place of water use includes at least one of: a place with a body washer whose examples include a shower room, a bathroom, a place to wash hands, a place to wash feet, and a place for washing animals; a place with a clothing washer whose examples include a washing machine and a washing appliance; a place with a excrement disposer whose examples include a toilet; and a place with a tool or machine to wash foods and dishes whose examples include a kitchen, and wherein the control unit determines which of the reference information of performance change of the same or the same type of filter as the in-service filter for the multiple types of water before treatment is close to the information regarding performance change received from the household water treatment apparatus and estimates the water type based on that determination, wherein the water treatment apparatus management system receives, from the household water treatment apparatus or a computer used by a user, user input information including at least one of water usage in the place of water use, quality of the water before treatment, and source of the water before treatment, and the control unit estimates the water type also based on this user input information.

A second aspect of the present invention is a water treatment apparatus management system which manages a household water treatment apparatus that is located at or near a place of water use and that treats water before treatment with at least one type of filter to produce treated water to be fed to the place of water use, the system comprising: an information receiver that receives, from the household water treatment apparatus, information regarding performance change of an in-service filter being actually used in the household water treatment apparatus; a memory device that stores in-service filter information including at least one of: in-service filter type identification information identifying at least one of type, specification, product number, and name of the filter in service; and in-service filter function identification information indicating at least one of function and performance of the filter in service for multiple types of water before treatment; and a control unit that estimates a water type of the water before treatment, not only based on the information regarding performance change received from the household water treatment apparatus but on the information regarding performance change received from the household water treatment apparatus and also the in-service filter information stored in the memory device, wherein the in-service filter type identification information is information stored in the memory device and which at least one of type, specification, product number, and name of the filter in service is associated with at least one of information of various performance changes of the in-service filter caused by various types of water before treatment, and simulated information of the performance changes, wherein the multiple types of water before treatment include at least one of water used at the place of water use and water taken from natural water such as river water, swamp water, lake water, seawater, and rainwater, and wherein the place of water use includes at least one of: a place with a body washer whose example include a shower room, a bathroom, a place to wash hands, a place to wash feet, and a place for washing animals; a place with a clothing washer whose examples include a washing machine and a washing appliance; a place with a excrement disposer whose examples include a toilet; and a place with a tool or machine to wash foods and dishes whose examples include a kitchen, wherein the water treatment apparatus management system receives, from the household water treatment apparatus or a computer used by a user, user input information including at least one of water usage in the place of water use, quality of the water before treatment, and source of the water before treatment, and the control unit estimates the water type also based on this user input information.

A third aspect of the present invention is a water treatment apparatus management system which manages a household water treatment apparatus that is located at or near a place of water use and that treats water before treatment with a filter unit to produce treated water to be fed to the place of water use, the system comprising: an information receiver that receives, from the household water treatment apparatus, information regarding performance change of an in-service filter unit being actually used in the household water treatment apparatus; a memory device that stores reference information of performance change, the information indicating how performance of a same or a same type of filter unit as the in-service filter unit changes by each of multiple types of water before treatment; and a control unit that estimates a water type of the water before treatment, not only based on the information regarding performance change received from the household water treatment apparatus but on the information regarding performance change received from the household water treatment apparatus and also the reference information of performance change stored in the memory device, wherein the multiple types of water before treatment include at least one of water used at the place of water use and water taken from natural water such as river water, swamp water, lake water, seawater, and rainwater, wherein the place of water use includes at least one of: a place with a body washer whose examples include a shower room, a bathroom, a place to wash hands, a place to wash feet, and a place for washing animals; a place with a clothing washer whose examples include a washing machine and a washing appliance; a place with a excrement disposer whose examples include a toilet; and a place with a tool or machine to wash foods and dishes whose examples include a kitchen, and wherein the control unit determines which of the reference information of performance change of the same or the same type of filter unit as the in-service filter unit for each of the multiple types of water before treatment is close to the information regarding performance change received from the household water treatment apparatus and estimates the water type based on that determination, wherein the water treatment apparatus management system receives, from the household water treatment apparatus or a computer used by a user, user input information including at least one of water usage in the place of water use, quality of the water before treatment, and source of the water before treatment, and the control unit estimates the water type also based on this user input information.

A fourth aspect of the present invention is a water treatment apparatus management system which manages a household water treatment apparatus that is located at or near a place of water use and that treats water before treatment with a filter unit to produce treated water to be fed to the place of water use, the system comprising: an information receiver that receives, from the household water treatment apparatus, information regarding performance change of an in-service filter unit being actually used in the household water treatment apparatus; a memory device that stores in-service filter unit information including at least one of: in-service filter unit type identification information identifying at least one of type, specification, product number, and name of the filter unit in-service; and in-service filter unit function identification information indicating at least one of function and performance of the filter unit in service for multiple types of water before treatment; and a control unit that estimates a water type of the water before treatment, not only based on the information regarding performance change received from the household water treatment apparatus but on the information regarding performance change received from the household water treatment apparatus and the in-service filter unit information stored in the memory device, wherein the in-service filter type identification information is information in which at least one of type, specification, product number, and name of the filter unit in service is associated with at least one of information of various performance changes of the in-service filter unit caused by various types of water before treatment, and simulated information of the performance changes, wherein the multiple types of water before treatment include at least one of water used at the place of water use and water taken from natural water such as river water, swamp water, lake water, seawater, and rainwater, and wherein the place of water use includes at least one of: a place with a body washer whose example include a shower room, a bathroom, a place to wash hands, a place to wash feet, and a place for washing animals; a place with a clothing washer whose examples include a washing machine and a washing appliance; a place with a excrement disposer whose examples include a toilet; and a place with a tool or machine to wash foods and dishes whose examples include a kitchen, wherein the water treatment apparatus management system receives, from the household water treatment apparatus or a computer used by a user, user input information including at least one of water usage in the place of water use, quality of the water before treatment, and source of the water before treatment, and the control unit estimates the water type also based on this user input information.

DESCRIPTION OF EMBODIMENTS

A household water treatment apparatus according to a first embodiment of the present invention and a water treatment apparatus management system for managing the same will now be described with reference to the drawings.

Figure 2:
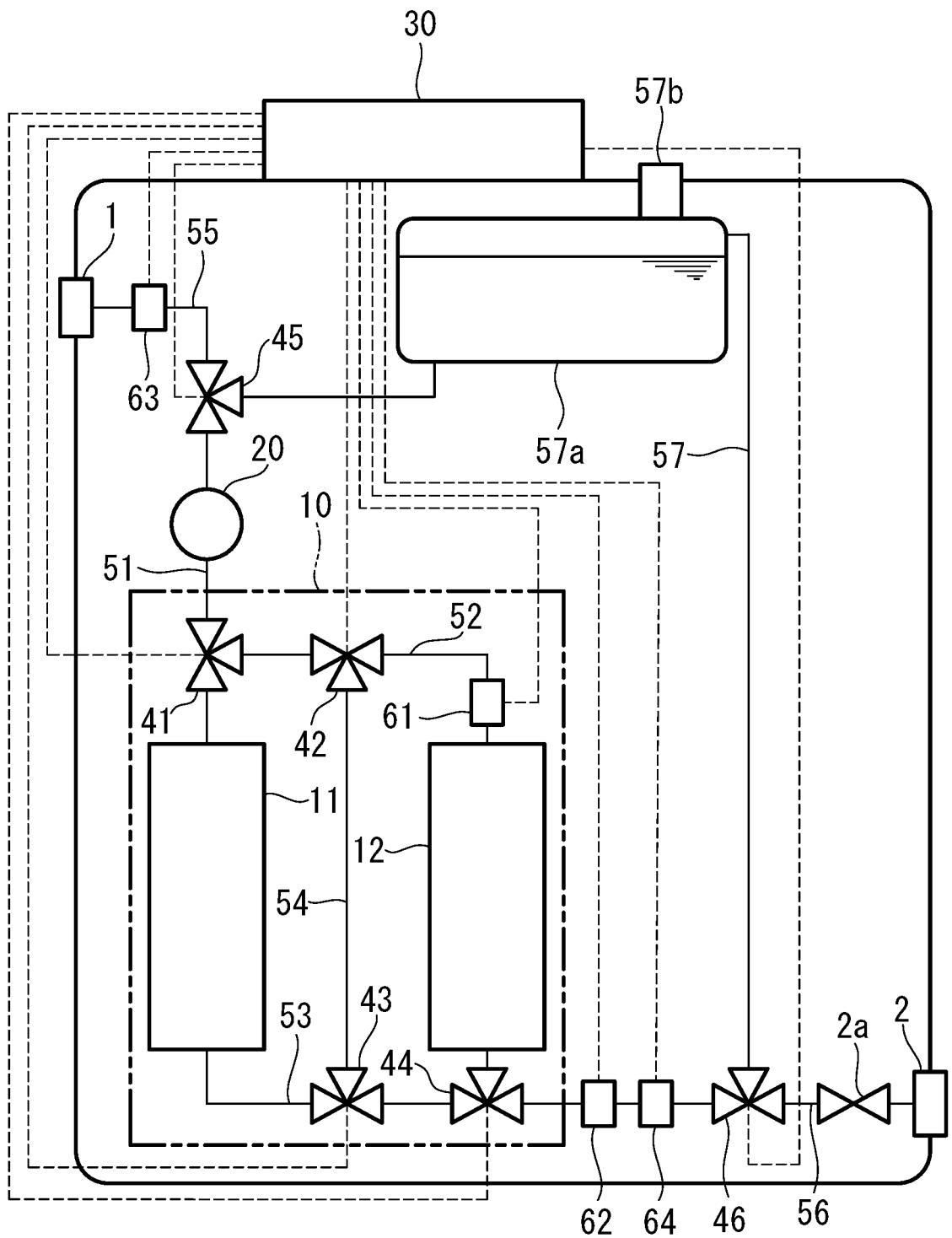
FIG. 2 is a schematic diagram of a household water treatment apparatus according to the first embodiment.

As shown in FIG. 2, the household water treatment apparatus includes, for example, a water before treatment inlet 1, a filter unit 10 through which water before treatment after coming from the water before treatment inlet 1 passes, a pump 20 that is located upstream or downstream from the filter unit 10 and brings the water before treatment into the filter unit 10, and a treated water outlet 2 through which treated water which is treated by passing through the filter unit 10 goes out. The filter unit 10 includes at least a first filter 11, a second filter 12 of a type different from the type of the first filter, and a valve unit that can switch between a first flow state in which the water before treatment flows merely through the first filter 11 and a second flow state in which the water before treatment flows in the filter unit 10 along a path different from the path of the first flow state. The household water treatment apparatus further includes a control unit 30 that controls the pump 20 and the filter unit 10.

The control unit 30 is a computer including a CPU, a memory device, a display, and a transmitter/receiver. The memory device in the control unit 30 may ideally store all information items, described later, stored in a memory device of a water treatment management system mentioned later (i.e., information serving as information regarding the in-service filter, information serving as replacement filter information, information serving as water supply place information). However, the memory device may merely store some of the information items.

Although the pump 20 in this embodiment is located upstream from the filter unit 10, the pump 20 may be located downstream from the filter unit 10.

The household water treatment apparatus is located at or near a place of water use, and treats water before treatment with the filter unit 10 and feeds the treated water to the place of water use.

Specific examples of the place of water use include places with body washers, such as a shower room, a bathroom, a place to wash hands, a place to wash feet, and a washing place for animals, places with clothing washers such as a washing machine and a washing appliance, places with excrement treatment equipment, such as a toilet, places with tools or machines to wash foods and dishes, such as a kitchen, places with water supplying equipment that provides water such as drinking water and water for cooking, and other various places of water use.

Each of the shower room, the bathroom, the washing machine room, the toilet, the kitchen, the water supplying equipment, and other places may be used by a small number of people such as one or two people at a time, or may be used by a large number of people such as ten or more people at a time. These places may be included in a house, or may be temporarily set up in an outdoor area near a house or an outdoor area distant from a house, such as a campsite.

Specific examples of the water before treatment include water that has been used at the place of water use, and water taken from natural water such as river water, swamp water, lake water, seawater, well water, and rainwater. Additionally, in the case that water is treated through a filter for use, water that has not passed through the filter is also water before treatment.

The feed of treated water to the place of water use includes feeding the treated water to a water supply port such as a faucet in the place of water use and feeding the treated water to a body washer, a clothing washer, excrement treatment equipment, a food and dish washer, or other equipment installed in the place of water use.

One household water treatment apparatus may be installed for each house or for two or more houses. In some cases, one house may have a number of household water treatment apparatuses. Thus, an apartment house may have a household water treatment apparatus. For a household water treatment apparatus designed to have a size and weight that allow the apparatus to be moved, a transportation facilitation means such as wheels enables easy movement.

Such a movable household water treatment apparatus can be used in, for example, a campsite, a place to stay during a trip, and a place to stay temporarily. The apparatus may be located at or near the place of water use in a campsite or a place to stay temporarily during, for example, a trip.

The household water treatment apparatus is not limited to home use, but may be used in a commercial facility such as a restaurant.

The water before treatment inlet 1 is connected to a place in which the water before treatment exists via a pipe such as a hose. The pump 20 may be chosen from water feed pumps of known various types.

The first filter 11 is, as an example, a filter that removes foreign matter (which means substances other than water) having at least a predetermined size or a predetermined length, such as particles, stones, oil, sand, sludge, hairs, skin, excrement, and food, from the water before treatment. The second filter 12 may be a filter including a reverse osmosis (RO) membrane that removes even metal molecules and pesticide molecules from the water before treatment. It is noted that the first filter 11 and the second filter 12 may be replaced with other filters depending on the application and request. In addition, three or more, not two, filters may be provided, or merely one filter including a reverse osmosis membrane may be provided alternatively.

Such a filter including a reverse osmosis membrane is commonly known as a filter in which water from a source passes through the membrane and is separated into clean water and concentrated water, and thus the function and the details of the filter will not be illustrated.

The valve unit includes a first pipe 51 that allows water from the pump 20 to flow to the inlet of the first filter 11, a first three-way valve 41 that is provided on the first pipe 51 and can switch between a first state in which the water flowing through the first pipe 51 is distributed to the inlet of the first filter 11 and a second state in which the water is distributed to the inlet of the second filter 12, a second pipe 52 in which the water from the first three-way valve 41 flows toward the second filter inlet, a third pipe 53 that allows the water from the outlet of the first filter 11 to flow toward the treated water outlet 2, a fourth pipe 54 connecting a point of the second pipe 52 and a point of the third pipe 53, a second three-way valve 42 that can switch between a first state in which the water flowing from the first three-way valve 41 into the second pipe 52 is distributed to the inlet of the second filter 12 and a second state in which the water is distributed to the fourth pipe 54, a third three-way valve 43 that can switch between a first state in which the water flowing from the outlet of the first filter 11 into the third pipe 43 is distributed to the fourth pipe 54 and a second state in which the water is distributed to the treated water outlet 2, and a fourth three-way valve 44 that can switch between a first state in which the water from the third three-way valve 43 is allowed to flow toward the treated water outlet 2 and a second state in which the water from the outlet of the second filter 12 is allowed to flow toward the treated water outlet 2.

More specifically, the valve unit, when the control unit 30, which is a computer, controls the first to fourth three-way valves 41 to 44, enables switching between the state in which the water before treatment passes merely through the first filter 11 and flows to the treated water outlet 2, the state in which the water before treatment passes merely through the second filter 12 and flows to the treated water outlet 2, the state in which the water before treatment passes through the first filter 11 and then the second filter 12, and flows to the treated water outlet 2, and the state in which the water before treatment passes through neither the first filter 11 nor the second filter 12 and flows to the treated water outlet 2.

The household water treatment apparatus also includes a reference water flow channel 57 that allows the treated water flowing from the outlet of the second filter 12 toward the treated water outlet 2 to flow to a water before treatment pipe 55 between the water before treatment inlet 1 and the pump 20, a fifth three-way valve 45 that can switch between a first state in which the water before treatment from the water before treatment inlet 1 flows to the pump 20 and a second state in which the water in the reference water flow channel 57 flows to the pump 20, and a detection means that can detect a pressure change in or the amount of the water output by the pump 20. The control unit 30 also controls the fifth three-way valve 45. After the control unit 30 controls the fifth three-way valve 45 to place it in the second state, and controls the valve unit to allow the water to flow from the pump 20 merely through the second filter 12 toward the treated water outlet 2, the control unit 30 outputs the detection result from the pressure sensing means (working state detection value), the working state information about the second filter 12 that is based on the detection result, or the information regarding performance change about the second filter 12 that is estimated based on the detection result.

The detection result, the working state information, and the information regarding performance change are associated with the information about a performance change in the second filter.

The present embodiment further includes a sixth three-way valve 46 that can switch between a first state in which the treated water from the fourth three-way valve 44 toward the treated water outlet 2 is allowed to flow to the treated water outlet 2 and a second state in which the water is allowed to flow to the reference water flow channel 57. However, the household water treatment apparatus may operate without the sixth three-way valve 46.

Each of the first to sixth three-way valves may be replaced with one or two on-off valves or other on-off valves.

The output includes sending the detection result, the working state information, or the information regarding performance change to a predetermined display on which they appear, and transmitting them to the water treatment apparatus management system described later. The display may be installed on the household water treatment apparatus.

The detection means may be a sensor that senses the rotational torque of the pump, a pressure sensor that measures the pressure between the pump 20 and the second filter 12 while the pump 20 is working in a predetermined operating state, or a flow sensor for water passing through the second filter 12 while the pump 20 is working in a predetermined operating state.

The present embodiment includes a treated water pipe 56 that allows the treated water from the fourth three-way valve 44 to flow to the treated water outlet 2. The treated water outlet 2 has a flow regulation valve 2a that can regulate the flow rate of water to be discharged to the outside.

The present embodiment includes a reference water container 57a located midway in the reference water flow channel 57. While the treated water is fed from the fourth three-way valve 44 toward the treated water outlet 2, closing or choking the flow regulation valve 2a allows a predetermined amount of reference water to be stored in the reference water container 57a.

In the present embodiment, the treated water is stored in the reference water container 57a as reference water. However, external reference water such as drinking water for reference water may be alternatively brought into the reference water container 57a via an inlet 57b, and the external reference water may be used as reference water.

The present embodiment also includes, as the detection means, a pressure sensor 61 on the second pipe 52 and a flow sensor 62 on the treated water pipe 56. Additionally, the water before treatment pipe 55 includes an electric conductivity sensor 63, and the treated water pipe 56 includes an odor sensor 64.

The working state information may be, for example, data that is based on the pressure detected by the pressure sensor 61 and the flow rate detected by the flow sensor 62 as described above, and the discharge power of the pump 20 in the predetermined operating state, which can be used for the estimation or calculation of clogging in the second filter 12. The working state information may also be data that is based on the pressure detected by the pressure sensor 61 and the flow rate detected by the flow sensor 62 as described above, and other factors, which can be used for the estimation or calculation of the performance of the second filter 12.

Figure 3:
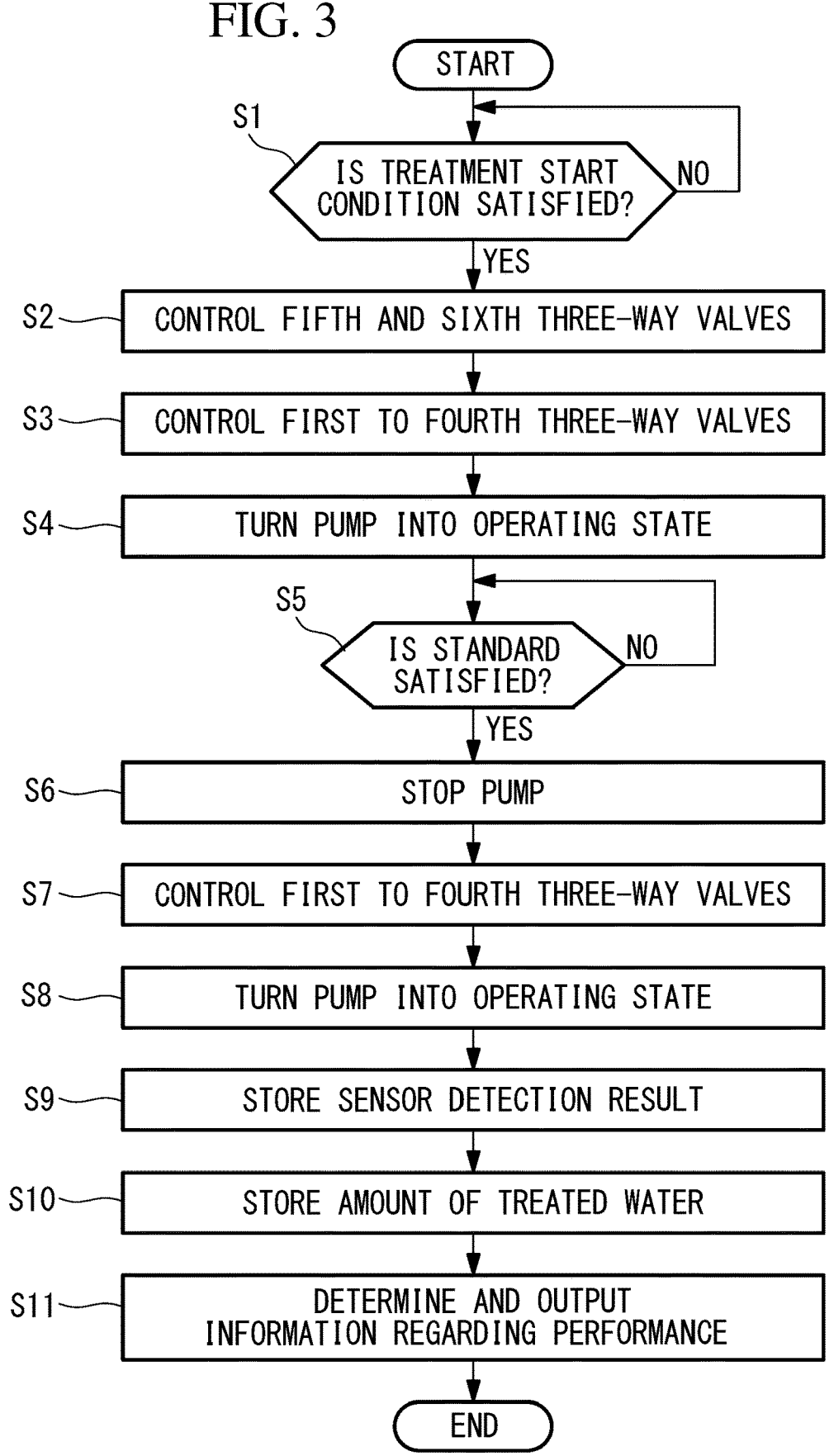
FIG. 3 is a flowchart illustrating an example of processing by a control unit in the household water treatment apparatus according to the first embodiment.

An example of the operation of the control unit 30 to output the detection result, the working state information, or the information regarding performance change based on stored programs will now be described with reference to FIG. 3.

First, with no treated water fed from the treated water outlet 2, when the control unit 30 receives a trigger signal based on the user operation of the control unit 30 or the receipt of an external signal, or a treatment start condition is satisfied at a predetermined time (step S1), the control unit 30 controls the fifth three-way valve 45 to place it in the second state and also the sixth three-way valve 46 to place it in the second state (step S2).

Subsequently, the control unit 30 controls the first to fourth three-way valves 41 to 44 to place them in the state in which the water before treatment passes through the first filter 11 and then the second filter 12, and flows to the treated water outlet 2 (step S3). The control unit 30 turns the pump 20, which is out of service in this state, into the predetermined operating state (step S4). This allows the reference water in the reference water flow channel 57 to pass through the first filter 11 and then flow to the second filter 12. In this state, when the elapse of a predetermined time or the feed of a predetermined flow rate of reference water satisfies a criterion for determining that only the reference water occupies the path from the fifth three-way valve 45 to the first three-way valve 41 (step S5), the control unit 30 temporarily stops the pump 20 (step S6).

Subsequently, the control unit 30 controls the first to fourth three-way valves 41 to 44 to place them in the state in which the water before treatment passes merely through the second filter 12 and flows to the treated water outlet 2 (step S7). In this state, the control unit 30 turns the pump 20 into the predetermined operating state (step S8). In this state, for example, the control unit 30 stores the detection result from the pressure sensor 61 into memory (step S9). Step S9 is preferably performed when a predetermined time elapses after step S8.

In step S9, the detection result from the flow sensor 62 may be alternatively stored, or instead of the detection results, the working state information based on the detection results may be stored into the memory. Along with step S9, the amount of water treated in the second filter 12 is also stored into the memory as a part of the detection results or the working state information in association with the aforementioned detection results or the working state information (step S10).

Steps S1 to S10 have been performed several times at time intervals, and each time the steps are executed. The detection result is stored in the memory.

Subsequently, the detection results and the amounts of treated water stored in the memory are used to determine the information regarding performance change about the second filter indicating the change in the performance of the second filter 12 relative to the amounts of treated water. The information regarding performance change is output (step S11).

In the above example, steps S3 to S6 can prevent the water before treatment accumulated in the pump 20 from flowing to the second filter 12. However, steps S3 to S6 may be eliminated depending on the conditions such as the quality of the water before treatment and the performance of the second filter.

Although the information regarding performance change is output in step S11 in the above example, a detection result or working state information including an amount of treated water may be output in place of the information regarding performance change, or a detection result with the amounts of treated water that have been detected several times or working state information may also be output.

A water treatment apparatus management system that manages the household water treatment apparatus will now be described.

Figure 1:
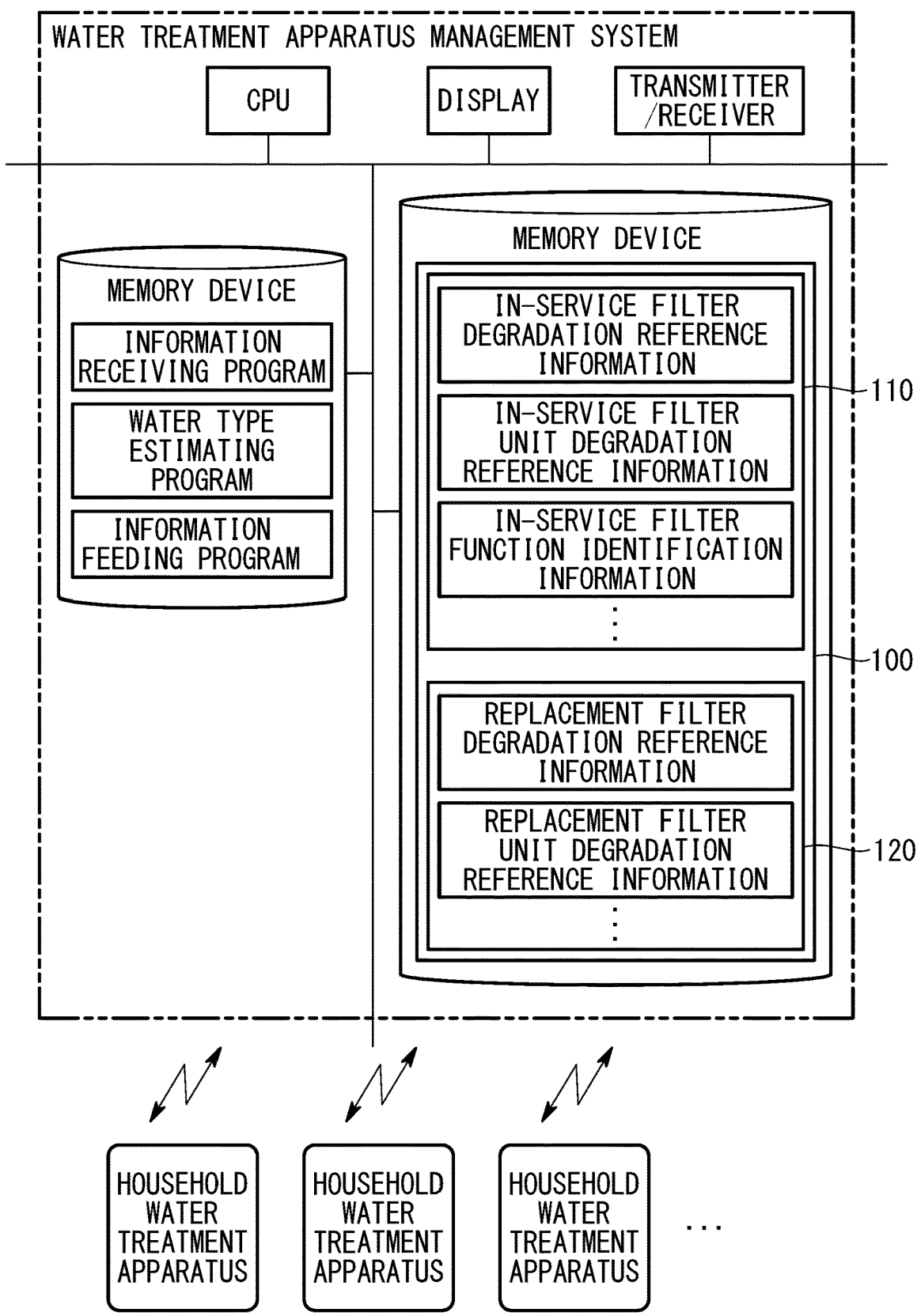
FIG. 1 is a schematic diagram of a water treatment apparatus management system according to a first embodiment of the present invention.

The water treatment management system is, as shown in FIG. 1, a water treatment apparatus management system for managing household water treatment apparatuses each of which is located at or near a place of water use, treats water before treatment with at least one type of filter, and feeds the treated water to the place of water use.

In the case that the system manages the household water treatment apparatus described above, the at least one type of filter refers to the filter unit 10, or the first filter 11 and the second filter 12 included in the filter unit 10.

The water treatment management system has at least one computer including a CPU, a memory device, a display, and a transmitter/receiver. The memory device includes a filter information storage unit 100 that stores in-service filter information 110 about the in-service filter in the household water treatment apparatus, and replacement filter information 120.

The memory device may also comprise different memories included in different computers.

The in-service filter information 110 includes, for each individual type of reference water before treatment, reference information of degradation of the second filter 12 in service in a target household water treatment apparatus (in-service filter degradation reference information). The in-service filter information 110 preferably includes reference information of degradation of the second filter 12 for each of the various types of reference water before treatment, examples of which include water before treatment after filtration of water containing a dissolved surfactant of type (soap) through the same or the same type of filter as the first filter 11, water before treatment after filtration of water containing a dissolved surfactant of type 2 (soap of a different type) through the same or the same type of filter as the first filter 11, water before treatment after filtration of water containing a dissolved surfactant of type 3 (dish-washing detergent) through the same or the same type of filter as the first filter 11, water before treatment after filtration of water mixed with food of type 1 through the same or the same type of filter as the first filter 11, water before treatment after filtration of water mixed with food of type 2 through the same or the same type of filter as the first filter 11, water before treatment after filtration of swamp water of type 1 through the same or the same type of filter as the first filter 11, and water before treatment after filtration of swamp water of type 2 through the same or the same type of filter as the first filter 11.

The degradation reference information may be created based on the measurement data on the degradation in the second filter 12 measured when various types of reference water before treatment are actually passed through the second filter 12. The degradation reference information may also be created based on calculations and simulations performed using basic characteristics (e.g., catalog values) of the second filter 12.

In addition, the in-service filter information 110 preferably includes similar reference information of degradation of the first filter 11.

Furthermore, the in-service filter information 110 includes at least one of in-service filter type identification information and in-service filter function identification information. The in-service filter type identification information identifies the types of the first and second filters 11 and 12 in service, such as the types, the specifications, the product numbers, and the names of the first and second filters 11 and 12. The in-service filter function identification information indicates, for example, the functions and the performance of the first and second filters 11 and 12.

In the present embodiment, the in-service filter information 110 further includes, for each individual type of reference water before treatment, reference information of degradation of the filter unit in which the filtration through the first filter 11 is followed by the filtration through the second filter 12 (in-service filter unit degradation reference information). The in-service filter information 110 preferably includes reference information of degradation of the filter unit for each of the various types of reference water before treatment, examples of which include water before treatment containing a dissolved surfactant of type 1 (soap), water before treatment containing a dissolved surfactant of type 2 (soap of a different type), water before treatment containing a dissolved surfactant of type 3 (dish-washing detergent), water before treatment mixed with food of type 1, water before treatment mixed with food of type 2, water before treatment that is swamp water of type 1, and water before treatment that is swamp water of type 2.

Furthermore, the in-service filter information 110 includes in-service filter function identification information indicating, for example, the function and the performance of the filter unit in which the filtration through the first filter 11 is followed by the filtration through the second filter 12.

The replacement filter information 120 includes, for each individual type of reference water before treatment used for the reference information of degradation of the second filter 12, reference information of degradation of a number of replacement filters with which the second filter 12 can be replaced (replacement filter degradation reference information). The replacement filter information 120 also preferably includes similar reference information of degradation of a number of replacement filters with which the first filter 11 can be replaced.

In the present embodiment, the replacement filter information 120 further includes, for each individual type of reference water before treatment used for the reference information of degradation of the in-service filter unit, degradation reference information (replacement filter unit degradation reference information) about various replacement filter units. The replacement filter units include a replacement filter unit having a replacement filter 1-1, which is different from the first filter 11 in service, and the second filter 12 in service, a replacement filter unit having a replacement filter 1-2, which is different from the first filter 11 in service, and the second filter 12 in service, a replacement filter unit having the replacement filter 1-1 and a replacement filter 2-1, which is different from the second filter 12 in service, and a replacement filter unit having the first filter 11 in service, the second filter 12 in service, and a third filter placed between both the filters.

The water treatment management system includes an information receiving means that receives information regarding performance change about a in-service filter from a target household water treatment apparatus. When the CPU controls the transmitter/receiver based on an information receiving program stored in the memory device, for example, the information receiving means receives, via a wired, wireless, or wired/wireless hybrid communication path, the information regarding performance change transmitted in step S11 by the household water treatment apparatus, and stores the received information into the memory in association with the target household water treatment apparatus. At this time, the information receiving means also receives the in-service filter type identification information and the in-service filter function identification information, and stores them into the memory.

Alternatively, if the household water treatment apparatus transmits the detection result or the working state information including the amount of treated water in step S11, the information receiving means receives the detection result or the working state information, and stores them into the memory in association with the target household water treatment apparatus. The detection result and the working state information are also information regarding performance change.

The water treatment management system, when the CPU operates based on a water type estimating program stored in the memory, estimates the water type of the water before treatment on the basis of the in-service filter information 110 and the information about the performance change. Examples of the in-service filter information 110 include the in-service filter unit degradation reference information, in-service filter unit type identification information, and in-service filter unit function identification information. The in-service filter unit function identification information includes the rated filtering performance of the in-service filter unit and etc.

For example, the information regarding performance change may be compared with the degradation speed and the pattern in the in-service filter unit degradation reference information for each type of reference water before treatment, and the type of the water before treatment treated by the filter unit 10 in service may be estimated on the basis of the reference water before treatment to which the water before treatment is similar. The type of the water before treatment may also be estimated as a combination of multiple types of reference water before treatment, rather than a single type of reference water before treatment. The water treatment apparatus management system may also receive from user's computer and household water treatment apparatus, user input information including at least one of the use application of water in the place to utilize the water, the specific quality of the water before treatment, and the source of the water before treatment, and then use the user input information to estimate the water type.

In place of the above method for estimating the water type, the CPU may operate based on the water type estimating program stored in the memory to receive sensor detection results (working state detection values) transmitted by a target household water treatment apparatus, store them into the memory in association with the household water treatment apparatus, and estimate the water type of the water before treatment based on the detection results. In this case, the household water treatment apparatus transmits detection results from the pressure sensor 61, the flow sensor 62, the electric conductivity sensor 63, the odor sensor 64, and other sensors. For example, the estimation may be based on the water before treatment composition estimated by the electric conductivity sensor 63 and the odor detected by the odor sensor 64.

Moreover, the water type may be estimated based merely on the information regarding performance change. For example, a household water treatment apparatus and the water treatment management system that operates based on the estimating program associate treating time with the detection results from the pressure sensor 61, the electric conductivity sensor 63, the odor sensor 64, and other sensors and the treated flow rate derived from the detection result from the flow sensor 62 to form data showing a change in each detection value that depend on the time. If the data indicates that the pressure significantly changes depending on the time, the quality of the water before treatment varies greatly. Thus, the water before treatment is presumed to have come from a place in which water has a constant quality, such as a river or a swamp. If the detection values from the electric conductivity sensor 63 and the odor sensor 64 differ significantly depending on the time, the water before treatment is presumed to be multiple types of wastewater including water that contains detergent or water that contains food.

The water treatment management system, when the CPU operates based on an information feeding program stored in the memory, provides filter replacement information to a household water treatment apparatus or the user's computer via a wired, wireless, or wired/wireless hybrid communication path.

At this time, the CPU refers to, for example, the reference information of degradation of the second filter 12 included in the in-service filter information 110 and the reference information of degradation of a number of replacement filters with which the second filter 12 can be replaced, included in the replacement filter information 120. If any of the replacement filters can delay the degradation for the water type estimated in the water type estimation means compared with the second filter 12 in service, the CPU transmits the filter replacement information including information about the replacement filter to the household water treatment apparatus or the computer.

The filter replacement information is transmitted as maintenance information for the household water treatment apparatus.

Examples of the user's computer include a display-equipped computer installed in a house, the user's tablet terminals including the user's smartphone, the user's mobile phone, and the user's desktop or laptop computer. It is noted that the scope of the user's computer includes any device capable of receiving information such as filter replacement information and notifying the user of the information content.

The water treatment management system, when the CPU operates based on the information feeding program stored in the memory, may transmit maintenance information for the household water treatment apparatus in accordance with the water type estimation result. For example, in the case that the estimated water type is a predetermined type or the estimated water type is a water type that changes in accordance with a predetermined pattern, the water treatment management system can transmit information about the replacement filter appropriate to the estimated water type if the recommendation priorities of the filters have been determined for the predetermined water type.

The maintenance information to be transmitted may include the current performance level of the in-service filter unit or individual filters, and the timing of replacement of the in-service filter unit or individual filters for the estimated water type and the changing pattern. The current performance level and the timing of replacement are estimated based on the information about the performance and the in-service filter information 110.

The water treatment management system, when the CPU operates based on the information feeding program stored in the memory, transmits optimal operation method information about the action of the pump 20 and the action of the valve unit as operation method information on the basis of the estimated water type, the changing pattern, and/or the in-service filter information 110.

For example, in a household water treatment apparatus, the valve unit operates so that the water before treatment always passes through the first filter 11 and then the second filter 12, and the water type leads to treated water at a certain level or higher when the first filter 11 removes foreign matter that has not less than a predetermined size or length. In this case, the operation method information indicating that the current place for use and this working provide such treated water quality is transmitted to the household water treatment apparatus or the computer. Additionally, working pattern data needed for such operation is transmitted to the control unit 30 of the household water treatment apparatus.

Depending on the environmental factors such as place, position, situation, temperature, humidity, vibrations, and atmospheric pressure for use of water, the use pattern factors such as a way of using water and water use applications, and the temporal factors such as the frequency of the use of water and a time period taken per use of water, the various types of information regarding performance change and the degradation reference information created based on various supposed situations (in-service filter degradation reference information, in-service filter unit degradation reference information, replacement filter degradation reference information, replacement filter unit degradation reference information) can be used to perform water type estimation more accurately.

Regarding the environmental factors, an example in which a place of water use is a desert will now be described. Desert sands are easily moved by the wind and include a large number of fine particles. Thus, sand may easily enter the place of water use, and the water before treatment tends to contain sand. In this situation, for example, if the first filter 110 is a sediment filter for removing larger particles, the function of the first filter 110 decreases early.

As such, an environmental factor may deeply influence the performance change, and thus degradation reference information is preferably created for various types of reference water before treatment containing particles of varying diameters. In some examples, a number of household water treatment apparatuses are installed in the same desert, and the installation position of each household water treatment apparatus can be determined by a water treatment apparatus management system using the GPS or other technology. In such a case, a filter information generation means may accumulate the information regarding performance change transmitted from each household water treatment apparatus. This accumulation enables the creation of reference information of degradation of various filters in the environment (positions). The accumulated information may also be used to create replacement filter information.

Regarding the use pattern factors, an example will now be described in which a place of water use is a shower booth and water before treatment contains soap and shampoo. In a shower booth, the usage of soap and other substances depends on the individuals. In addition, the concentration of soap varies over time in various manners, and thus even if the same soap is used, the filter function will decrease at different rates.

Thus, the water type estimation is not based merely on the detection of the operating state of a household water treatment apparatus (pump) and the flow rate of water passing through the in-service filter. For example, reference water before treatment containing soap with varying concentrations is passed through a filter, and the pressure, the turbidity, and other quantities before and behind the filter are detected using a number of sensors. The time-varying detection values from each sensor are used to create the reference information of degradation of various filters. The creation of the degradation reference information on the basis of, for example, the various concentrations, the concentration changing patterns, and the types of soap enables more accurate water type estimation. In this case, the information regarding performance change of the in-service filter or the in-service filter unit may be, for example, the time-varying sensor detection results or the working state information based on the results.

Regarding the temporal factors, an example will now be described in which a place of water use is not frequently used. For example, if the place is used only about once per week, bacteria may propagate on the filter while the place is not used, and the bacteria may reduce the function of the filter. In this case, reference water before treatment is passed through the filter, and then time-varying detection values are obtained from each sensor while the place is not used. The detection values are used to create reference information of degradation of various filters.

The degradation reference information may be created based on, for example, various types of reference water before treatment, the amount of reference water before treatment passed through the filter at once, the temperature and the humidity in the filter place, the types of bacteria, and the change caused by reference water before treatment passing through the filter after the bacteria propagate. The resulting degradation reference information enables more accurate water type estimation. In this case, for example, the change in the detection values from each sensor in a time period from the previous water use to the current water use may be used as the information regarding performance change of the in-service filter or the in-service filter unit in association with the time taken for the change.

In some cases, the information regarding performance change of the in-service filter or the in-service filter unit may also be obtained based on the conditions of the pump. For example, if the function of the pump has started to decrease, the detection values from the sensors may be corrected based on the decrease in the function of the pump. If the pump is under an abnormal condition, it may be impossible to obtain the accurate information regarding the performance change of the in-service filter or the in-service filter unit. Thus, the information indicating the pump is under an abnormal condition is shown on the display of the household water treatment apparatus or transmitted to the user computer.

To determine whether the pump is under an abnormal condition, for example, a sensor that detects the sound or vibrations of the pump is equipped. As an example, a sound sensor is equipped in the household water treatment apparatus. Additionally, pump sound data (such as a level and a frequency) in the normal working is collected to define a reference range corresponding to the normal condition and store the range into the memory. When a detection value from the sound sensor falls outside the reference range, the pump is determined as under an abnormal condition.

For example, if the sound sensor detects no pump sound from the pump that should be working, the pump may suffer a breakdown or the pump may not be powered. When the sound sensor detects sound at a frequency different from a frequency in a normal condition, and the detection value from the sound sensor falls outside the reference range, for example, the pump may be idling without a water flow, the filter membrane may not receive appropriate pressure, and the filter or the pipe may leak water.

If the filter has abnormality or a decrease in function due to a factor other than clogging, it may also be impossible to obtain the accurate information regarding the performance change of the in-service filter or the in-service filter unit. Thus, also when the filter has abnormality or a decrease in function due to a factor other than clogging, the information indicating the filter is under an abnormal condition is shown on the display of the household water treatment apparatus or transmitted to the user computer.

To determine whether the filter is under an abnormal condition, for example, pressure sensors equipped before and behind the filter may be used. Each pressure sensor provides time-series data in the normal condition, and the data is used to define a reference pattern corresponding to the normal condition and store the pattern into the memory. When the detection value from each pressure sensor or the pattern of chronologically varying detection values from each pressure sensor falls outside the reference pattern, the filter is determined as having abnormality or a decrease in function due to a factor other than clogging.

For example, with the pump working in a normal way and water passing through the filter, if the moving average of differences between detection values from one pressure sensor and detection values from another pressure sensor is equal to a predetermined value or higher, the filter is determined as unable to provide the intended function due to clogging.

With the pump working in a normal way and water passing through the filter, if differences between detection values from one pressure sensor and detection values from another pressure sensor indicate a particular chronological change (e.g., in vibrations), the time for the filter to lose the ability to provide the intended function is determined as quite short.

With the pump working in a normal way and water passing through the filter, when a difference between a detection value from one pressure sensor and a detection value from another sensor drops sharply, the filter is determined as abnormality such as failure.

The term "degradation reference information" is used because degradation represents a decrease in at least one of the functions of a filter. For example, the case in which filter clogging increases the permeation resistance of the filter but improves the ability of the filter to remove impurities also falls within the degradation. Thus, the degradation reference information may also be referred to as reference information of performance change.

In some cases, a certain function of a filter may decrease, whereas another function may improve or develop. Such a case also falls within degradation. For example, the adsorption function of an activated carbon filter decreases as the total amount of permeate water increases. However, microorganisms have adhered to an activated carbon filter used for some period of time. When the type and the amount of the microorganisms meet conditions, the filter acquires a new function for biological treatment.

Typically, an activated carbon filter with an adsorption function that has fallen below a desired level needs to be replaced with a new activated carbon filter. However, if the older activated carbon filter can be used as a filter for biological treatment, the activated carbon filter enables water treatment that cannot be performed by a new activated carbon filter.

Figure 8:
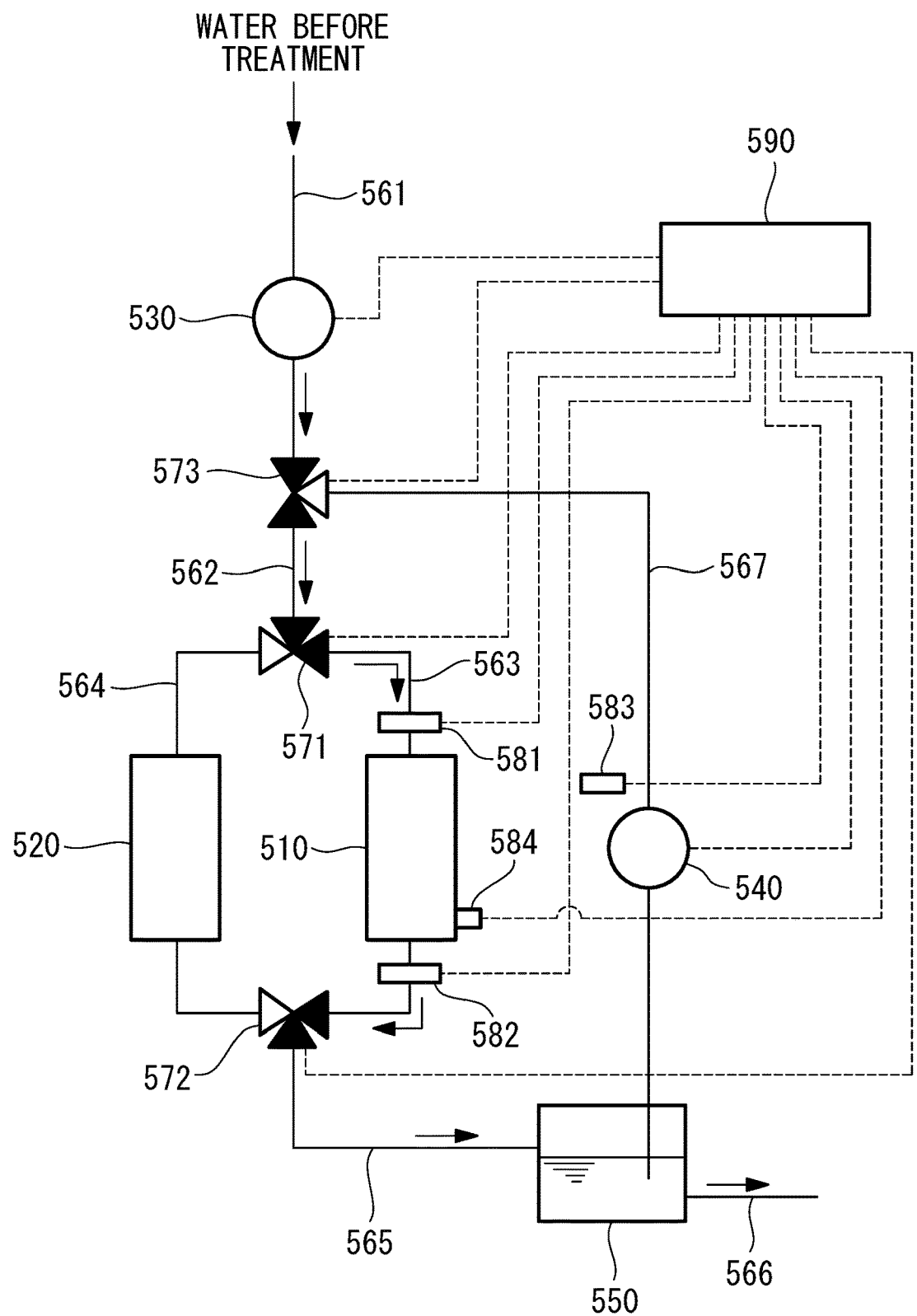
FIG. 8 is a schematic diagram of a modification of the household water treatment apparatus included in the water treatment apparatus management system according to the embodiment in FIG. 1.

For example, a household water treatment apparatus shown in FIG. 8 includes a first filter 510 and a second filter 520 that are activated carbon filters, a first pump 530 located nearer to a water before treatment inlet than the filters 510 and 520, and a tank 550 that receives the treated water treated by the filters 510 and 520. The household water treatment apparatus allows a filter with one function that has become worse to exert another function. In this household water treatment apparatus, the first filter 510 and the second filter 520 are arranged in parallel, as an example.

The household water treatment apparatus includes a pipe 561 that connects the water before treatment inlet and the first pump 530, a pipe 562 with one end connected to the pump 530, a first three-way valve 571 connected to the other end of the pipe 562, a pipe 563 with one end connected to the first three-way valve 571, the other end connected to a second three-way valve 572, and the first filter 510 arranged between the element 571 and the element 572, a pipe 564 with one end connected to the first three-way valve 571, the other end connected to the second three-way valve 572, and the second filter 520 arranged in its middle part, a pipe 565 that connects the second three-way valve 572 and the tank 550, a pipe 566 with one end connected to the tank 550, the other end having a treated water outlet, and with an on-off valve (not shown), and a return line 567 for returning the water in the tank 550 to the pipe 562. The return line 567 includes a second pump 540 that forces the water in the tank 550 toward the pipe 562. The return line 567 is connected to a middle part of the pipe 562 via a third three-way valve 573.

The household water treatment apparatus has a first sensor 581 and a second sensor 582 adjacent to the inlet and the outlet of the first filter 510 for sensing the performance and the function of the first filter 510. The first and second sensors 581 and 582 in the present embodiment are pressure sensors. In addition, the apparatus has a third sensor 583 for sensing the surroundings of the first filter 510. The third sensor 583 in the present embodiment is a temperature sensor. The apparatus further includes a fourth sensor 584 for sensing the state of the first filter 510, for example, the surface temperature of the first filter 510.

The first and second pumps 530 and 540, the first to third three-way valves 571 to 573, and the first to fourth sensors 581 to 584 are connected to a controller 590, which controls these components.

In the household water treatment apparatus, as shown in FIG. 8, the controller 590 first controls the first pump 530 to cause water before treatment from the water before treatment inlet to pass through the first filter 510 and flow to the tank 550. As a result, the activated carbon of the first filter 510 disposes of foreign matter such as a surfactant in the water before treatment.

At this time, the first filter 510 experiences a decrease in the adsorption function and propagation of microorganisms depending on the amount of permeate water, the water type of the water before treatment, the frequency of use, and other factors. However, the second filter 520, which is unused, almost never experiences a decrease in the adsorption function or propagation of microorganisms. Thus, the time taken for the adsorption function of both the first and second filters 510 and 520 to decrease to a predetermined level can be extended compared with the case in which the first and second filters 510 and 520 are used simultaneously or alternately.

Figure 9:
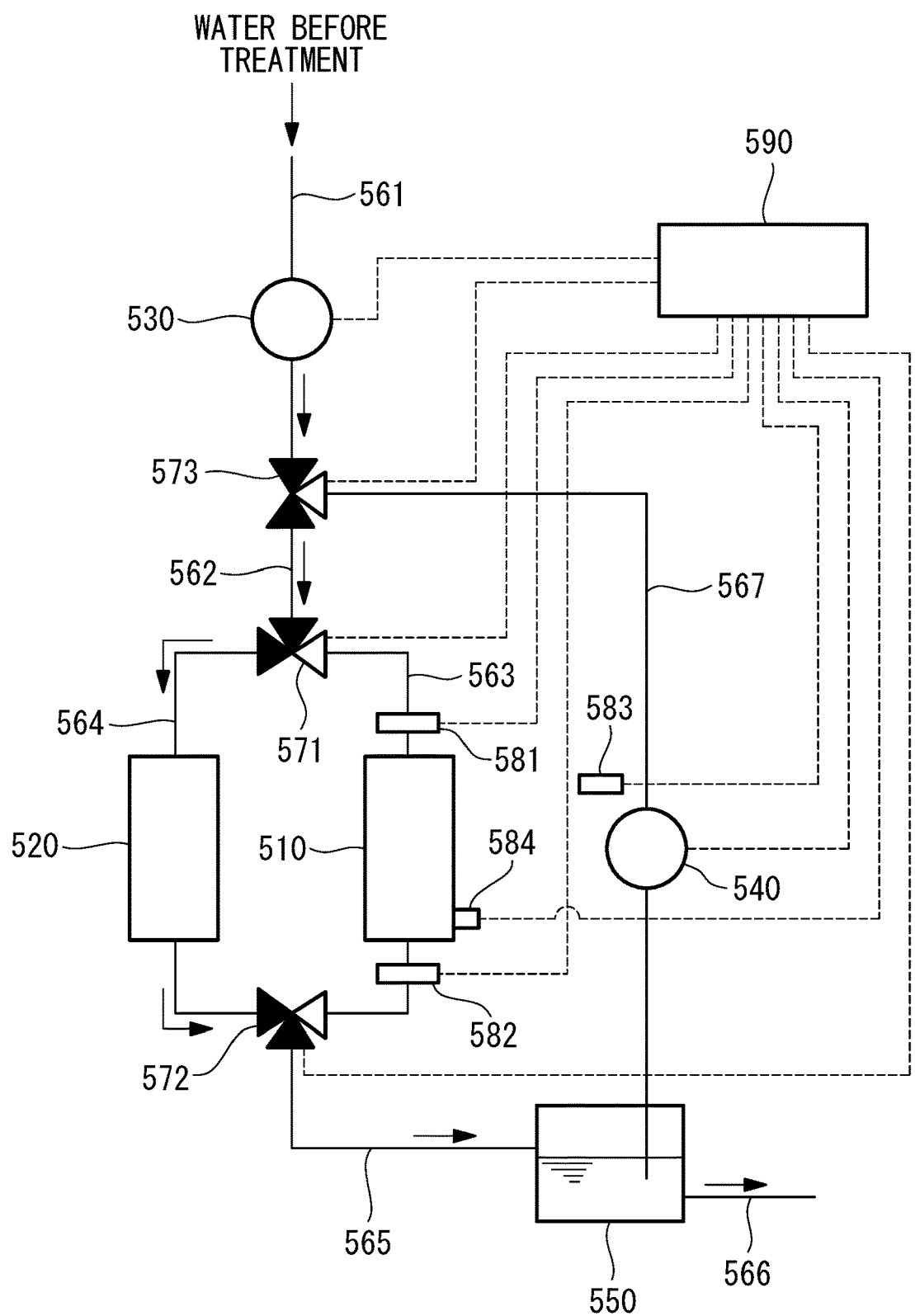
FIG. 9 is a diagram illustrating the operation of the household water treatment apparatus in FIG. 8.
Figure 10:
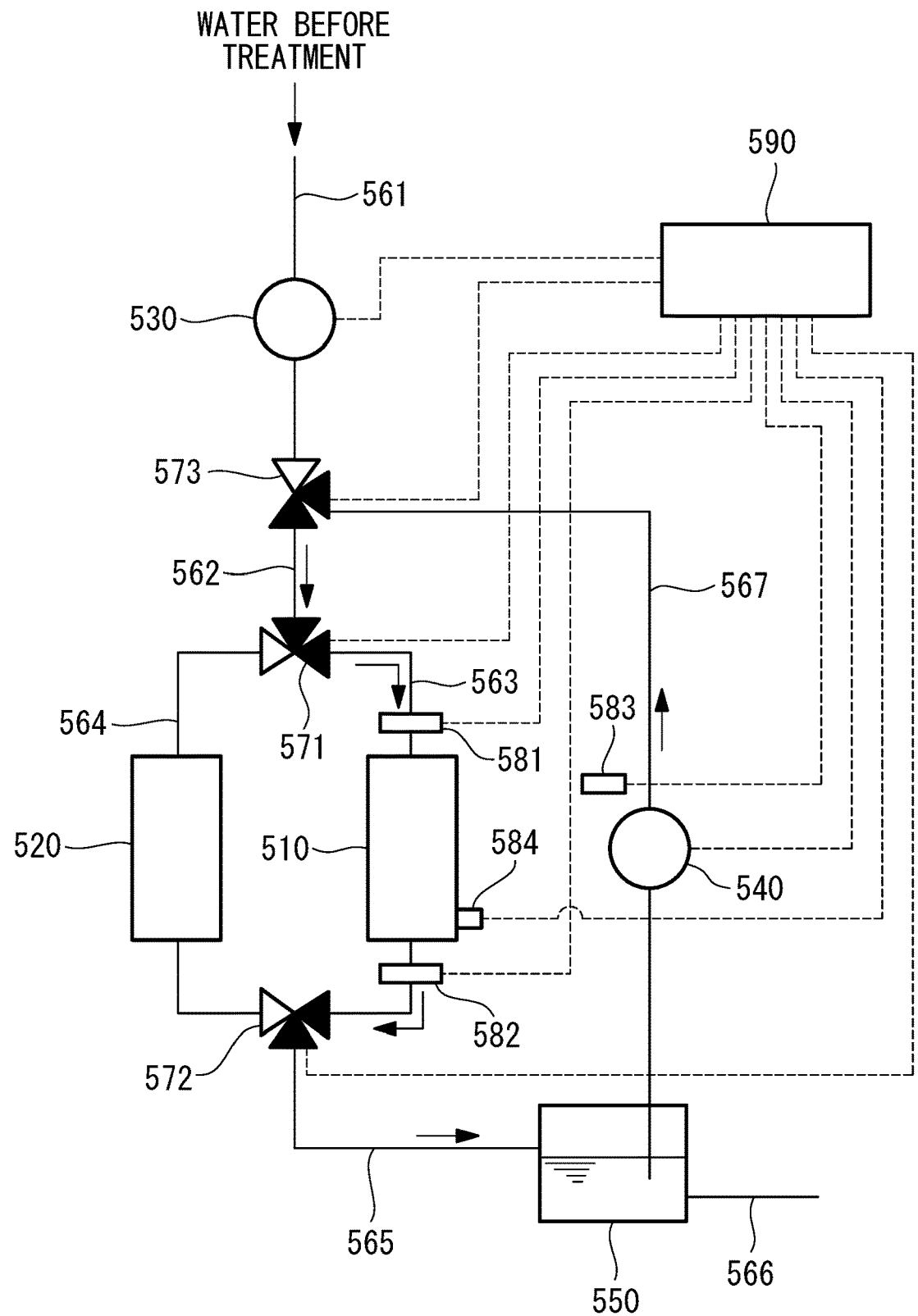
FIG. 10 is a diagram illustrating the operation of the household water treatment apparatus in FIG. 8.

The controller 590 determines that the adsorption function of each filter 510 has decreased to the predetermined level based on detection values from the first and second sensors 581 and 582. The same sensors as those for the first filter 510 may also be installed near the inlet and the outlet of the second filter 520. When the adsorption function of the first filter 510 decreases to the predetermined level, the controller 590, as shown in FIG. 9, controls the first pump 530 to cause water before treatment from the water before treatment inlet to pass through the second filter 520 and flow to the tank 550. As a result, the activated carbon of the second filter 520 treats the water before treatment.

Conventionally, when the adsorption performance of the first filter 510 decreases in this manner, the first filter 510 is replaced with a new filter. In contrast, the controller 590 determines whether the type and the amount of the microorganisms on the first filter 510 meet predetermined conditions. For example, the determination may be based on the fact that microorganisms generate heat. While no water is passing through the first filter 510, if the third sensor 583 and the fourth sensor 584 have a predetermined difference in detection temperature, it is determined that the amount of the microorganisms on the first filter 510 meets a predetermined condition. In the case that, for example, the difference in temperature varies depending on the detection temperature from the third sensor 583 and the pattern of variations depends on the type of microorganisms, when the pattern meets a predetermined condition, it is determined that the type of the microorganisms also meets a predetermined condition.

When it is determined that the amount and the type of the microorganisms meet the predetermined conditions, the controller 590 performs the following control in a time period during which no water in the tank 550 is discharged via the pipe 566. The controller 590 stops the first pump 530, switches the first and second three-way valves 571 and 572 from the second filter 520 to the first filter 510, and controls the second pump 540 to cause the water in the tank 550 to pass through the first filter 510 and then return to the tank 550. As a result, the bacteria that have not been removed by the second filter 520 is removed by the first filter 510 having the new function.

In this manner, the household water treatment apparatus can start to provide a new function using the new function of the first filter 510, which may broaden the applications of the household water treatment apparatus.

In the household water treatment apparatus, water treatment can be switched between the first filter 510 and the second filter 520. Thus, the second filter 520 may perform the original water treatment in the household water treatment apparatus, and the first filter 510 may perform new water treatment, without a filter replacement.

Even before the adsorption performance of the first filter 510 decreases to the predetermined level, the adsorption performance decreases gradually, whereas the ability to remove bacteria and the like improves gradually. For this reason, based on the detection values from the first to fourth sensors 581 to 584, the controller 590 may allow water treatment with the adsorption function of the first filter 510 in a usual working state, and control the second pump 540 to cause the water in the tank 550 to pass through the first filter 510 and then return to the tank 550 in a time period during which no water in the tank 550 is discharged via the pipe 566. More specifically, the controller 590 may manage changes in each function of the filters 510 and 520, and switch between ways of water treatment in accordance with the function currently performed by each of the filters 510 and 520.

The household water treatment apparatus may control switching between ways of water treatment based on a control signal received by the controller 590 from the water treatment apparatus management system. Alternatively, the water treatment apparatus management system may directly transmit a control signal to the first and second pumps 530 and 540, the first to third three-way valves 571 to 573, and the first to fourth sensors 581 to 584 to directly control these components. In this case, the water treatment apparatus management system receives the detection value information from the first to fourth sensors 581 to 584, and estimates the water type of the water before treatment based on this information, the information regarding the in-service filter, or the in-service filter unit information. The water treatment apparatus management system then transmits the control signal as information regarding the operation method in accordance with the estimated water type. The switching between ways of water treatment after water type estimation enables water treatment complying more precisely with requests, and is also effective in increasing the life of the filters.

A second embodiment of the present invention will now be described with reference to FIG. 4.

A household water treatment apparatus according to the present embodiment includes every component of the household water treatment apparatus according to the first embodiment. A water treatment management system according to the present embodiment also includes every component of the water treatment management system according to the first embodiment.

Figure 4:
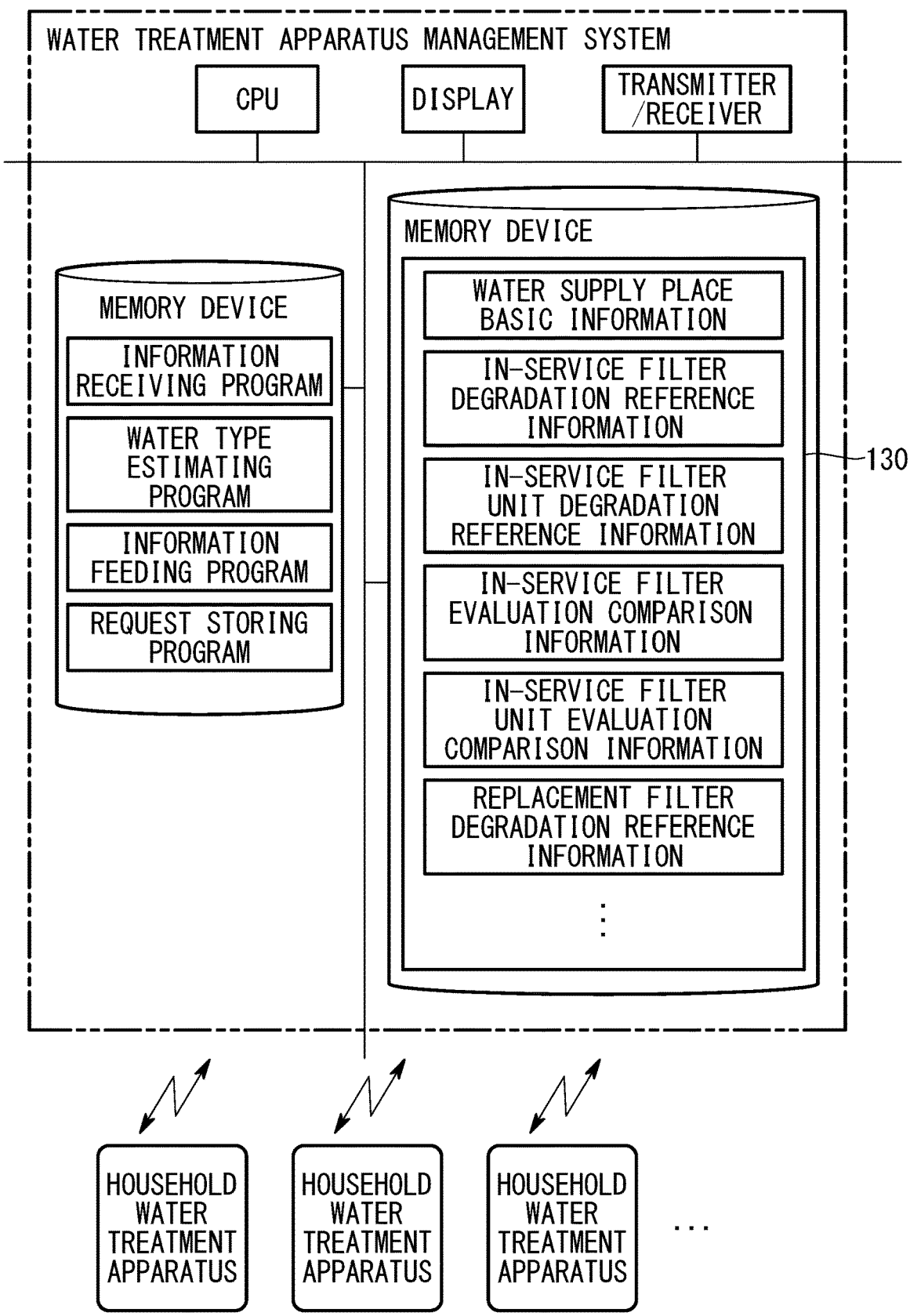
FIG. 4 is a schematic diagram of a water treatment apparatus management system according to a second embodiment of the present invention.

In the water treatment management system according to the present embodiment, as shown in FIG. 4, the memory device further stores information 130 regarding at least one water supply place allowed to supply water before treatment near a place of water use.

The water supply place information 130 includes water supply place basic information such as the locations and the names of individual water supply places, and reference information of degradation of the same or the same type of filter as the in-service filter (in-service filter degradation reference information) for water before treatment from each water supply place. For example, the water supply place information 130 preferably includes reference information of degradation of the second filter 12 for individual types of water before treatment such as water before treatment obtained by filtering water from river 1 through the same or the same type of filter as the first filter 11, water before treatment obtained by filtering water from river 2 through the same or the same type of filter as the first filter 11, water before treatment obtained by filtering water from swamp 1 through the same or the same type of filter as the first filter 11, water before treatment obtained by filtering water from swamp 2 through the same or the same type of filter as the first filter 11, and water before treatment obtained by filtering water from well 1 through the same or the same type of filter as the first filter 11.

The water supply places are not limited to a river, a swamp, and a well, but may be a water outlet in the existing infrastructure, a water bottle, and any other spot. For example, in some countries and regions, water pipes have been partially broken to steal water, and thus transparent water cannot come from a water outlet. In some cases, a clean water pipe and a sewer pipe are close to each other, and the water in the clean water pipe may smell of the water in the sewer pipe.

The degradation reference information may be created based on the measurement data on the degradation in the second filter 12 measured at a time when various types of reference water before treatment are actually passed through the second filter 12. The degradation reference information may also be created based on calculations and simulations performed using basic characteristics (e.g., catalog values) of the second filter 12.

In some water supply places, the water quality may vary depending on, for example, the season, and the water quality may vary depending on the temperature, the water temperature, the hours of sunshine, and the like. Thus, water quality data at such a water supply place and reference information of degradation of the second filter 12 for water before treatment obtained by filtering water from the water supply place through, for example, the first filter 11 may be continuously measured, and the water supply place information 130 may be updated based on the measurement results.

In addition, the in-service filter degradation reference information in the water supply place information 130 preferably includes similar reference information of degradation of the first filter 11.

Furthermore, the water supply place information 130 includes in-service filter evaluation comparison information containing evaluation values regarding the water before treatment at each water treatment place. The evaluation values are associated with at least one of in-service filter type identification information identifying the types of the first and second filters 11 and 12 in service, such as the types, the specifications, the product numbers, and the names of the first and second filters 11 and 12, and in-service filter function identification information indicating, for example, the functions and the performance of the first and second filters 11 and 12.

In an example, for water before treatment from river 1, the first filter 11 may have evaluation values set as follows: water quality 3, treatment speed 4, and degradation rate 2. For the water before treatment obtained by filtering water from river 1 through the filter 11, the second filter 12 may have evaluation values set as follows: water quality 1, treatment speed 2, and degradation rate 3.

In the present embodiment, the water supply place information 130 further includes, for each water supply place, reference information of degradation of the filter unit in which the filtration through the first filter 11 is followed by the filtration through the second filter 12 (in-service filter unit degradation reference information). For example, the water supply place information 130 preferably includes reference information of degradation of the filter unit for water from individual water supply places, such as water before treatment that is water from river 1 and water before treatment that is water from river 2.

Furthermore, the water supply place information 130 includes, for the filter unit in which the filtration through the first filter 11 is followed by the filtration through the second filter 12, in-service filter unit evaluation comparison information containing evaluation values regarding the water before treatment at each water treatment place. The evaluation values are associated with the in-service filter function identification information indicating, for example the function and the performance of the filter unit.

In an example, for the water obtained by treating water from river 1, the filter unit may have evaluation values set as follows: water quality 3, treatment speed 4, and degradation rate 2. For the water obtained by treating water from river 2, the filter unit may have evaluation values set as follow: water quality 2, treatment speed 5, and degradation rate 3.

Also in view of a replacement filter, for example, the water supply place information 130 includes, for multiple replacement filters with which the second filter 12 can be replaced, replacement filter degradation reference information similar to the in-service filter degradation reference information, replacement filter unit degradation reference information similar to the in-service filter unit degradation reference information, replacement filter evaluation comparison information similar to the in-service filter evaluation comparison information, and replacement filter unit evaluation comparison information similar to the in-service filter unit evaluation comparison information.

The water treatment management system, when the CPU operates based on the information feeding program stored in the memory, also provides supply water related information to the household water treatment apparatus or the user computer via a wired, wireless, or wired/wireless hybrid communication path.

At this time, the CPU refers to, for example, the reference information of degradation of the in-service filter and the in-service filter unit included in the water supply place information 130. If any type of water before treatment can delay the degradation of the second filter 12 in service and the in-service filter unit including the filters 11 and 12 compared with the rate of degradation caused by the current water before treatment estimated based on the information regarding the performance change, then the CPU transmits the supply water related information that is based on the water supply place information associated with the new water before treatment, to the household water treatment apparatus or the computer.

At this time, the supply water related information is selected and transmitted preferably within water supply places selected based on the positional information regarding the household water treatment apparatus and the positional information regarding each water supply place, or predefined water supply places. The same applies to the processing below.

The water treatment management system, when the CPU operates based on the information feeding program stored in the memory, refers to the evaluation comparison information and the information regarding performance change of the in-service filter and the in-service filter unit included in the water supply place information 130. If any type of water before treatment can delay the degradation of the second filter 12 in service and the in-service filter unit including the filters 11 and 12 compared with the rate of degradation caused by the current water before treatment estimated based on the information regarding the performance change, then the CPU transmits the supply water related information that is based on the water supply place information associated with the new water before treatment, to the household water treatment apparatus or the computer.

The water treatment management system, when the CPU operates based on the information feeding program stored in the memory, refers to the evaluation comparison information regarding the in-service filter and the evaluation comparison information regarding the replacement filters included in the water supply place information 130. If any combination of a water supply place and the second filter 12 in service or a replacement filter meets a predetermined standard, then the CPU transmits the information regarding the combination as the supply water related information.

In addition, the water treatment management system refers to the evaluation comparison information regarding the in-service filter unit and the evaluation comparison information regarding the replacement filter units included in the water supply place information 130. If any combination of a water supply place and a filter unit including the first and second filters 11 and 12 in service or a replacement filter unit meets a predetermined standard, then the CPU transmits the information regarding the combination as the supply water related information.

The water treatment management system, when the CPU acts based on a request storing program stored in the memory, for example, receives and stores a user request from the household water treatment apparatus or the user computer. For example, a user request received and stored indicates water quality 2, treatment speed 5, and the like.

The water treatment management system then determines the predetermined standard based on the user request. If any combination meets the standard, the water treatment management system transmits the information regarding the combination as the supply water related information.

For example, if a combination of water before treatment from river 1 and a replacement filter unit 2 meets the standard, the water treatment management system transmits the information regarding the combination.

The transmission may also be accompanied with evaluation information related to the request from the user. For example, when the replacement filter unit 2 has evaluation comparison information including water quality 2, treatment speed 5, and degradation rate 2 for water before treatment from river 1, the evaluation comparison information may be transmitted as evaluation information for user evaluation. Other information may also be transmitted as evaluation information.

A third embodiment of the present invention will now be described.

A household water treatment apparatus according to the present embodiment includes every component of the household water treatment apparatus according to the second embodiment. A water treatment management system according to the present embodiment also includes every component of the water treatment management system according to the second embodiment.

The in-service filter information 110 in the water treatment management system includes treated water quality reference information that is quality prediction data regarding water treated through the same or the same type of filter as the in-service filter (in-service filter treated water quality reference information) for individual types of reference water before treatment. Each type of reference water before treatment may be any type of water described in the first embodiment. The in-service filter information 110 preferably includes treated water quality reference information regarding water obtained by treating each of the individual types of water before treatment through the second filter 12. The in-service filter information 110 also preferably includes similar treated water quality reference information for the first filter 11.

In the present embodiment, the in-service filter information 110 further includes, for each of the individual types of reference water before treatment, treated water quality reference information of the filter unit in which the filtration through the first filter 11 is followed by the filtration through the second filter 12 (in-service filter unit treated water quality reference information).

Also in view of a replacement filter, for example, the in-service filter information 110 includes, for multiple replacement filters with which the second filter 12 can be replaced, replacement filter treated water quality reference information similar to the in-service filter treated water quality reference information, and replacement filter unit treated water quality reference information similar to the in-service filter unit treated water quality reference information.

The water treatment management system, when the CPU operates based on the information feeding program stored in the memory, refers to the in-service filter treated water quality reference information, the in-service filter unit treated water quality reference information, the replacement filter treated water quality reference information, and the replacement filter unit treated water quality reference information, or refers to the information regarding the performance change, the replacement filter treated water quality reference information, and the replacement filter unit treated water quality reference information. If any of the replacement filters or the replacement filter units can improve the quality of the treated water for the water type estimated in the water type estimation means compared with, for example, the filter 12 in service or the in-service filter unit including the filters 11 and 12, then the CPU transmits the filter replacement information including information regarding the replacement filter or the replacement filter unit to the household water treatment apparatus or the computer.

The water treatment management system, when the CPU operates based on the information feeding program stored in the memory, refers to one or both of the in-service filter type identification information and the in-service filter (filter unit) function identification information, and the replacement filter (filter unit) treated water quality reference information, or refers to the information regarding the performance change and the replacement filter (filter unit) treated water quality reference information. If any of the replacement filters and the replacement filter units can improve the quality of the treated water for the water type estimated in the water type estimation means compared with the second filter 12 in service or the in-service filter unit including the filters 11 and 12, then the CPU transmits the filter replacement information including information regarding the replacement filter or the replacement filter unit to the household water treatment apparatus or the computer.

The water treatment management system, when the CPU operates based on the information feeding program stored in the memory, refers to the replacement filter (filter unit)

treated water quality reference information. If any of the replacement filters and the filter units can improve the quality of the treated water for the water type estimated in the water type estimation means compared with the second filter 12 in service or the filter unit including the filters 11 and 12, then the CPU transmits the filter replacement information including information regarding the replacement filter or the replacement filter unit to the household water treatment apparatus or the computer.

A fourth embodiment of the present invention will now be described.

A household water treatment apparatus according to the present embodiment includes every component of the household water treatment apparatus according to the third embodiment. A water treatment management system according to the present embodiment also includes every component of the water treatment management system according to the third embodiment.

The water supply place information 130 in the water treatment management system includes treated water quality reference information that is quality prediction data regarding water treated through the same or the same type of filter as the in-service filter (in-service filter treated water quality reference information) for water before treatment from individual water supply places. The water before treatment from each water supply place may be any type of water before treatment described in the second embodiment. The water supply place information 130 preferably includes treated water quality reference information regarding water obtained by treating water before treatment from each water supply place through the second filter 12. The water supply information 130 also preferably includes similar treated water quality reference information for the first filter 11.

The water supply place information 130 further includes treated water quality reference information of the filter unit in which the filtration through the first filter 11 is followed by the filtration through the second filter 12 (in-service filter unit treated water quality reference information) for water before treatment from each of the individual water supply places.

Also in view of a replacement filter, for example, the water supply place information 130 includes, for multiple replacement filters with which the second filter 12 can be replaced, replacement filter treated water quality reference information similar to the in-service filter treated water quality reference information, and replacement filter unit treated water quality reference information similar to the in-service filter unit treated water quality reference information.

The water treatment management system, when the CPU operates based on the information feeding program stored in the memory, refers to in-service filter (filter unit) treated water quality reference information. If any type of water before treatment can be treated into treated water higher in quality than the treated water obtained by treating the current water before treatment through the filter 12 in service and the filter unit including the filters 11 and 12, then the CPU transmits supply water related information associated with the new water before treatment to the household water treatment apparatus or the computer.

The water treatment management system, when the CPU operates based on the information feeding program stored in the memory, refers to the in-service filter (filter unit) evaluation comparison information and the information regarding performance change included in the water supply place information. If any type of water before treatment can be treated into treated water higher in quality than the water obtained by treating the water before treatment through the filter 12 in service and the filter unit including the filters 11 and 12, then the CPU transmits supply water related information associated with the new water before treatment to the household water treatment apparatus or the computer.

The water treatment management system includes an information receiver. When the CPU operates based on the information receiving program stored in the memory, the receiver receives, from the household water treatment apparatus, information regarding the quality of water that has passed through the in-service filter unit including the filters 11 and 12. The household water treatment apparatus includes sensors such as an electric conductivity sensor and an odor sensor downstream of the filter 12. The household water treatment apparatus creates information regarding the quality of the passed water based on the detection results from these sensors, and transmits the created information to the water treatment management system.

The water treatment management system, when the CPU operates based on the information feeding program stored in the memory, refers to the in-service filter (filter unit) treated water quality reference information and the information regarding the quality of the passed water included in the water supply place information 130. If any of the water supply places provides water having a quality that can be improved in predetermined parameters after passing through the in-service filter unit including the filters 11 and 12 compared with the quality of the passed water, then the CPU transmits the supply water related information associated with the water supply place to the household water treatment apparatus or the computer.

A system for body wash according to a fifth embodiment of the present invention will now be described with reference to the drawings.

Figure 5:
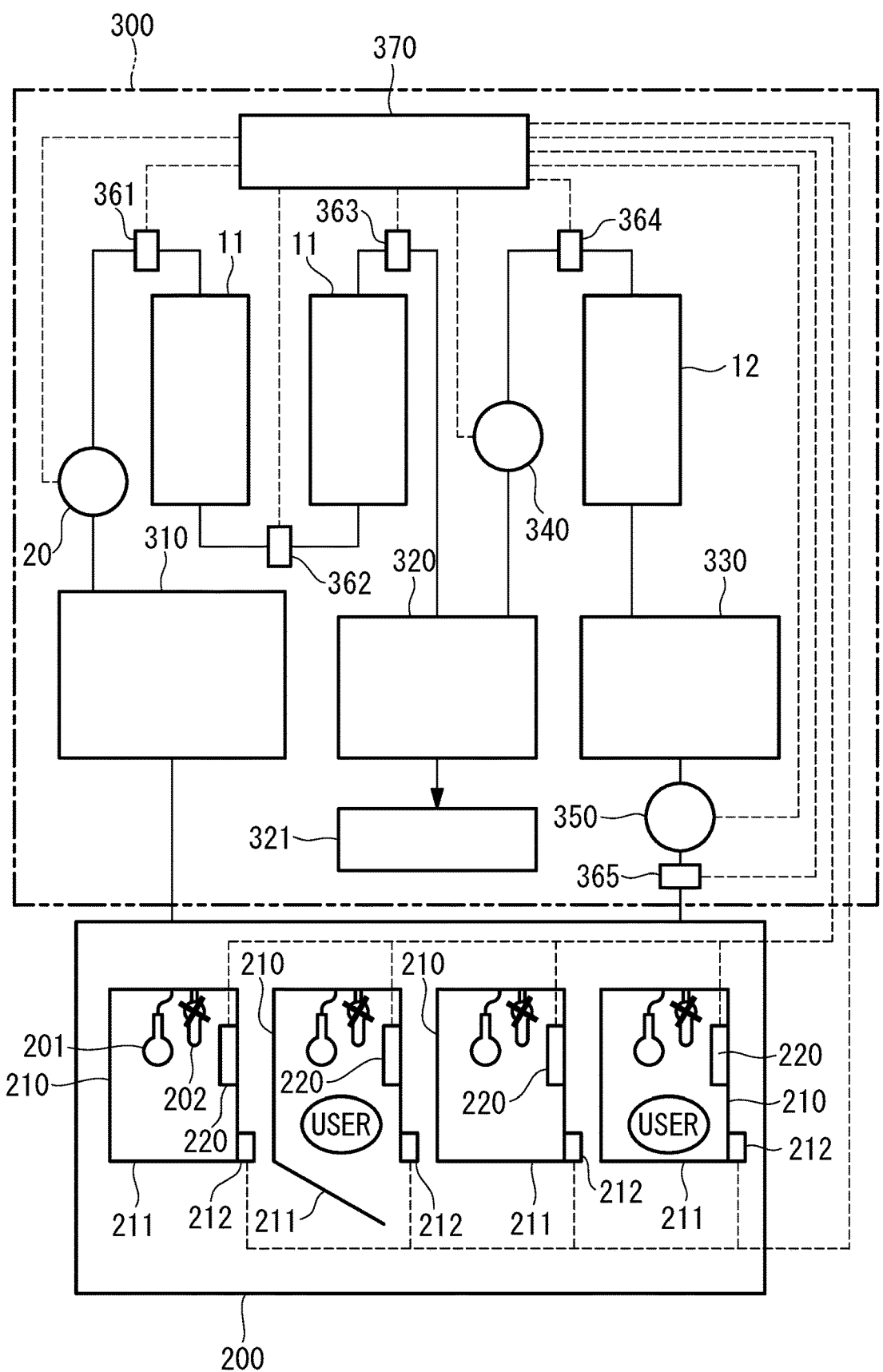
FIG. 5 is a schematic diagram of a water treatment system according to a fifth embodiment of the present invention.

An example of the system for body wash is illustrated in FIG. 5. The system for body wash includes a body washing main section 200 and a household water treatment apparatus 300. The body washing main section 200 includes multiple body washing rooms 210 each having water outlets for body washing such as a shower head 201 and a faucet 202, a door 211 for closing the body washing room 210, and a locking mechanism 212 for locking the closed door 211.

The household water treatment apparatus 300 partially includes the configurations of the household water treatment apparatuses according to the first to fourth embodiments. Although the household water treatment apparatus 300 may include the same configurations as in the household water treatment apparatuses according to the first to fourth embodiments, the household water treatment apparatus 300 in the present embodiment includes, as an example, a wastewater tank 310 that stores water before treatment (wastewater) coming from each body washing room 210 in the body washing main section 200, a pump 20 that allows the water before treatment in the wastewater tank 310 to flow through a first type of first filter 11 and a second type of first filter 11 and allows the treated water that has passed through the second type of first filter 11 to flow to a buffer tank 320, a second filter pump 340 that allows the water accumulated in the buffer tank 320 to pass through a second filter 12 and flow to a water storage tank 330, and a treated water feed pump 350 that sends the treated water accumulated in the water storage tank 330 to the shower head 201, the faucet 202, and the like in each body washing room 210. The household water treatment apparatus 300 may also include a concentrated water storage tank 321 that stores sediment, sediment containing water, sludge, and the like received from the buffer tank 320.

The first type of first filter 11, the second type of first filter 11, the second filter 12, and the pump 20 may be the same as those in the first to fourth embodiments. For example, the first type of first filter 11 may be a sediment filter, the second type of first filter 11 may be a filter with activated carbon, and the second filter 12 may be a filter with a reverse osmosis membrane. The second filter pump 340 and the treated water feed pump 350 may be various types of known water feed pumps.

The household water treatment apparatus 300 includes a first sensor 361 that detects the water quality, the water pressure, the flow rate, and the like of water before treatment flowing from the wastewater tank 310 to the first type of first filter 11, a second sensor 362 that detects the water quality, the water pressure, the flow rate, and the like of water flowing from the first type of first filter 11 to the second type of first filter 11, a third sensor 363 that detects the water quality, the water pressure, the flow rate, and the like of water flowing from the second type of first filter 11 to the buffer tank 320, a fourth sensor 364 that detects the water quality, the water pressure, the flow rate, and the like of water flowing from the buffer tank 320 to the second filter 12, and a fifth sensor 365 that detects the water quality, the water pressure, the flow rate, and the like of treated water fed from the water storage tank 330 to each shower head 201 and each faucet 202 in the body washing main section 200.

The water quality detection includes the detection of the types of foreign matter ingredients, the detection of the amount of foreign matter ingredients, the detection of odor, and the like. The water quality is detected using an electric conductivity sensor and an odor sensor. The water pressure is detected using a water pressure sensor, and the flow rate is detected using a flowmeter. Each of the sensors 361 to 365 may detect the water quality, the water pressure, and the flow rate. In other cases, each sensor may detect any of the water quality, the water pressure, or the flow rate. It is noted that all the first to fifth sensors 361 to 365 may not be equipped, and the sensors can be removed as appropriate in accordance with the desired function.

The household water treatment apparatus 300 has a control unit 370 that is a computer including a CPU, a memory device, a display, and a transmitter/receiver. The control unit 370 is connected to the pumps 20, 340, and 350, the sensors 361 to 365, a display 220 or a voice generator installed in each body washing room 210, and the locking mechanism 212 for each body washing room 210. The control unit 370 controls these components, receives information from these components, and transmits information to these components.

The body washing main section 200 includes a clean water pipe that distributes treated water sent from the treated water feed pump 350 to the shower head 201, the faucet 202, and the like in each body washing room 210. The body washing main section 200 also includes a wastewater pipe that sends water before treatment from the drain of each body washing room 210 to the wastewater tank 310 in the household water treatment apparatus 300.

Figure 6:
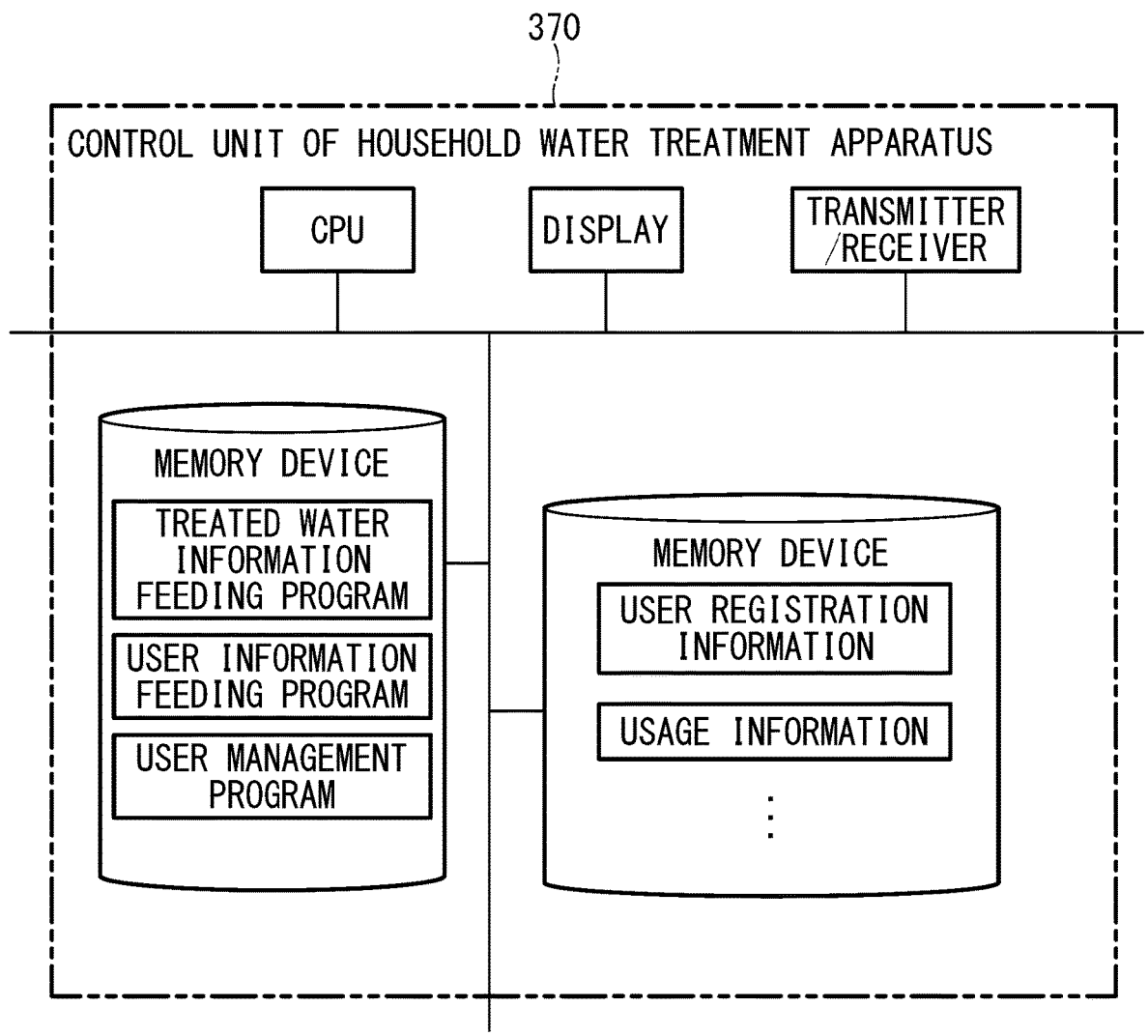
FIG. 6 is a schematic diagram of a control unit in a household water treatment apparatus according to the fifth embodiment.

As shown in FIG. 6, while a user is using treated water in a body washing room 210, the control unit 370, when the CPU operates based on a treated water information feeding program stored in the memory device, transmits information regarding the treated water quality detected by the fifth sensor 365 to the display 220 or the voice generator in the body washing room 210. This information enables the user to understand the conditions of the treated water being fed. The fifth sensor 365 may be positioned to detect the water quality of treated water flowing immediately downstream of the second filter 12 or treated water within the water storage tank 330.

The display 220 may have an input unit to control the household water treatment apparatus. When a user enters an instruction regarding water quality into the input unit, the instruction signal may be transmitted to the control unit 370, and the control unit 370 may control the working speed of each of the pumps 20, 340, and 350 in accordance with the instruction signal. If the household water treatment apparatus 300 is one of the household water treatment apparatuses according to the first to fourth embodiments, the control unit 30 may control the pump 20 and valves 41 to 45 in accordance with instruction signals.

For example, if the user instruction demands that the water quality be traded off for an increase in the speed of water treatment because of an insufficient water feed, the control unit 30 controls the valves 41 to 44 to cause water before treatment to pass merely through the first filter 11 without passing through the second filter 12. Alternatively, if simply increasing the speed of the pump 20 can trade off the water quality for an increase in the speed of water treatment, the rotational speed of the pump 20 is increased.

If the household water treatment apparatus 300 is the household water treatment apparatus according to one of the first to fourth embodiments, the control unit 370, when the CPU operates based on a user information feeding program stored in the memory device, transmits information items such as detection results from the sensors, working state information, information regarding performance change, filter replacement information received from the water treatment apparatus management system, and water supply place information to the display 220 or the voice generator in each body washing room 210. These information items may be transmitted only while a user is using the body washing room.

The control unit 370, when the CPU operates based on a user management program stored in the memory device, receives application-for-use information from the user computer or an input unit provided in the system for body wash. The application-for-use information includes a user ID, the room number of one of the body washing rooms 210 that is desired to be used, and a desired time period for use of the room. The control unit 370 stores the name of a user, the ID of the user, the way of charging the user, the associated billing address, and the user key information in the memory device in association with each other. When the control unit 370 receives application-for-use information, or in the screen for receiving application-for-use information, the control unit 370 determines whether the user ID in the application-for-use information corresponds to the user in the user registration information. If they correspond to each other, the control unit 370 receives the application-for-use information.

In accordance with the received application-for-use information, the control unit 370 transmits unlocking information to the locking mechanism 212 for the body washing room 210 corresponding to the desired room number so that the locking mechanism 212 can be unlocked with the user key information. This allows a system for body wash located in a shared space to be used only by a particular user. Thus, the cost of maintenance can be shared by registered individuals, and the system can charge for each use.

Each time a body washing room 210 is used, the control unit 370, when the CPU operates based on the user management program stored in the memory device, stores usage information regarding the body washing room 210 in the memory device in association with the user who has used the room. For example, usage information is data containing a use time period and an amount of used water associated with a user who has used the room.

As a result, the usage for each user can be checked, and thus usage-based charging and calling a user's attention to the usage are possible.

The system for body wash is an example of a water treatment system, and may also be configured as water treatment systems for various types of wastewater, such as a toilet wastewater treatment system, a laundry wastewater treatment system, a cooking wastewater treatment system, a dish washing wastewater treatment system, and a lavatory wastewater treatment system.

For example, in a toilet wastewater treatment system, each body washing room 210 is a toilet room. In a laundry wastewater treatment system, each body washing room 210 is a laundry room. The number and the type of filters may be changed as appropriate depending on the applications of the water treatment system.

A household water treatment apparatus according to a sixth embodiment of the present invention will now be described with reference to the drawings.

Figure 7:
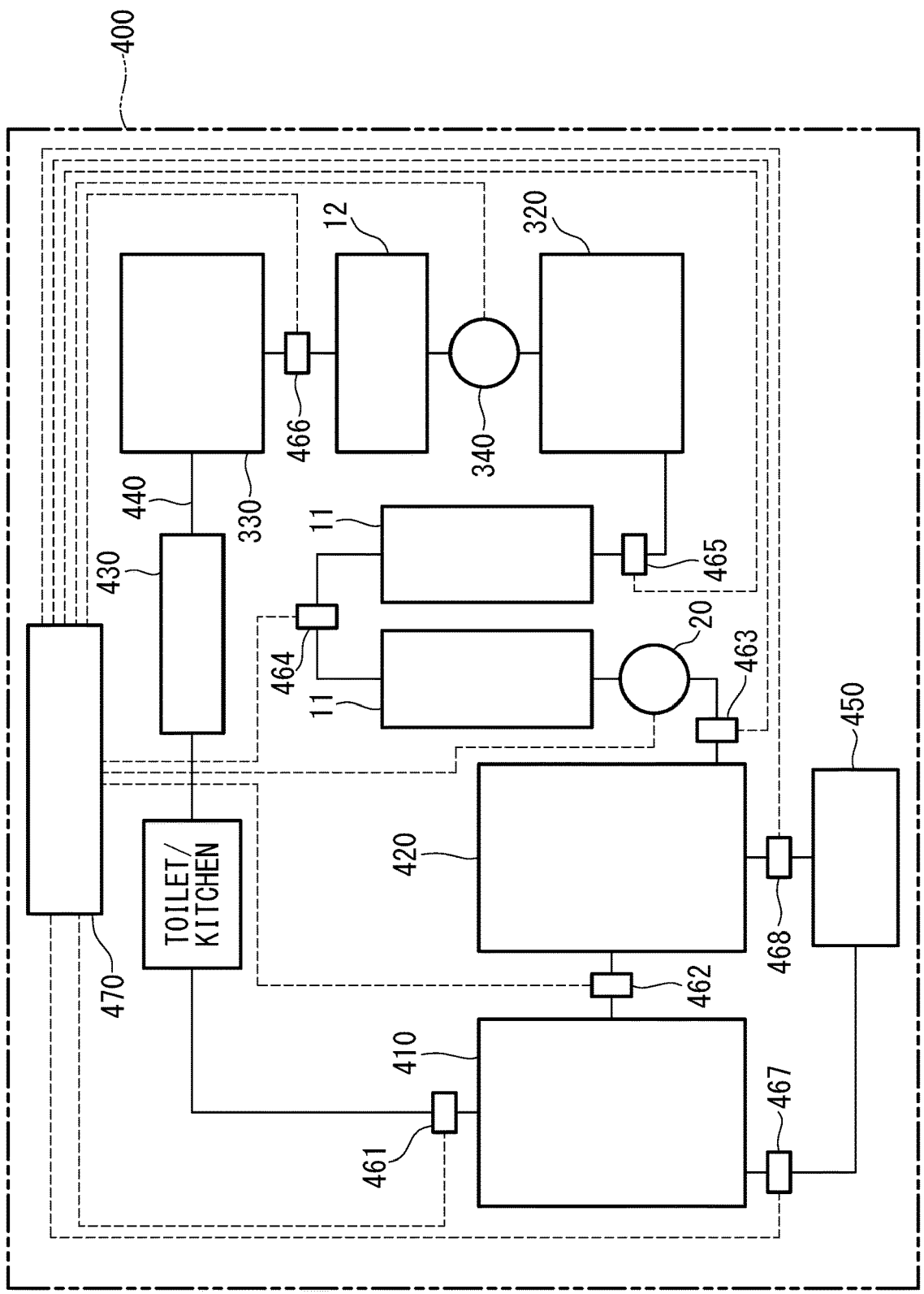
FIG. 7 is a schematic diagram of a household water treatment apparatus according to a sixth embodiment of the present invention.

A household water treatment apparatus 400 is shown in FIG. 7 as an example. The household water treatment apparatus 400 partially includes the configurations of the household water treatment apparatuses according to the first to fifth embodiments. The household water treatment apparatus 400 includes a wastewater (water before treatment) tank 410 that stores water before treatment coming from an excrement disposer such as a toilet and tools or machines to wash foods and dishes such as a sink in a kitchen, a biological treatment tank 420 that receives an inflow of water with sludge and water with large foreign matter removed from the water before treatment in the wastewater tank 410, a pump 20 that allows the water in the biological treatment tank 420 to flow through a first type of first filter 11 and a second type of first filter 11 and allows the treated water that has passed through the second type of first filter 11 to flow to a buffer tank 320, a second filter pump 340 that allows the water accumulated in the buffer tank 320 to pass through a second filter 12 and flow to a water storage tank 330, and a feed pipe 440 that allows the treated water accumulated in the water storage tank 330 to pass through a disinfection unit 430 and causes the resulting water to flow to the excrement disposer or the food and dish washer. The household water treatment apparatus 400 may also include a concentrated water storage tank 450 that stores sediment, sediment containing water, sludge, and the like received from the wastewater tank 410 and the biological treatment tank 420.

In the present embodiment, the first type of first filter 11 is a filter including, for example, a UF membrane.

The water before treatment tank 410, which functions as a filter for removing sludge and large foreign matter from water before treatment, may be referred to as a third type of first filter 11. The biological treatment tank 420, which functions as a filter for removing predetermined matter from water before treatment using microorganisms, may be referred to as a fourth type of first filter 11.

The household water treatment apparatus 400 includes sensors 461 to 468 that detect the water quality, the water pressure, the flow rate, and the like at each spot. Each of the sensors 461 to 468 may detect the water quality, the water pressure, and the flow rate. In other cases, each sensor may detect any of the water quality, the water pressure, or the flow rate. It is noted that all the sensors 461 to 468 may not be equipped, and the sensors may be removed as appropriate in accordance with the desired function.

The household water treatment apparatus 400 has a control unit 470 that is a computer including a CPU, a memory device, a display, and a transmitter/receiver. The control unit 470 is connected to the pumps 20 and 340, and the sensors 461 to 468. The control unit 470 controls these components, receives information from these components, and transmits information to these components.

The control unit 470 of the household water treatment apparatus 400 may be the same as the control unit 30 of the household water treatment apparatus according to each of the first to fourth embodiments. In this case, the control unit 370 causes filter replacement information, water supply place information, and other information received from the water treatment apparatus management system according to each of the first to fourth embodiments to appear on the display of the household water treatment apparatus 400.

The filter replacement information includes replacement filter information regarding the first to fourth types of first filters 11, replacement filter information regarding the second filter 12, and replacement filter information regarding a filter unit including the first to fourth types of first filters 11 combined with the second filter 12.

The water supply place information is based on the first to fourth types of first filters 11 and the second filter 12.

In the household water treatment apparatus 400, the control unit 470 can also control an agitating means (e.g., an air blower, a propeller stirrer) in the biological treatment tank 420 in accordance with operation instruction information received from the water treatment apparatus management system according to each of the first to fourth embodiments.

In this case, the water treatment apparatus management system receives from the household water treatment apparatus 400, structural information regarding the current filter unit and detection values from the sensors 461 to 468, and creates the operation instruction information based on the received information.

A conventional water supply and sewerage systems in Japan need pipe networks laid underground, and thus the establishment of the water supply and sewerage systems involves huge-scale construction. For this reason, countries including Japan have spent enormous amounts of money over decades of construction periods to establish the current water supply and sewerage systems.

However, the pipe networks need maintenance a few decades after they are laid underground, and thus the maintenance is to be performed before the completion of the water supply and sewerage systems. The maintenance also involves huge-scale construction, which increases the maintenance costs.

Countries where water supply and sewerage systems are less established than Japan will establish water supply and sewerage systems in the future. However, the establishment similarly requires huge-scale construction, the costs for the construction, the huge-scale construction for the maintenance performed a few decades later, and the costs for the maintenance, as described above.

Furthermore, the current water supply and sewerage systems cannot cope with a sudden sharp increase or decrease in population. Also in this respect, the current systems are unsuitable as future water supply and sewerage systems.

In addition, the current water supply and sewerage systems are suitable for areas rich in water resources. In areas with limited water resources, the current systems are unable to serve or are not planned to be established.

The present invention has been made in view of these circumstances. An object of this invention is to provide a water treatment apparatus management system, a household water treatment apparatus, and a water treatment system that require no huge-scale construction, can cope with a sudden sharp increase or decrease in population, and enable wastewater treatment and feeding of water to be used even in areas with limited water resources.

The following aspects of the present invention are derived from the aforementioned disclosure.

A first aspect of the present invention is a water treatment apparatus management system which manages a household water treatment apparatus, the household water treatment apparatus that is located at or near a place of water use and that treats water before treatment with at least one type of filter to produce treated water to be fed to the place of water use. The water treatment apparatus management system includes: a filter information storage unit that stores information regarding an in-service filter used in the household water treatment apparatus; an information receiver that receives information regarding performance change of the in-service filter from the household water treatment apparatus; and a water type estimation means that estimates a water type of the water before treatment based on the information regarding performance change and the information regarding the in-service filter. The information regarding the in-service filter includes reference information of performance change of the same or the same type of filter as the in-service filter for each of plural types of reference water before treatment.

This aspect uses the reference information of performance change of the same or the same type of filter as the in-service filter for each of the individual types of reference water before treatment, and also the information regarding performance change about the filter used currently. Although the usage modes of the household water treatment apparatus, the use applications of the treated water, and the types of the water before treatment may vary and, of course, change, the use of the above information items can improve the accuracy of the water type estimation for each of the various usage modes and the use applications of the treated water.

More specifically, a typical water treatment facility has various use applications of treated water and various types of water before treatment, and is large enough to cope with their possible changes. In other words, such a typical water treatment facility treats all types of water before treatment in the same manner, and thus the facility tends to be large to achieve the water treatment process that can deal with all the types of water before treatment.

In contrast, the household water treatment apparatus in this aspect can improve the accuracy of water type estimation of water before treatment irrespective of the usage mode, the use application of treated water, and the type of water before treatment. Thus, the household water treatment apparatus is highly advantageous to water treatment that is suitable for the type of water before treatment, and this apparatus may have a smaller water treatment unit that treats water. This eliminates the need for huge-scale construction, resulting in the advantage of being capable of coping with a sudden sharp increase or decrease in population. The apparatus also allows the treatment of wastewater and feeding of water for use in areas with limited water resources.

A second aspect of the present invention is a water treatment apparatus management system which manages a household water treatment apparatus, the household water treatment apparatus that is located at or near a place of water use and that treats water before treatment with at least one type of filter to produce treated water to be fed to the place of water use. The water treatment apparatus management system includes: a filter information storage unit that stores information regarding an in-service filter used in the household water treatment apparatus; an information receiver that receives information regarding performance change of the in-service filter from the household water treatment apparatus; and a water type estimation means that estimates a water type of the water before treatment based on the information regarding performance change and the information regarding the in-service filter. The information regarding the in-service filter includes at least one of in-service filter type identification information and in-service filter function identification information. The in-service filter type identification information identifies at least one of a type, a specification, a product number, and a name of the in-service filter, whereas the in-service filter function identification information indicates at least one of a function and a performance of the in-service filter.

This aspect uses at least one of the in-service filter type identification information and the in-service filter function identification information, and also the information regarding performance change about the filter used currently. Although the usage modes of the household water treatment apparatus, the use applications of the treated water, and the types of the water before treatment may vary and, of course, change, the use of the above information items can improve the accuracy of the water type estimation for each of the various usage modes and the use applications of the treated water.

For example, the information about various performance changes of the in-service filter caused by various types of water before treatment has been already obtained, or the information about the performance changes has been properly simulated, and the whole of or a part of the specifications of the in-service filter can be prepared based on the information about the various performance changes or the simulation results. Alternatively, the information about the various performance changes or the simulation results can be linked with the information on the type, the product number, and the name of the in-service filter. The more performance data of the in-service filter accumulates, the more estimation of the performance change in the in-service filter using the type, the product number, the name, and the specifications becomes accurate, resulting in an improvement in the accuracy of the in-service filter function identification information.

A third aspect of the present invention is a water treatment apparatus management system which manages a household water treatment apparatus, the household water treatment apparatus that is located at or near a place of water use and that treats water before treatment with a filter unit to produce treated water to be fed to the place of water use. The water treatment apparatus management system includes: a filter information storage unit that stores information regarding an in-service filter unit used in the household water treatment apparatus; an information receiver that receives information regarding performance change of the in-service filter unit from the household water treatment apparatus; and a water type estimation means that estimates a water type of the water before treatment based on the information regarding performance change and the information regarding the in-service filter unit. The information regarding the in-service filter unit includes reference information of performance change of the same or the same type of filter unit as the in-service filter unit for each of plural types of reference water before treatment.

The filter unit is not a single component, but formed of a number of components. Thus, different combinations of components may often change the performance of the entire filter unit. For example, even if a filter unit has two filters and the performance and the tendency in performance change of each filter are known, the performance or the tendency in performance change of the filter unit cannot be estimated based on the performance and the tendency in performance of each filter in many cases. In addition, the performance and the tendency in performance change of the filter unit will vary depending on the usage modes of the household water treatment apparatus, the use applications of the treated water, and the types of the water before treatment.

This aspect uses the reference information of performance change of the same or the same type of filter unit as the in-service filter unit for each type of reference water before treatment, and also the information regarding performance change about the filter unit used currently. Although the usage modes of the household water treatment apparatus, the use applications of the treated water, and the types of the water before treatment may vary and, of course, change, the use of the above information items can improve the accuracy of the water type estimation for each of the various usage modes and the use applications of the treated water.

A fourth aspect of the present invention is a water treatment apparatus management system which manages a household water treatment apparatus, the household water treatment apparatus that is located at or near a place of water use and that treats water before treatment with a filter unit to produce treated water to be fed to the place of water use. The water treatment apparatus management system includes: a filter information storage unit that stores information regarding an in-service filter unit used in the household water treatment apparatus; an information receiver that receives information regarding performance change of the in-service filter unit from the household water treatment apparatus; and a water type estimation means that estimates a water type of the water before treatment based on the information regarding performance change and the information regarding the in-service filter unit. The information regarding the in-service filter unit includes at least one of in-service filter unit type identification information and in-service filter unit function identification information. The in-service filter unit type identification information identifies at least one of a type, a specification, a product number, and a name of the in-service filter unit, whereas the in-service filter unit function identification information indicates at least one of a function and a performance of the in-service filter unit.

This aspect uses at least one of the in-service filter unit type identification information and the in-service filter unit function identification information, and also the information regarding performance change about the filter unit used currently. Although the usage modes of the household water treatment apparatus, the use applications of the treated water, and the types of the water before treatment may vary and, of course, change, the use of the above information items can improve the accuracy of the water type estimation for each of the various usage modes and the use applications of the treated water.

In each aspect, the filter information storage unit stores replacement filter information that is information about a replacement filter or a replacement filter unit with which the in-service filter or the in-service filter unit can be replaced. The replacement filter information includes reference information of performance change of at least one replacement filter or replacement filter unit for each of plural types of reference water before treatment. Each aspect preferably further includes an information feed means that refers to at least the replacement filter information. If any replacement filter or replacement filter unit can improve the performance change for the water type estimated in the water type estimation means compared with the in-service filter or the in-service filter unit, the information feed means transmits filter replacement information including information about the replacement filter or the replacement filter unit to the household water treatment apparatus or a computer used by a user.

In the aforementioned aspect, if any replacement filter or replacement filter unit can achieve an improvement for the water type estimated in the water type estimation means, the information about the filter or the filter unit is transmitted to the household water treatment apparatus or the computer used by the user. Thus, the user can replace the filter or the filter unit based on the information to improve the filter performance change.

Each aspect preferably further includes an information feed means that transmits operation method information appropriate for the water type estimated in the water type estimation means to the household water treatment apparatus or the computer used by a user, and/or transmits maintenance information appropriate for the water type estimated in the water type estimation means to the household water treatment apparatus or the computer used by the user.

In this case, for example, control signals for controlling the household water treatment apparatus are transmitted as the operation method information appropriate for the estimated water type. When components in the household water treatment apparatus such as a pump and a valve are controlled in accordance with the control signals, the household water treatment apparatus can act appropriately in accordance with the water type of the water before treatment. Additionally, when the user sees the operation method information or the maintenance information that appears on the display of the household water treatment apparatus or the computer display, the user can take appropriate measures.

Each aspect preferably further includes a filter information creation means that accumulates at least one of the information regarding performance change regarding the in-service filter and the information regarding performance change about the in-service filter unit, and at least the water type estimated in the water type estimation means. The filter information creation means uses the accumulated information to create at least one of the reference information of performance change of the in-service filter, the reference information of performance change of the in-service filter unit, and the replacement filter information.

In this case, although the usage modes of the household water treatment apparatus, the use applications of the treated water, and the types of the water before treatment may vary, a large number of household water treatment apparatuses used currently allow the collection of data on each of the use situations, the use applications of the treated water, and the types of the water before treatment under actual situations. As a result, practical reference information of performance change of the in-service filter, reference information of performance change of the in-service filter unit, and replacement filter information are created.

In each aspect, preferably, the water treatment apparatus management system receives user input information including at least one of the use application of water in the place of water use, the specific quality of the water before treatment, and the source of the water before treatment from the household water treatment apparatus or a computer used by a user, and the water type estimation means estimates the water type also using the user input information. The user input information contributes to an improvement in the accuracy of the water type estimation.

A household water treatment apparatus according to a fifth aspect of the present invention includes: a water before treatment inlet; a filter unit or a filter through which water before treatment after coming from the water before treatment inlet passes; a pump that is located upstream or downstream of the filter unit or the filter and that brings the water before treatment into the filter unit or the filter; a treated water outlet through which treated water treated by passing through the filter unit or the filter goes out; and a control unit that receives filter replacement information from the water treatment apparatus management system.

A household water treatment apparatus according to a sixth aspect of the present invention includes: a water before treatment inlet; a filter unit or a filter through which water before treatment after coming from the water before treatment inlet passes; a pump that is located upstream or downstream of the filter unit or the filter and that brings the water before treatment into the filter unit or the filter; a treated water outlet through which treated water treated by passing through the filter unit or the filter goes out; and a control unit that controls at least the pump. The control unit controls the pump based on operation method information received from the water treatment apparatus management system.

A seventh aspect of the present invention is a water treatment apparatus management system for managing a household water treatment apparatus that can treat water before treatment to feed treated water. The water treatment apparatus management system includes an information storage unit that receives and stores information on, for example, whether water treating components such as a filter and a pump are installed in the household water treatment apparatus, a type of each component, a rated function of each component, and a function currently performed. The system receives sensing results or estimation results regarding, for example, the water quality and the amount of water treated by the household water treatment apparatus from the household water treatment apparatus, and maintains the optimum working of the components based on the sensing results or the estimation results and the information stored in the information storage unit, or performs control to achieve the optimum working state.

In the aforementioned aspect, the water treatment apparatus management system manages the household water treatment apparatus, and the household water treatment apparatus treats the water before treatment and feeds the treated water. Thus, for example, if individual homes and commercial facilities each have the household water treatment apparatus in its place of water use, and the household water treatment apparatus is managed by the water treatment apparatus management system, wastewater treatment and feeding of water for use are enabled in each of the homes and the facilities without large-scale construction. The system and the apparatus can cope with a sudden sharp increase or decrease in population because no large-scale construction is needed. The system and the apparatus are also appropriate for areas with limited water resources because they can treat water before treatment and feed treated water.

An eighth aspect of the present invention depends on the seventh aspect.

The aspect is a water treatment apparatus management system which manages a household water treatment apparatus, the household water treatment apparatus that is located at or near a place of water use and that treats water before treatment with at least one type of filter and feeds treated water to a predetermined place such as the place of water use.

The water treatment apparatus management system includes:

a filter information storage unit that stores information regarding an in-service filter used in the household water treatment apparatus and information regarding a replacement filter with which the in-service filter can be replaced;

an information feed means that transmits filter replacement information based on the information regarding the in-service filter and/or the replacement filter information to the household water treatment apparatus or a computer used by a user;

an information receiver that receives information regarding performance change of the in-service filter from the household water treatment apparatus; and a water type estimation means that estimates the water type of the water before treatment based on the information regarding performance change and/or the information regarding the in-service filter.

The information regarding the in-service filter includes reference information of degradation of the same or the same type of filter as the in-service filter for individual types of reference water before treatment, whereas the replacement filter information includes reference information of degradation of at least one replacement filter for each type of reference water before treatment.

The information feed means refers to at least the reference information of degradation of the replacement filter, refers to the reference information of degradation of the same or the same type of filter as the in-service filter and the reference information of degradation of the replacement filter, or refers to the information regarding performance change and the reference information of degradation of the replacement filter. If any replacement filter can delay the degradation for the water type estimated in the water type estimation means compared with the in-service filter, the information feed means transmits the filter replacement information including information about the replacement filter to the household water treatment apparatus or the computer.

In the aforementioned aspect, for example, the household water treatment apparatus takes in water as water before treatment used in a shower, and feeds treated water to a shower nozzle. If water for a shower is treated repeatedly in the household water treatment apparatus with some filter unsuitable for a certain type of soap and shampoo used by the user, the treated water treated through this filter may have a low quality.

In the aforementioned aspect, the system refers to the reference information of degradation of the same or the same type of filter as the in-service filter for each of plural types of reference water before treatment and to the reference information of degradation of at least one replacement filter for each of the individual types of reference water before treatment as the replacement filter information, or refers to the information regarding performance change and the reference information of degradation of the replacement filter. If any replacement filter can achieve an improvement in the water type estimated in the water type estimation means, the information regarding the replacement filter is transmitted to the household water treatment apparatus or the computer. Thus, filter degradation can be delayed by the user replacing the filter in accordance with the information.

A ninth aspect of the present invention relates to the seventh aspect.

The ninth aspect is a water treatment apparatus management system which manages a household water treatment apparatus that is located at or near a place of water use, treats water before treatment with at least one type of filter, and feeds treated water to a predetermined place such as the place of water use.

The water treatment apparatus management system includes:

a filter information storage unit that stores information regarding an in-service filter used in the household water treatment apparatus and information regarding a replacement filter with which the in-service filter can be replaced;

an information feed means that transmits filter replacement information based on the information regarding the in-service filter and/or the replacement filter information to the household water treatment apparatus or a computer used by the user;

an information receiver that receives information regarding performance change of the in-service filter from the household water treatment apparatus; and a water type estimation means that estimates a water type of the water before treatment based on the information regarding performance change and/or the information regarding the in-service filter.

The information regarding the in-service filter includes at least one of in-service filter type identification information and in-service filter function identification information. The in-service filter type identification information identifies the type of the in-service filter, including a type, a specification, a product number, and a name of the filter. The in-service filter function identification information indicates a function and a performance of the filter. The replacement filter information includes reference information of degradation of at least one replacement filter for each type of reference water before treatment.

The information feed means refers to one or both of the in-service filter type identification information and the in-service filter function identification information, refers to the reference information of degradation of the replacement filter, or refers to the information regarding performance change and the reference information of degradation of the replacement filter. If any replacement filter can delay the degradation for the water type estimated in the water type estimation means compared with the in-service filter, the water treatment apparatus management system transmits the filter replacement information including information regarding the filter to the household water treatment apparatus or the computer.

Also in the aforementioned aspect, the system refers to one or both of the in-service filter type identification information and the in-service filter function identification information and to the reference information of degradation of the replacement filter, or refers to the information regarding performance change and the reference information of degradation of the replacement filter. If any replacement filter can achieve an improvement in the water type estimated in the water type estimation means, the information regarding the replacement filter is transmitted to the household water treatment apparatus or the computer. Thus, filter degradation can be delayed by the user replacing the water before treatment in accordance with the information.

A tenth aspect of the present invention relates to the seventh aspect.

The tenth aspect is a water treatment apparatus management system which manages a household water treatment apparatus that is located at or near a place of water use, treats water before treatment with at least one type of filter, and feeds treated water to a predetermined place such as the place of water use.

The water treatment apparatus management system includes:

an information receiver that receives information regarding performance change of the in-service filter from the household water treatment apparatus;

a filter information storage unit that stores information regarding the in-service filter used in the household water treatment apparatus; and a water type estimation means that estimates a water type of the water before treatment based on the information regarding performance change and/or the information regarding the in-service filter.

The information regarding the in-service filter includes the reference information of degradation of the same or the same type of filter as the in-service filter for individual types of reference water before treatment.

The system further includes an information feed means that transmits operation method information in accordance with the water type estimation result from the water type estimation means to the household water treatment apparatus, and/or transmits maintenance information in accordance with the water type estimation result from the water type estimation means to the household water treatment apparatus or a computer used by the user.

In the aforementioned aspect, operation method information and/or maintenance information are transmitted in accordance with the water type estimation result from the water type estimation means. The user can only subjectively determine the conditions of the water being used by the user. However, as described above, the system objectively estimates the type of the water being used by the user, and transmits each of aforementioned information based on the estimate. Thus, the user can change the in-service filter in accordance with the information to improve the performance and the durability of the household water treatment apparatus, for example, as an improvement in the operation method.

In the aforementioned aspect, the household water treatment apparatus further includes a pump that sends water to the in-service filter. The information feed means transmits information regarding the operation method for the pump in accordance with the water type estimation result from the water type estimation means.

In the aforementioned aspect, the information feed means transmits information regarding the operation method for the pump appropriate for delaying the degradation in the in-service filter based on the water type estimation result from the water type estimation means.

Each filter has tolerable ranges of water pressures and amounts of water. The ranges include points in water pressure and an amount of water that lead to longer filter life. The points vary depending on the type and the size of the filter, and also depending on the water type. Each household water treatment apparatus has different places for use and different purposes for use, and thus the state of water before treatment varies widely. For this reason, the present aspect is highly effective in increasing the filter life because this aspect provides information regarding the operation method for longer filter life based on the water type estimation result.

To transmit the information regarding the operation method for the pump based on the water type estimation result, in an example, the water treatment apparatus management system has data in the memory device on the water pressure range or the amount of water range appropriate for each water type in association with filter types. By referring to such data, the system can provide information regarding the operation method in accordance with the estimated water type for each filter type.

In the aforementioned aspect, in detail, the household water treatment apparatus further includes a pump that sends water to the in-service filter unit. The information feed means transmits information regarding the operation method for the pump in accordance with the water type estimation result from the water type estimation means.

In the aforementioned aspect, the information feed means transmits information regarding the operation method for the pump appropriate for delaying the degradation in the whole of or a part of the in-service filter unit based on the water type estimation result from the water type estimation means.

As described above, each filter has tolerable ranges of water pressures and amounts of water, and the ranges include points in water pressure and amounts of water that lead to longer filter life. The optimized points are more complex for a combination of two or more filter units. More specifically, the points vary depending on the combination of filter units, and also depending on the water type. Also as described above, each household water treatment apparatus has different places and purposes for use, and thus the state of water before treatment varies widely. For this reason, the present aspect is highly effective in increasing the life of the whole of or a part of the filter unit because this aspect provides information regarding the operation method for longer filter/filter unit life based on the water type estimation result.

To transmit the information regarding the operation method for the pump based on the water type estimation result, in an example, the water treatment apparatus management system has data in the memory device on the water pressure range or the amount of water range appropriate for each water type in association with filter unit types. By referring to such data the system can provide information regarding the operation method in accordance with the estimated water type for each filter unit type.

An 11th aspect of the present invention relates to the seventh aspect.

The 11th aspect is a water treatment apparatus management system which manages a household water treatment apparatus that is located at or near a place of water use, treats water before treatment with at least one type of filter, and feeds treated water to the place of water use.

The water treatment apparatus management system includes:

a water supply place information storage unit that stores information regarding at least one water supply place allowed to supply water before treatment near the place of water use;

an information feed means that transmits supply water related information based on the information regarding the water supply place to the household water treatment apparatus or a computer used by the user; and an information receiver that receives information regarding performance change of the in-service filter from the household water treatment apparatus.

The information regarding the water supply place includes reference information of degradation of the same or the same type of filter as the in-service filter for water before treatment at each water supply place.

The information feed means refers to the information regarding the water supply place. If any type of water before treatment can delay the degradation of the in-service filter compared with the rate of degradation caused by current water before treatment estimated based on the information regarding performance change, then the information feed means transmits the supply water related information associated with the water before treatment to the household water treatment apparatus or the computer.

The aforementioned aspect is, for example, particularly useful for a case in which various water supply places exist in a periphery of a place of water use. In a specific example, the household water treatment apparatus at a certain point in time may take in water used in a shower as water before treatment and feed treated water to a shower nozzle. If shower water is treated repeatedly in the household water treatment apparatus, repeated water use may lead to gradual deterioration in the quality of the pretreatment and treated water due to, for example, the amount of particular bacteria. An increase in the amount of bacteria accelerates the degradation in the filter for removing them.

As information on a water supply place that can supply substitute water for the current water before treatment, this aspect involves the reference information of degradation of the same or the same type of filter as the in-service filter for water before treatment at the water supply place. The system can thus refer to the information to transmit information regarding the water before treatment that can delay the degradation of the in-service filter compared with the rate of degradation caused by the current water before treatment. Thus, filter degradation can be delayed by the user replacing the water before treatment in accordance with the information.

A 12th aspect of the present invention relates to the seventh aspect.

The 12th aspect is a water treatment apparatus management system which manages a household water treatment apparatus that is located at or near a place of water use, treats water before treatment with at least one type of filter, and feeds treated water to the place of water use.

The water treatment apparatus management system includes:

a filter information storage unit that stores information regarding the in-service filter used in the household water treatment apparatus;

a water supply place information storage unit that stores information regarding at least one water supply place allowed to supply water before treatment near the place of water use;

an information feed means that transmits supply water related information based on the information regarding the water supply place to the household water treatment apparatus or a computer used by the user; and an information receiver that receives information regarding performance change of the in-service filter from the household water treatment apparatus.

The information regarding the water supply place includes in-service filter evaluation comparison information containing evaluation values regarding the water before treatment at each water treatment place associated with at least one of in-service filter type identification information and in-service filter function identification information. The in-service filter type identification information identifies the type of the in-service filter, including a type, a specification, a product number, and a name of the filter. The in-service filter function identification information indicates a function and a performance of the filter.

The information feed means refers to the information regarding the water supply place and the information regarding performance change. If any type of water before treatment can delay the degradation of the in-service filter compared with the rate of degradation caused by current water before treatment, then the information feed means transmits the supply water related information associated with the water before treatment to the household water treatment apparatus or the computer.

The aspect is also, for example, particularly useful for a case in which various water supply places exist in a periphery of a place of water use.

The system includes, as information on a water supply place that can supply substitute water for the current water before treatment, evaluation values regarding the in-service filter for water before treatment at the water supply place. The system can thus refer to the information to transmit information regarding the water before treatment that can delay the degradation of the in-service filter compared with the rate of degradation caused by the current water before treatment. Thus, filter degradation can be delayed by the user replacing the water before treatment in accordance with the information.

A 13th aspect of the present invention relates to the seventh aspect.

The 13th aspect is a water treatment apparatus management system which manages a household water treatment apparatus that is located at or near a place of water use, treats water before treatment with at least one type of filter, and feeds treated water to the place of water use.

The water treatment apparatus management system includes:

a water supply place information storage unit that stores information regarding at least one water supply place allowed to supply water before treatment near the place of water use; and an information feed means that transmits supply water related information based on the information regarding the water supply place to the household water treatment apparatus or a computer used by the user.

The information regarding the water supply place includes in-service filter evaluation comparison information and replacement filter evaluation comparison information. The in-service filter evaluation comparison information contains evaluation values regarding the water before treatment at each water treatment place associated with at least one of in-service filter type identification information and in-service filter function identification information. The in-service filter type identification information identifies the type of the in-service filter, including a type, a specification, a product number, and a name of the filter, whereas the in-service filter function identification information indicates a function and a performance of the filter. The replacement filter evaluation comparison information contains evaluation values regarding the water before treatment at each water treatment place associated with at least one of replacement filter type identification information and replacement filter function identification information. The replacement filter type identification information identifies the types of the replacement filter capable of replacing the in-service filter, such as a type, a specification, a product number, and a name of the filter, whereas the replacement filter function identification information indicates a function and a performance of the filter.

The information feed means refers to the in-service filter evaluation comparison information and the replacement filter evaluation comparison information included in the information regarding the water supply place. If any combination of a water supply place and a replacement filter or an in-service filter meets a predetermined standard, then the information feed means transmits the information regarding the combination as the supply water related information.

The aspect is also, for example, particularly useful for a case in which various water supply places exist in a periphery of a place of water use.

In the aforementioned aspect, the functions of the in-service filter and a replacement filter for water before treatment at various water supply places are stored. If any combination meets the predetermined standard, information regarding the combination is transmitted to the household water treatment apparatus or the computer used by the user. Thus, the quality of treated water and the water treatment speed in the household water treatment apparatus can be improved by the user referring to the information and changing the water before treatment and/or the filter.

In the 13th aspect, preferably, the system further includes a request receiving means that receives a request from the user, and the information feed means determines the predetermined standard.

For example, a user may send a request to improve the water treatment speed even if the water quality deteriorates a little. If any combination of a water supply place and an in-service filter or any combination of a water supply place and a replacement filter meets the request, the combination is transmitted.

More than one combination may be transmitted. Three combinations composed of the combination of a water supply place 1 and an in-service filter, the combination of a water supply place 1 and a replacement filter 1, and the combination of a water supply place 2 and a replacement filter 2 may also be transmitted.

Each combination may also be accompanied with evaluation information related to the request from the user. In this case, the user can compare the evaluation information items to carry out a selection.

The evaluation information may include the treatment speed achieved by each combination, prediction data regarding the quality of treated water, function information such as the degradation rate of a filter, and information regarding replacement costs.

A 14th aspect of the present invention relates to the seventh aspect.

The 14th aspect is a water treatment apparatus management system which manages a household water treatment apparatus that is located at or near a place of water use, treats water before treatment with at least one type of filter, and feeds treated water to a predetermined place such as the place of water use.

The water treatment apparatus management system includes:

a filter information storage unit that stores information regarding an in-service filter used in the household water treatment apparatus and information regarding replacement filters capable of replacing the in-service filter;

an information feed means that transmits filter replacement information based on the information regarding the in-service filter and/or the replacement filter information to the household water treatment apparatus or a computer used by the user;

an information receiver that receives information regarding performance change of the in-service filter from the household water treatment apparatus; and a water type estimation means that estimates a water type of the water before treatment based on the information regarding performance change and/or the information regarding the in-service filter.

The information regarding the in-service filter includes treated water quality reference information of the same or the same type of filter as the in-service filter for individual types of reference water before treatment, whereas the replacement filter information includes treated water quality reference information of at least one replacement filter for each of the individual types of reference water before treatment.

The information feed means refers to the treated water quality reference information of at least the replacement filter, and refers to the treated water quality reference information of the same or the same type of filter as the in-service filter and the treated water quality reference information of the replacement filter, or refers to the information regarding performance change and the treated water quality reference information of the replacement filter. If any replacement filter can improve the quality of the treated water for the water type estimated in the water type estimation means compared with the in-service filter, then the information feed means transmits the filter replacement information including information regarding the replacement filter to the household water treatment apparatus or the computer.

In the aforementioned aspect, for example, the household water treatment apparatus takes in water used in a shower as water before treatment, and feeds treated water to a shower nozzle. If water for a shower is treated repeatedly in the household water treatment apparatus with some filter unsuitable for a certain type of soap and shampoo used by the user, the treated water treated through this filter may have a low quality.

In the aforementioned aspect, the system includes the treated water quality reference information of the same or the same type of filter as the in-service filter for individual types of reference water before treatment and the treated water quality reference information of at least one replacement filter for each of the individual types of reference water before treatment, or the system receives the information regarding performance change of the in-service filter from the household water treatment apparatus. The system then refers to these information items to estimate the water type as described above. If any replacement filter can improve the quality of the treated water for the estimated water type compared with the in-service filter, then the system transmits the filter replacement information including information regarding the replacement filter to the household water treatment apparatus or the computer. Thus, the quality of the treated water can be improved by the user replacing the filter in accordance with the information.

A 15th aspect of the present invention relates to the seventh aspect.

The 15th aspect is a water treatment apparatus management system which manages a household water treatment apparatus that is located at or near a place of water use, treats water before treatment with at least one type of filter, and feeds treated water to the place of water use.

The water treatment apparatus management system includes:

a filter information storage unit that stores information regarding an in-service filter used in the household water treatment apparatus and information regarding replacement filters capable of replacing the in-service filter;

an information feed means that transmits filter replacement information based on the information regarding the in-service filter and/or the replacement filter information to the household water treatment apparatus or a computer used by the user;

an information receiver that receives information regarding performance change of the in-service filter from the household water treatment apparatus; and a water type estimation means that estimates a water type of the water before treatment based on the information regarding performance change and/or the information regarding the in-service filter.

The information regarding the in-service filter includes at least one of in-service filter type identification information and in-service filter function identification information. The in-service filter type identification information identifies the type of the in-service filter, including a type, a specification, a product number, and a name of the filter. The in-service filter function identification information indicates a function and a performance of the filter. The replacement filter information includes treated water quality reference information of at least one replacement filter for each of the individual types of reference water before treatment.

The information feed means refers to one or both of the in-service filter type identification information and the in-service filter function identification information, and the treated water quality reference information of the replacement filter, or refers to the information regarding performance change and the treated water quality reference information of the replacement filter. If any replacement filter can improve the quality of the treated water for the water type estimated in the water type estimation means compared with the in-service filter, then the information feed means transmits the filter replacement information including information regarding the replacement filter to the household water treatment apparatus or the computer.

Also in the aforementioned aspect, the system includes at least one of in-service filter type identification information and in-service filter function identification information, and treated water quality reference information of at least one replacement filter for individual types of reference water before treatment, or the system receives the information regarding performance change of the in-service filter from the household water treatment apparatus. The system then refers to these information items to estimate the water type as described above. If any replacement filter can improve the quality of the treated water for the estimated water type compared with the in-service filter, then the system transmits the filter replacement information including information regarding the replacement filter to the household water treatment apparatus or the computer. Thus, the quality of the treated water can be improved by the user replacing the filter in accordance with the information.

A 16th aspect of the present invention relates to the seventh aspect.

The 16th aspect is a water treatment apparatus management system which manages a household water treatment apparatus that is located at or near a place of water use, treats water before treatment with at least one type of filter, and feeds treated water to the place of water use.

The water treatment apparatus management system includes:

an information receiver that receives information regarding performance change of the in-service filter from the household water treatment apparatus;

a filter information storage unit that stores information regarding an in-service filter used in the household water treatment apparatus and information regarding replacement filters capable of replacing the in-service filter; and a water type estimation means that estimates a water type of the water before treatment based on the information regarding performance change and/or the information regarding the in-service filter.

The information regarding the in-service filter includes reference information of degradation of the same or the same type of filter as the in-service filter for individual types of reference water before treatment. The replacement filter information includes treated water quality reference information of at least one replacement filter for each of the individual types of reference water before treatment.

The information feed means refers to the treated water quality reference information of the replacement filter. If any replacement filter can improve the quality of the treated water for the water type estimated in the water type estimation means compared with the in-service filter, then the information feed means transmits the filter replacement information including information regarding the replacement filter to the household water treatment apparatus or the computer.

Also in the aforementioned aspect, the system includes the reference information of degradation of the same or the same type of filter as the in-service filter for individual types of reference water before treatment and the treated water quality reference information of at least one replacement filter for individual types of reference water before treatment, or the system receives the information regarding performance change of the in-service filter from the household water treatment apparatus. The system then refers to the treated water quality reference information of the replacement filter to estimate the water type. If any replacement filter can improve the quality of the treated water for the estimated water type compared with the in-service filter, then the system transmits the filter replacement information including information regarding the replacement filter to the household water treatment apparatus or the computer. Thus, the quality of the treated water can be improved by the user replacing the filter in accordance with the information.

A 17th aspect of the present invention relates to the seventh aspect.

The 17th aspect is a water treatment apparatus management system which manages a household water treatment apparatus that is located at or near a place of water use, treats water before treatment with at least one type of filter, and feeds treated water to the place of water use.

The water treatment apparatus management system includes:

a water supply place information storage unit that stores information regarding at least one water supply place allowed to supply water before treatment near the place of water use; and an information feed means that transmits supply water related information based on the information regarding the water supply place to the household water treatment apparatus or a computer used by the user.

The information regarding the water supply place includes treated water quality reference information of the same or the same type of filter as the in-service filter for the water before treatment at each water supply place.

The information feed means refers to the treated water quality reference information. If any type of water before treatment can be treated into treated water higher in quality than the treated water obtained by treating current water before treatment with the in-service filter, then the information feed means transmits the supply water related information associated with the water before treatment to the household water treatment apparatus or the computer.

The aspect is, for example, particularly useful for a case in which various water supply places exist in a periphery of a place of water use. In a specific example, the household water treatment apparatus at a certain point in time may take in water used in a shower as water before treatment and feed treated water to a shower nozzle. If shower water is treated repeatedly in the household water treatment apparatus, repeated water use may lead to gradual deterioration in the quality of the pretreatment and treated water due to, for example, the amount of particular bacteria. An increase in the amount of bacteria may accelerate a decrease in the function of the filter or deteriorate the quality of the treated water after passing through the filter.

In the aforementioned aspect, the system includes, as information on a water supply place that can supply substitute water for the current water before treatment, the treated water quality reference information of the same or the same type of filter as the in-service filter for the water before treatment at the water supply place. The system can thus refer to the information to transmit information regarding the water before treatment that can be treated into treated water higher in quality than the treated water obtained by treating the current water before treatment with the in-service filter. The function of the filter and the quality of the treated water can be improved by the user replacing the water before treatment in accordance with the information.

An 18th aspect of the present invention relates to the seventh aspect.

The 18th aspect is a water treatment apparatus management system which manages a household water treatment apparatus that is located at or near a place of water use, treats water before treatment with at least one type of filter, and feeds treated water to the place of water use.

The water treatment apparatus management system includes:

a water supply place information storage unit that stores information regarding at least one water supply place allowed to supply water before treatment near the place of water use; and an information feed means that transmits supply water related information based on the information regarding the water supply place to the household water treatment apparatus or a computer used by the user.

The information regarding the water supply place includes in-service filter evaluation comparison information containing evaluation values regarding the water before treatment at each water treatment place associated with at least one of in-service filter type identification information and in-service filter function identification information. The in-service filter type identification information identifies the type of the in-service filter, including a type, a specification, a product number, and a name of the filter. The in-service filter function identification information indicates a function and a performance of the filter.

The information feed means refers to the information regarding the water supply place and the information regarding performance change. If any type of water before treatment can be treated into treated water higher in quality than the water obtained by treating current water before treatment with the in-service filter, then the information feed means transmits the supply water related information associated with the water before treatment to the household water treatment apparatus or the computer.

The aspect is also, for example, particularly useful for a case in which various water supply places exist in a periphery of a place of water use.

In the aforementioned aspect, the system includes, as information on a water supply place that can supply substitute water for the current water before treatment, evaluation values regarding the in-service filter for the water before treatment at the water supply place. The system can thus transmit the information regarding the water before treatment that can be treated into higher quality than the treated water obtained by treating the current water before treatment with the in-service filter. The function of the filter and the quality of the treated water can be improved by the user replacing the water before treatment in accordance with the information.

A 19th aspect of the present invention relates to the seventh aspect.

The 19th aspect is a water treatment apparatus management system which manages a household water treatment apparatus that is located at or near a place of water use, treats water before treatment with at least one type of filter, and feeds treated water to the place of water use.

The water treatment apparatus management system includes:

a water supply place information storage unit that stores information regarding at least one water supply place allowed to supply water before treatment near the place of water use;

an information feed means that transmits supply water related information based on the information regarding the water supply place to the household water treatment apparatus or a computer used by the user; and an information receiver that receives, from the household water treatment apparatus, information regarding the quality of water that has passed through the in-service filter.

The information regarding the water supply place includes treated water quality reference information of the same or the same type of filter as the in-service filter for the water before treatment at each water supply place.

The information feed unit refers to the information regarding the water supply place and the information regarding the quality of the passed water. If any of the water supply places provides water with a quality that can be improved in predetermined parameters after passing through the in-service filter compared with the quality of the current passed water, then the information feed unit transmits the supply water related information associated with the water supply place to the household water treatment apparatus or the computer.

The aspect is also, for example, particularly useful for a case in which various water supply places exist in a periphery of a place of water use.

In the aforementioned aspect, the system includes, as information on a water supply place that can supply substitute water for the current water before treatment, the treated water quality reference information of the same or the same type of filter as the in-service filter for the water before treatment at each water supply place, and receives, from the household water treatment apparatus, the information regarding the quality of water that has passed through the in-service filter. The system can thus transmit the information regarding the water before treatment that can be treated into higher quality than the treated water obtained by treating the current water before treatment with the in-service filter. The function of the filter and the quality of the treated water can be improved by the user replacing the water before treatment in accordance with the information.

In the 7th to 19th aspects, in more specific example, an in-service filter unit is comprised of two or more filters of at least one filter type. Each of the first and second filters preferably includes an information element (e.g., an RFID tag) or an information representation (e.g., a two-dimensional code) storing in-service filter type identification information that identifies the type of the in-service filter such as the filter type, the specifications, the product number, and the name. The household water treatment apparatus further includes a reader that reads the in-service filter type identification information from the information element or the information representation in the first and second filters installed in the household water treatment apparatus.

The water treatment apparatus management system receives, from the household water treatment apparatus, conformity related data indicating whether all in-service filters conform to the household water treatment apparatus. If the received result meets a standard, the information feed means transmits the various types of information to the household water treatment apparatus or the computer.

The conformity related data may also be information directly read and transmitted from the information element or the information representation and directly transmitted. In this case, if the water treatment apparatus management system stores, in the memory device, information regarding filters conformity for the household water treatment apparatus, the system can refer to the information to determine whether the filter meets the standard.

The function and the durability of a filter unit having a combination of multiple filters cannot be easily presumed from one of filters forming the filter unit. Thus, a filter unit desirably has a combination supported by experience and data. The present aspects are highly useful for maintaining the function and the durability of the filter unit in a good state.

In the above aspects, if a user replaces a filter with another type based on his or her own determination, the user will suffer from the disadvantage that the user is unable to receive the various types of information transmitted by the information feed means. The present aspects are highly useful for reducing such determination and action, and maintaining the function and the durability of each filter and the filter unit in a good state.

In the 20th to 23rd aspects, more specifically, the household water treatment apparatus includes a pump that sends water before treatment to the at least one type of filter, and a working information storing means that detects information regarding the working of the pump and stores the information into the memory device of the household water treatment apparatus.

Examples of the information regarding the working of a pump include the accumulated operating time of the pump, pump output information (e.g., the power consumption of the pump, the discharge of the pump, the accumulated power consumption of the pump, the accumulated discharge of the pump, the water pressure within the pump, the water pressure of the water discharged from the pump), pump vibration information (e.g., sound generated from the pump, vibration generated from the pump), and pump environment information (e.g., the pump temperature, the atmospheric temperature at the position of the pump). More specifically, the household water treatment apparatus is equipped with sensors for detecting them.

The household water treatment apparatus transmits the working information to the water treatment management system. Alternatively, the household water treatment apparatus creates data regarding the conditions of the pump based on the working information, and transmits the data regarding the conditions to the water treatment management system.

The data regarding the conditions may be data derived based at least on the accumulated operating time of a pump and a reference operable time of the pump (e.g., an operable time during which a certain level of durability is guaranteed), or data based at least on the pump vibration information. For example, when the level of sound from a pump increases gradually, the data indicates degradation in the pump based on the variation from the sound level at the start of use. When the sound level changes sharply, the data indicates abnormality in the pump.

More preferably, each item of the information and the data is stored in association with the accumulated operating time of the pump, the accumulated power consumption of the pump, and the accumulated discharge of the pump, and transmitted to the water treatment management system.

In the water treatment management system, the information feed means determines the degradation and the expected life of the pump based on these items of information and data, and transmits the information regarding the degradation and the expected life to the household water treatment apparatus or the computer used by the user.

This information enables the user to prepare for a replacement pump before the current pump breaks down, which enhances the user convenience.

The information feed means may also create information regarding the degradation and the expected life using the various types of information such as the estimation result from the water type estimation means and the information regarding performance change of the in-service filter, in addition to the information and the data regarding the pump.

The information regarding the working of a pump is detected before the replacement or the breakdown of the pump, and thus the previous data can be analyzed for a sign of replacement or breakdown.

The information regarding the working of a pump is received from a number of household water treatment apparatuses. Thus, the information regarding various pumps is collected. Even for the same pump, information regarding different structures of filter units to which the pump sends water is also collected. Thus, standards for signs of replacement and failure of pumps can be established for each type of pump based on the collected information, and stored in the memory device. When the information feed means receives, from a certain household water treatment apparatus, information regarding the working of the pump and data regarding the conditions of the pump, the information feed means refers to the standards to determine the presence or absence of a sign, and transmits the result to the household water treatment apparatus or the computer used by the user.

When information regarding the working of the pump is detected, the valve unit may also be controlled to cause water discharged from the pump to pass through no filter. This allows information regarding the working of the pump to be detected without interference of filter clogging, resulting in an advantage in increasing the accuracy.

In the 7th to 19th aspects, in more specific example, an in-service filter unit is comprised of two or more filters of, at least one filter type. The information regarding performance change, the type identification information, and the function identification information included in the information regarding the in-service filter may be the information regarding performance change, the type identification information (in-service filter unit type identification information), and the function identification information (in-service filter unit function identification information) regarding the entire in-service filter unit.

In addition, the reference information of degradation of the same or the same type of filter as the in-service filter for each of the individual types of reference water before treatment may be the reference information of degradation of the same or the same type of filter unit as the in-service filter unit for each of the individual types of reference water before treatment (in-service filter unit degradation reference information). The reference information of degradation of the same or the same type of filter as the in-service filter for the water before treatment at each water supply place may be the reference information of degradation of the same or the same type of filter unit as the in-service filter unit for the water before treatment at each water supply place (in-service filter unit degradation reference information).

In addition, the treated water quality reference information of the same or the same type of filter as the in-service filter for individual types of reference water before treatment may be the treated water quality reference information of the same or the same type of filter unit as the in-service filter unit for each of the individual types of reference water before treatment (in-service filter unit treated water quality reference information). The treated water quality reference information of the same or the same type of filter as the in-service filter for the water before treatment at each water supply place may be the treated water quality reference information of the same or the same type of filter unit as the in-service filter unit for the water before treatment at each water supply place (in-service filter unit treated water quality reference information).

In addition, the in-service filter evaluation comparison information may be the in-service filter evaluation comparison information regarding the entire in-service filter unit (in-service filter unit evaluation comparison information). The information regarding the quality of the passed water may be the information regarding the quality of the passed water for the entire in-service filter unit.

In this manner, with various types of information regarding the filter unit received or stored, the household water treatment apparatus or the computer used by the user is provided with information that is based on the entire structure of the filter unit, which further enhances the convenience.

Furthermore, in the 7th to 19th aspects, in more specific example, the type identification information and the function identification information of the replacement filter may be the type identification information (replacement filter unit type identification information) and the function identification information (replacement filter unit function identification information) of the entire replacement filter unit capable of replacing the in-service filter unit.

In addition, the reference information of degradation of the replacement filter for each of the individual types of reference water before treatment may be the reference information of degradation of the replacement filter unit for each of the individual types of reference water before treatment (replacement filter unit degradation reference information). The reference information of degradation of the replacement filter for the water before treatment at each water supply place may be the reference information of degradation of the replacement filter unit for the water before treatment at each water supply place (replacement filter unit degradation reference information).

In addition, the treated water quality reference information of the replacement filter for individual types of reference water before treatment may be the treated water quality reference information of the replacement filter unit for each of the individual types of reference water before treatment (replacement filter unit treated water quality reference information). The treated water quality reference information of the replacement filter for the water before treatment at each water supply place may be the treated water quality reference information of the replacement filter unit for the water before treatment at each water supply place (replacement filter unit treated water quality reference information).

In addition, the replacement filter evaluation comparison information may be the replacement filter evaluation comparison information of the entire replacement filter unit (replacement filter unit evaluation comparison information).

In this manner, with various types of information regarding the replacement filter unit received or stored, the household water treatment apparatus or the computer used by the user is provided with information that is based on the entire structure of the filter unit, which further enhances the convenience.

At this time, information regarding a replacement filter unit including a different number of filters than that of the filter units currently in service and information regarding a replacement filter unit including a valve unit and a buffer tank as well as filters may also be provided.

For example, if the in-service filter unit includes a first filter that removes foreign matter (which means substances other than water) bigger or longer than a predetermined size or a predetermined length from the water before treatment, and a second filter that removes finer foreign matter and molecules from the water treated with the first filter, then the above information regarding a replacement filter unit including the first filter, the second filter, and a buffer tank for storing the water that has passed through the first filter may be provided as replacement filter unit information.

The second filter treats water typically slower than the first filter, and the buffer tank allows the first filter and the second filter to have varying treatment speeds. This enables the treatment speed of the second filter to be set at an appropriate speed regardless of the treatment speed of the first filter. As a result, the quality of treated water treated with second filter can be improved, and the degradation in the second filter can be delayed. The replacement filter unit may include a second filter pump that allows the water in the buffer tank to pass through the second filter.

The above information regarding a replacement filter unit, described below, may also be provided as replacement filter unit information. The replacement filter unit includes the first filter, the second filter, a first flow channel that allows the water treated with the first filter to flow to a point of use (e.g., a shower nozzle, a faucet) or a point-of-use storage tank (e.g., a tank that feeds water to a shower nozzle and a faucet), a second flow channel that allows the water treated with the first filter to flow to the buffer tank, a detection means that can detect the quality of the water before treatment flowing into the first filter or the water that has passed through the first filter, and a flow channel switching means that allows the water treated with the first filter to selectively flow in the first flow channel or the second flow channel in accordance with the detection result from the detection means. The water treated with the second filter is also provided to the point of use or the point-of-use storage tank.

In this structure, for example, if the result of the measurement of the water before treatment performed by an electric conductivity sensor falls within a range of predetermined reference values, and the quality of the water before treatment is determined as a predetermined value or more, then the water treated with the first filter flows directly to the point of use or the point-of-use storage tank via the first flow channel. The second filter may not be used, and the first filter treats water typically faster than the second filter. Thus, the point of use is easily fed with enough water. When, for example, the quality of water before treatment temporarily has a predetermined value or less, the water treated with the first filter is sent to the buffer tank during this time period. The water in the buffer tank is treated with the second filter. Thus, even if the quality of water before treatment decreases, the quality of the treated water can be maintained.

The quality of water before treatment may vary temporarily during, for example, the treatment of shower wastewater, kitchen wastewater, and toilet sewage.

The above information regarding replacement filter units may also be provided as the following information. One replacement filter unit includes a sludge filter that is located upstream of the first filter and removes sludge from the water before treatment. Another replacement filter unit includes such a sludge filter in place of the first filter. In such a case, the above information regarding multiple types of replacement filter units including various sludge filters further enhances the user convenience.

In addition, the above information regarding replacement filter units described below may also be provided as the following information. One replacement filter unit includes a biological treatment filter that is located upstream of the first filter and treats the water before treatment using organisms. Another replacement filter unit includes such a biological treatment filter in place of the first filter. In such a case, the above information regarding multiple types of replacement filter units including various sludge filters further enhances the user convenience.

In the described aspects, at least one household water treatment apparatus managed in the water treatment apparatus management system includes a filter unit and a pump that allows water before treatment to flow into the filter unit. The filter unit includes at least a first filter, a second filter of a type different from the type of the first filter, and a valve unit that switches between a first flow state in which the water before treatment is passed merely through the first filter to generate the treated water and a second flow state in which the water before treatment is passed through the first filter and then through the second filter to generate the treated water. The water treatment apparatus management system further includes a replacement filter information creation means that uses at least one of the in-service filter type identification information and the in-service filter function identification information for each of the first and second filters, as well as at least treated flow rate information in the first flow state, treated flow rate information in the second flow state, and pump working state information to create the replacement filter information used in another household water treatment apparatus. The replacement filter information creation means may accumulate at least information regarding the in-service filter for the estimated water type and information regarding the performance change of the in-service filter, and use the accumulated information to create the replacement filter information also used in another household water treatment apparatus. Of course, the replacement filter information creation means may accumulate at least information regarding the performance change of the in-service filter unit and information regarding the estimated water type, and use the accumulated information to create information regarding a replacement filter unit also used in another household water treatment apparatus. The information is preferably accumulated in a time-series manner in association with the way of use, the pump working, and the like.

It should be noted that the first filter 11 and the second filter 12 may be of different types. For example, the first filter 11 may be the same filter or the same type of filter as the second filter 12. Even in such filters, the valve unit may switch between a first flow state in which water before treatment is passed merely through the first filter 11, a second flow state in which water before treatment is passed through the first filter 11 and then through the second filter 12, and a third flow state in which water before treatment is passed through the first filter 11 and the second filter 12 in parallel. The switching can change the treatment function (treatment speed) and the pump output in each flow state. This allows the lowering of the pump output and thus a power saving, as well as enables the saving of the second filter 12. In some types of filters, once a filter is used, bacteria may propagate to reduce the performance even without a subsequent use. However, for example, saving the second filter 12 to the extent possible enables the maintenance of the filter unit to be minimized.

In the aforementioned aspect, the replacement filter information used in a household water treatment apparatus is created based on the working of another household water treatment apparatus being currently used. Thus, as the number of managed household water treatment apparatuses increases, the types and the quality of the replacement filter information is improved, which can further enhance the user convenience.

To analyze the causes of success or failure of water treatment, the water treatment management system in the 7th to 19th aspects may obtain data detected by environment sensors that have been conventionally believed to have no direct relation to water treatment (e.g., a GPS provided in each household water treatment apparatus, a sound sensor that detects sounds inside and outside each household water treatment apparatus, an odor sensor that detects odors outside each household water treatment apparatus, a vibration sensor that detects vibrations inside and outside each household water treatment apparatus, a temperature sensor that detects temperatures inside and outside each household water treatment apparatus). The system may store these data items into the memory device.

This enables various relationships with these data items to be derived, such as the relationship between the data and success or failure of water treatment, the relationship between the data and the function and the durability of each filter and filter unit, and the relationship between the data and the function and the durability of the pump. Also based on the derived relationships, the information feed means can generate and transmit the above information items.

The water treatment management system in the 7th to 19th aspects may receive and store user input information entered by a user via a computer used by the user or the household water treatment apparatus. As the user input information, the user may enter information regarding the configuration of the household water treatment apparatus and data which can be used for water type estimation, and the information may be stored in the water treatment management system. For example, the user may preliminarily notify the water treatment management system of the information indicating that water is used for a shower in the place of water use. This notification improves the accuracy in predicting the chronological change in the water type, leading to more appropriate operation.

In the water treatment management system in the 8th, 9th, 10th, 14th, 15th, and 16th aspects, the water type estimation means may also use the user input information to estimate the water type. For example, with user input information indicating the specific quality of the water before treatment to be treated by the household water treatment apparatus (information regarding soap being used) or the source of the water before treatment (e.g., a shower room, a sink in a kitchen), the water treatment management system can, using the estimation that the water before treatment has a water quality varying repeatedly during a short time period, estimate the water type more accurately using, for example, the information regarding performance change, which corresponds to the working state detection values.

The computer used by the user or the household treatment apparatus may present the user input information in a form of options. When the user selects one of the options, the selection may be transmitted to the water treatment management system as the user input information. This can save the user from the trouble of entering information, and improve the accuracy of water type estimation.

Regarding the phrase "can delay the degradation" in the 8th, 9th, 10th, 11th, and 12th aspects, the water treatment management system in the aspects may further include a request receiving means that receives a user request from the computer used by the user or the household water treatment apparatus, and the information feed means may fix a criterion for "can delay the degradation" based on a request from the user. For example, the user may request that enough water flows through a filter per unit time even if the quality of the passed water deteriorates significantly. In such a case, the information feed means uses the absolute value of the flow rate of water passing through the filter per unit time as a criterion of degradation, and provides information regarding a replacement filter that can keep the absolute value of the flow rate higher than the in-service filter.

Similarly, regarding the phrase "can improve the quality of the treated water" in the 14th to 18th aspects, the water treatment management system in the aspects may further include a request receiving means that receives a user request from the computer used by the user or the household water treatment apparatus, and the information feed means may fix a criterion for "can improve the quality of the treated water" based on a request from the user. For example, the user may request the odor of the filter-passed water to be improved even if the transparency of the water decreases. In such a case, the information feed means uses the odor of treated water as a criterion of the treated water quality, and provides supply water related information that enables the odor to be improved compared with the in-service filter.

Similarly, regarding the phrase "improved in predetermined parameters" in the 19th aspect, the water treatment management system in the aspect may further include a request receiving means that receives a user request from the computer used by the user or the household water treatment apparatus, and the information feed means may fix a criterion for "improved in predetermined parameters" based on a request from the user. For example, the user may request a high value for the parameter associated with the amount of soap contained in the filter-passed water, and a low value for the parameter associated with the transparency of the filter-passed water. In such a case, the information feed means provides supply water related information associated with a water supply place that allows an improvement in the predetermined parameters.

In the 8th, 9th, 10th, 11th, and 12th aspects, the water treatment management system in the aspects may further include a stock filter information reception means that receives user information regarding a filter out of service (stock filter information) from the computer used by the user or the household water treatment apparatus, and the information feed means may also refer to the stock filter information to provide the filter replacement information.

In this case, the information feed means may provide the filter replacement information merely from the stock filter information or from the stock filter information and the replacement filter information.

The stock filter information is preferably linked with the ID information (e.g., the serial number) on each filter. The information regarding performance change is also preferably linked with the ID information on the corresponding filter. For each stock filter currently unused but previously used, such links enable filter replacement information to be provided also based on the information regarding the performance change observed during the previous use of the stock filter, and the accuracy in providing the information is improved.

The stock filter and the in-service filter may each include an information element such as an RFID tag, and the information element may store the information regarding the performance change observed during the previous use. Also in this case, when the stock filter information reception means receives the information read from the information element, the same processing as described above is enabled.

The water treatment management system in the 7th to 19th aspects may hold sanitation control information obtained when no water treatment is performed, and transmit the information to a household water treatment apparatus. For example, based on this information, the household water treatment apparatus maintains the apparatus in a sanitary condition by disinfection using chlorine or periodical circulation of water in the apparatus. In the event that water quality in the household water treatment apparatus deteriorates, the apparatus notifies the management system of the event. In this manner, the management system can improve and better the sanitation control.

The water treatment management system in the seventh to 19th aspects stores, as information regarding the in-service filter, working data such as the water temperature, the water pressure, the flow velocity, and the water quality. The working data may be classified into two types: data recommended by a third party such as a filter maker, and data created based on the data accumulated in the management system. The data created based on the data accumulated in the management system includes working data under various conditions and environments with a variety of water temperatures, water pressures, flow velocities, and water qualities. The type of water is estimated with the two types of data taken into account. For example, when a filter has been in the market for a short period of time and the management system has little accumulated data, the data recommended by a third party such as a filter maker is mainly used. When the management system has much accumulated data and the water type can be estimated with high precision, the data created based on the data accumulated in the management system is mainly used.

The water treatment management system in the 7th to 19th aspects may receive one or more of the working state information of a household water treatment apparatus, the information regarding performance change of a filter, and the sensor obtained information, and provide the received information to an external third party. The working state information includes information regarding the timing of operation and the hours of operation, and information about the output water pressure and the flow velocity. The information regarding performance change of a filter includes performance information regarding changes in water quality and water pressure measured before and behind the filter. The sensor obtained information includes sensor values as well as environment information such as water pressures and flow velocities measured by sensors. For example, these data items are obtained and abnormal values are filtered out, and then the resulting data is provided to the maker. The maker can thus examine the operation method and the effect in a real environment, and develop new materials or filters in a highly efficient manner.

The water treatment management system in the seventh to 19th aspects may also control at least one component such as a pump and a valve provided in a household water treatment apparatus over the control of the household water treatment apparatus. For example, when the water treatment management system directly controls the pump and the valve of the household water treatment apparatus, the user of the household water treatment apparatus can obtain appropriate treated water without learning the interior or the specific operation method of the apparatus. Additionally, for example, when a member such as a filter wears, the water treatment management system can sense the wear and transmit the information to a predetermined computer, a display, a delivery system, and the like in order to deliver a necessary replacement part before failure. In addition, the management system has knowledge about an operation method associated with the latest data, and can thus work always based on the latest data and sense failure based on the data and the performance change. Additionally, the system can be stopped remotely based on prediction.

Furthermore, the water treatment management system can control multiple household water treatment apparatuses at a time. For example, in the event of an abnormality in one type of filter or a disaster, a household water treatment apparatus that uses the filter or a water treatment apparatus located in the disaster-stricken area can be controlled in the same manner as the other apparatuses.

The water treatment management system in the seventh to 19th aspects may provide an application interface to external third parties for allowing them to execute an application including a water type estimating program and the like. For example, for a shower system, an external third party can create an application program in which the original water pressure has been changed to pressures determined as suitable by users in each region.

A 20th aspect of the present invention is a household water treatment apparatus that is located at or near a place of water use, treats water before treatment with at least one type of filter, and feeds treated water to the place of water use. The household water treatment apparatus optimizes the structure of the filter unit and the working of the pump depending on, for example, the amount of required water and the required water quality received by the household water treatment apparatus and the water quality of the water before treatment.

In the aforementioned aspect, the household water treatment apparatus can be used in various areas because the household water treatment apparatus optimizes the structure of the filter unit and the working of the pump, and the optimization depends on the amount of required water, the required water quality, and the water quality of the water before treatment.

A 21st aspect of the present invention relates to the 20th aspect.

A household water treatment apparatus according to the 21st aspect includes:
a water before treatment inlet;
a filter unit passed through by water before treatment coming from the water before treatment inlet;

a pump that is located upstream or downstream of the filter unit and that brings the water before treatment into the filter unit; and a treated water outlet that allows treated water treated by passing through the filter unit or the filter.

The filter unit includes a first filter and a second filter.

The household water treatment apparatus further includes a control unit that controls the pump and the valve unit.

In the aforementioned aspect, the filter unit preferably includes a valve unit that can switch between a first flow state in which the water before treatment flows merely through the first filter and a second flow state in which the water before treatment flows in the filter unit along a path different from the path of the first flow state.

It is noted that the first filter 11 and the second filter 12 may be the same filters or the same type of filters or different types of filters. The first filter 11 and the second filter 12 do not necessarily have to be of different types. For example, even if the first filter 11 may be the same filter or the same type of filter as the second filter 12, the valve unit may switch between a first flow state in which water before treatment is passed merely through the first filter 11, a second flow state in which water before treatment is passed through the first filter 11 and then through the second filter 12, and a third flow state in which water before treatment is passed through the first filter 11 and the second filter 12 in parallel. The switching can change the treatment function (treatment speed) and the pump output in each flow state. This allows the lowering of the pump output and thus a power saving, as well as enables the saving of the second filter 12. In some types of filters, once a filter is used, bacteria may propagate to reduce the performance even without a subsequent use. However, for example, saving the second filter 12 to the extent possible enables the maintenance of the filter unit to be minimized.

In the aforementioned aspect, each of the first and second filters preferably includes an information element (e.g., an RFID tag) or an information representation (e.g., a two-dimensional code) storing in-service filter type identification information that identifies the type of the in-service filter such as the filter type, the specifications, the product number, and the name. The household water treatment apparatus further includes a reader that reads the in-service filter type identification information from the information element or the information representation in the first and second filter installed in the household water treatment apparatus, and a conformity determine means that determines whether the in-service filter type identification information read by the reader conforms to the household water treatment apparatus.

Thus, when a filter not intended to be used in a household water treatment apparatus is installed as a first filter, it can be determined that the filter does not conform to the apparatus. For example, when a user installs a different filter based on his or her own determination, such wrong determination is made. The first filter and the second filter play their own roles, and the best possible type and combination of filters should be selected to achieve the function and the durability appropriate to the filter unit.

The function and the durability of a filter unit having a combination of multiple filters cannot be easily presumed from one of filters forming the filter unit. Thus, a filter unit desirably has a combination supported by experience and data. This aspect is highly useful for maintaining the function and the durability of each filter and the filter unit in a good state.

If, for example, the installed first filter does not have the information element or information representation, the filter is determined as unfit because the reading cannot be performed.

With the valve unit that can switch between the first flow state and the second flow state, for example, if the required treatment speed is high and the required water quality is low, the flow state can be switched to the first flow state in which the water before treatment passes merely through the first filter. If the required water quality is high, the flow state can be switched to the state in which the water before treatment flows through both the first filter and the second filter. The switching can be flexible depending on the required treatment speed and the required quality.

In the 21st aspect, preferably, the household water treatment apparatus further includes a working state detection means that detects a working state detection value associated with degradation in the whole of or a part of the filter unit, and a working state information output means that outputs the detected working state detection value or the working state information that is based on the working state detection value to at least one of the display and the voice generator provided in the household water treatment apparatus, or to an external device. The external device is, for example, the information receiver in the water treatment apparatus management system or the computer used by the user. The same applies to the external device described below.

In the 21st aspect, more preferably, the household water treatment apparatus further includes a reference water flowing means that passes reference water through the whole of or a part of the filter unit. The reference water flowing means passes the treated water through the whole of or a part of the filter unit or passes external reference water fed from the outside of the household water treatment apparatus through the whole of or a part of the filter unit. The working state detection means detects the working state detection value while the reference water flowing means is passing the reference water through the whole of or a part of the filter unit.

The working state detection value is detected while the reference water is flowing, which enables quantitative detection. Furthermore, if the treated water is used as reference water, quantitative measurement can be advantageously performed any number of times without the supply of reference water.

In the 21st aspect, preferably, the working state detection means of the household water treatment apparatus detects one or a combination of the water pressure in the whole of or a part of the filter unit, the amount of water flowing from the whole of or a part of the filter unit, the turbidity of water flowing from the whole of or a part of the filter unit, the odor of water flowing from the whole of or a part of the filter unit, and the electric conductivity of the water before treatment as the working state detection value. More specifically, the working state detection value indicates the quality, the pressure, and the amount of the water being used.

In the 21st aspect, more preferably, the working state detection means of the household water treatment apparatus controls the pump to a predetermined working state when detecting the working state detection value.

The working state detection value can be detected in the predetermined working state, and this is effective in quantitative detection.

In the 21st aspect, preferably, the household water treatment apparatus further includes an information regarding performance change output means that creates information regarding performance change by associating the working state detection value or the working state information with the amount of water treated by the whole of or a part of the filter unit, and outputs the created information regarding performance change to at least one of the display and the voice generator provided in the household water treatment apparatus, or to an external device.

In the 21st aspect, preferably, the household water treatment apparatus stores in its memory device as information regarding the in-service filter degradation reference information indicating how the whole of or a part of the in-service filter unit deteriorates depending on the amount of water treated by the whole of or a part of the filter unit for individual types of reference water before treatment, and further includes a water type estimation means that estimates a water type of the water before treatment based at least on the in-service filter degradation reference information and/or the information regarding performance change (the working state detection value, the working state information, or the information regarding performance change).

In the 21st aspect, another example of the water type estimation means estimates the water type also based on one or a combination of the water pressure in the whole of or a part of the filter unit, the amount of water flowing from the whole of or a part of the filter unit, the turbidity of water flowing from the whole of or a part of the filter unit, the odor of water flowing from the whole of or a part of the filter unit, and the electric conductivity of the water before treatment, which are detected as the working state detection value.

In the 21st aspect, yet another example of the water type estimation means stores in the memory device as information regarding the in-service filter, at least one of in-service filter type identification information identifying the type of the whole of or a part of the filter unit such as the filter type, the specifications, the product number, and the name, and in-service filter function identification information indicating the function and the performance of the whole of or a part of the filter unit, and includes a water type estimation means that estimates a water type of the water before treatment based on the information regarding performance change of and/or the information regarding the in-service filter.

In the 21st aspect, the second filter is a filter that produces the treated water using, for example, a reverse osmosis membrane (RO membrane). The first filter is a filter that removes from the water flowing into the first filter, coarser foreign matter (which refers to substances other than water) than is removed by the second filter. The first filter is used to filter the water that is to flow into the second filter. The reference water flowing means feeds the reference water to the filter unit with the valve unit controlled so that the water passed by the pump through the filter unit flows merely through the second filter without flowing through the first filter.

In the 21st aspect, the second filter is a filter that produces the treated water using, for example, a reverse osmosis membrane (RO membrane). The first filter is a filter that removes from the water flowing into the first filter, coarser foreign matter (which refers to substances other than water) than is removed by the second filter. The first filter is used to filter the water that is to flow into the second filter. The reference water flowing means feeds the reference water to the filter unit with the valve unit controlled so that the water passed by the pump through the filter unit flows through the first filter and then the second filter until a predetermined time elapses or a predetermined flow rate is reached, and then feeds the reference water to the filter unit with the valve unit controlled so that the water passed by the pump through the filter unit flows through the second filter without flowing the first filter.

In this state, the reference water flows merely through the second filter, and thus all the water from the pump flows through the second filter. This is effective in detecting the performance of the second filter quantitatively. Furthermore, before the reference water is passed merely through the second filter, the water that has flowed through the first filter passes through the second filter only for the predetermined time. Thus, even if water before treatment to be treated with the first filter remains before passing through the filter unit or in the filter unit, the second filter can be prevented from experiencing degradation caused by the remaining water directly entering the second filter.

In the 21st aspect, preferably, the household water treatment apparatus stores in its memory device as replacement filter information, replacement filter degradation reference information indicating how at least one replacement filter capable of replacing the whole of or a part of the in-service filter unit deteriorates depending on the amount of treated water for individual types of reference water before treatment. The household water treatment apparatus further includes an information output means. The apparatus refers to at least the in-service filter unit degradation reference information and the replacement filter degradation reference information, or refers to at least the information regarding performance change and the replacement filter degradation reference information. If any replacement filter can delay the degradation compared with the whole of or a part of the in-service filter unit for the water type estimated in the water type estimation means, then information output means outputs the filter replacement information including information regarding the replacement filter to at least one of the display and the voice generator provided in the household water treatment apparatus, or to an external device.

In the 21st aspect, preferably, the household water treatment apparatus stores in its memory device as information regarding the in-service filter, at least one of in-service filter type identification information identifying the type of the whole of or a part of the filter unit such as the filter type, the specifications, the product number, and the name, and in-service filter function identification information indicating the function and the performance of the whole of or a part of the filter unit, and also stores as replacement filter information, replacement filter degradation reference information indicating how at least one replacement filter capable of replacing the whole of or a part of the in-service filter unit deteriorates depending on the amount of treated water for individual types of reference water before treatment. The household water treatment apparatus further includes an information output means. The apparatus refers to one or both of the in-service filter type identification information and the in-service filter function identification information, and to the reference information of degradation of the replacement filter, or refers to the information regarding performance change and the reference information of degradation of the replacement filter. If any replacement filter can delay the degradation compared with the whole of or a part of the in-service filter unit for the water type estimated in the water type estimation means, then the information output means outputs the filter replacement information including information regarding the replacement filter to at least one of the display and the voice generator provided in the household water treatment apparatus, or to an external device.

In the 21st aspect, preferably, the household water treatment apparatus includes a component control means that controls at least one of the pump and the valve provided in the filter unit based on the estimation result from the water type estimation means.

For example, in the case that the working state detection value is the electric conductivity of water before treatment and the water type estimation means estimates the water type in real time based on the detection value, the water before treatment may be wastewater from a shower room, and the concentration of soap and shampoo may vary over time. In such a case, the pump output can be changed in accordance with the variable concentration, and the valve can be switched in accordance with the variable concentration to change the combination of filters passed through by the water before treatment.

In the 21st aspect, preferably, the household water treatment apparatus stores information regarding at least one water supply place to supply water before treatment in its memory device. The information regarding the water supply place includes in-service filter degradation reference information indicating how the whole of or a part of the in-service filter unit deteriorates depending on the amount of water treated by the whole of or a part of the filter unit for the water before treatment at each water supply place. The household water treatment apparatus further includes an information output means. The apparatus refers to the information regarding the water supply place. If any type of water before treatment can delay the degradation of the whole of or a part of the filter unit compared with the rate of degradation caused by current water before treatment estimated based on the information regarding performance change, then the information output means outputs the supply water related information including information regarding the filter to at least one of the display and the voice generator provided in the household water treatment apparatus, or to an external device.

In the 21st aspect, preferably, the household water treatment apparatus stores information regarding at least one water supply place to supply water before treatment in its memory device. The information regarding the water supply place includes in-service filter evaluation comparison information containing evaluation values regarding the water before treatment at each water treatment place associated with at least one of in-service filter type identification information and in-service filter function identification information. The in-service filter type identification information identifies the type of the whole of or a part of the filter unit, including a type, a specification, a product number, and a name of the filter. The in-service filter function identification information indicates a function and a performance of the whole of or a part of the filter unit. The household water treatment apparatus further includes an information output means. The apparatus refers to the information regarding the water supply place and the information regarding performance change. If any type of water before treatment can delay the degradation of the whole of or a part of the filter unit compared with the rate of degradation caused by current water before treatment estimated based on the information regarding performance change, then the information output means outputs the supply water related information including information regarding the filter to at least one of the display and the voice generator provided in the household water treatment apparatus, or to an external device.

In the 21st aspect, preferably, the household water treatment apparatus stores information regarding at least one water supply place allowed to supply water before treatment in its memory device. The information regarding the water supply place includes in-service filter evaluation comparison information containing evaluation values regarding the water before treatment at each water treatment place associated with at least one of in-service filter type identification information and in-service filter function identification information. In-service filter type identification information identifies the type of the whole of or a part of the filter unit, including the filter type, the specifications, the product number, and the name. The in-service filter function identification information indicates the function and the performance of the whole of or a part of the filter unit. The information regarding the water supply place also includes replacement filter evaluation comparison information containing evaluation values regarding the water before treatment at each water treatment place associated with at least one of replacement filter type identification information and replacement filter function identification information. The replacement filter type identification information identifies the type of the whole of or a part of the replacement filter unit capable of replacing the filter unit, including a type, a specification, a product number, and a name of the filter. The replacement filter function identification information indicates a function and a performance of the whole of or a part of the replacement filter unit. The household water treatment apparatus further includes an information output means. The apparatus refers to the in-service filter evaluation comparison information and the replacement filter evaluation comparison information included in the information regarding the water supply place. If any combination of a water supply place and a replacement filter or a in-service filter meets a predetermined standard, then the information output means outputs the information regarding the combination to at least one of the display and the voice generator provided in the household water treatment apparatus, or to an external device as supply water related information.

In the 21st aspect, preferably, the household water treatment apparatus further includes a request receiving means that receives a request from the user, and determines the predetermined standard based on a request from the user.

For example, a user may send a request to improve the water treatment speed even if the water quality deteriorates a little. If any combination of a water supply place and an in-service filter or any combination of a water supply place and a replacement filter meets the request, then the combination is output.

More than one combination may be output. Three combinations composed of the combination of a water supply place 1 and an in-service filter, the combination of a water supply place 1 and a replacement filter 1, and the combination of a water supply place 2 and a replacement filter 2 may also be transmitted.

In the aforementioned aspect, evaluation information related to the request from the user may also be added. In this case, the user can compare the evaluation information items to carry out a selection The evaluation information may include the treatment speed achieved by each combination, prediction data regarding the quality of treated water, function information such as the degradation rate of a filter, and information regarding replacement costs.

In the 21st aspect, preferably, the household water treatment apparatus stores in its memory device as information regarding the in-service filter, treated water quality reference information of the whole of or a part of the in-service filter unit for individual types of reference water before treatment, and as replacement filter information, treated water quality reference information of the whole of or a part of the replacement filter unit capable of replacing the in-service filter unit for each of the individual types of reference water before treatment. The household water treatment apparatus further includes an information output means. The apparatus refers to the information regarding the in-service filter and the replacement filter information, or refers to the information regarding performance change and the replacement filter information. If the whole of or a part of any replacement filter unit can improve the quality of the treated water compared with the whole of or a part of the in-service filter unit for the water type estimated in the water type estimation means, then the information output means outputs the filter replacement information including information regarding the filter to at least one of the display and the voice generator provided in the household water treatment apparatus, or to an external device.

In the 21st aspect, preferably, the household water treatment apparatus stores in its memory device as information regarding the in-service filter, at least one of in-service filter type identification information identifying the type of the whole of or a part of the in-service filter unit such as a type, a specification, a product number, and a name of the filter and in-service filter function identification information indicating a function and a performance of the whole of or a part of the in-service filter unit, and as replacement filter information, treated water quality reference information that is quality prediction data regarding the treated water treated with the whole of or a part of a replacement filter unit for individual types of reference water before treatment. The household water treatment apparatus further includes an information output means. The apparatus refers to one or both of the in-service filter type identification information and the in-service filter function identification information, and to the treated water quality reference information of the replacement filter unit, or refers to the information regarding performance change and the treated water quality reference information of the replacement filter unit. If the whole of or a part of any replacement filter unit can improve the quality of the treated water compared with the whole of or a part of the in-service filter unit for the water type estimated in the water type estimation means, then the information output means outputs the filter replacement information including information regarding the replacement filter to at least one of the display and the voice generator provided in the household water treatment apparatus, or to an external device.

In the 21st aspect, preferably, the household water treatment apparatus stores in its memory device as replacement filter information, treated water quality reference information of the whole of or a part of the replacement filter unit capable of replacing the in-service filter unit for individual types of reference water before treatment. The household water treatment apparatus further includes an information output means. The apparatus refers to the treated water quality reference information of the replacement filter unit. If the whole of or a part of any replacement filter unit can improve the quality of the treated water compared with the whole of or a part of the in-service filter unit for the water type estimated in the water type estimation means, then the information output means outputs the filter replacement information including information regarding the replacement filter to at least one of the display and the voice generator provided in the household water treatment apparatus, or to an external device.

In the 21st aspect, preferably, the household water treatment apparatus stores information regarding at least one water supply place allowed to supply water before treatment in its memory device. The information regarding the water supply place includes treated water quality reference information that is quality prediction data regarding the water treated with the whole of or a part of the in-service filter unit for the water before treatment at each water supply place. The household water treatment apparatus further includes an information output means. The apparatus refers to the treated water quality reference information. If any type of water before treatment can be treated into treated water higher in quality than the treated water obtained by treating the current water before treatment with the whole of or a part of the in-service filter unit, then information output means outputs the supply water related information associated with the water before treatment to at least one of the display and the voice generator provided in the household water treatment apparatus, or to an external device.

In the 21st aspect, preferably, the household water treatment apparatus stores information regarding at least one water supply place allowed to supply water before treatment in its memory device. The information regarding the water supply place includes in-service filter evaluation comparison information containing evaluation values regarding the water before treatment at each water treatment place associated with at least one of in-service filter type identification information and in-service filter function identification information. The in-service filter type identification information identifies the type of the whole of or a part of the filter unit, including a type, a specification, a product number, and a name of the filter. The in-service filter function identification information indicates a function and a performance of the whole of or a part of the filter unit. The household water treatment apparatus further includes an information output means. The apparatus refers to the information regarding the water supply place and the information regarding performance change. If any type of water before treatment can be treated into treated water higher in quality than the water obtained by treating current water before treatment with the whole of or a part of the in-service filter unit, then the information output means outputs the supply water related information associated with the water before treatment to at least one of the display and the voice generator provided in the household water treatment apparatus, or to an external device.

In the 21st aspect, preferably, the household water treatment apparatus stores information regarding at least one water supply place allowed to supply water before treatment in its memory device, and includes a detection means that detects information regarding the quality of the water that has passed through the in-service filter. The information regarding the water supply place includes treated water quality reference information that is quality prediction data regarding the water treated with the whole of or a part of the in-service filter unit for the water before treatment at each water supply place. The household water treatment apparatus further includes an information output means. The apparatus refers to the information regarding the water supply place and the information regarding the quality of the passed water. If any of the water supply places provides water having a quality that can be improved in predetermined parameters after passing through the in-service filter unit compared with the quality of the current passed water, then the information output means outputs the supply water related information associated with the water supply place to at least one of the display and the voice generator provided in the household water treatment apparatus, or to an external device.

The household water treatment apparatus in the 21st aspect may receive and store user input information entered by a user via the computer used by the user or an input unit of the household water treatment apparatus. As the user input information, the user may enter information regarding the configuration of the household water treatment apparatus and data used for water type estimation, and the information may be stored in the water treatment management system. For example, the user may preliminarily notify the household water treatment apparatus of the information indicating that water is used for a shower in the place of water use. This notification improves the accuracy in predicting the chronological change in the water type, leading to more appropriate working.

In the household water treatment apparatus in the 21st aspect, the water type estimation means may also use the user input information to estimate the water type.

The computer used by the user or the display unit and the input unit of the household treatment apparatus may present the user input information in the form of options. When the user selects one of the options, the selection may be stored in the household water treatment apparatus as the user input information. This can save the user the trouble of entering information, and improve the accuracy of water type estimation.

Regarding the phrase "can delay the degradation" in the 21st aspect, the household water treatment apparatus in the aspect may further include a request receiving means that receives a user request from the computer used by the user or the input unit of the household water treatment apparatus, and fix a criterion for "can delay the degradation" based on a request from the user.

Similarly, regarding the phrase "can improve the quality of the treated water" in the 21st aspect, the household water treatment apparatus in the aspect may further include a request receiving means that receives a user request from the computer used by the user or the input unit of the household water treatment apparatus, and fix a criterion for "can improve the quality of the treated water" based on a request from the user.

Similarly, regarding the phrase "improved in predetermined parameters" in the 21st aspect, the household water treatment apparatus in the aspect may further include a request receiving means that receives a user request from the computer used by the user or the input unit of the household water treatment apparatus, and fix a criterion for "improved in predetermined parameters" based on a request from the user.

In the 21st aspect, the household water treatment apparatus in the aspect may further include a stock filter information reception means that receives user information regarding a filter out of service (stock filter information) from the computer used by the user or the input unit of the household water treatment apparatus, and also refer to the stock filter information to provide the filter replacement information.

The stock filter information is preferably linked with the ID information (e.g., the serial number) on each filter. The information regarding performance change is also preferably linked with the ID information on the corresponding filter. For each stock filter currently unused but previously used, such links enable filter replacement information to be provided also based on the information regarding the performance change observed during the previous use of the stock filter, and the accuracy in providing the information is improved.

The stock filter and the in-service filter may each include an information element such as an RFID tag, and the information element may store the information regarding the performance change observed during the previous use. Also in this case, when the stock filter information reception means receives the information read from the information element, the same processing as described above is enabled.

In the 21st aspect, as an example, some or all of information items as the information regarding the in-service filter, information items as the replacement filter information, the estimation result of the water type, and information items as the information regarding the water supply place are received from the water treatment apparatus management system in the 1st to 13th aspects and stored into the memory device.

A wide variety of useful information items possessed by the water treatment apparatus management system are transmitted and stored into the household water treatment apparatus. Thus, even in an environment where communication cannot be established with the water treatment apparatus management system, the user convenience can be improved in the same manner as the case in which information can be received from the water treatment apparatus management system.

In the 21st aspect, the memory device may store replacement filter information regarding a replacement filter unit including a different number of filters than that of the filter units currently in service and replacement filter information regarding a replacement filter unit including a valve unit and a buffer tank as well as filters. The above information may be output based on the replacement filter information.

For example, if the in-service filter unit includes a first filter that removes foreign matter (which means substances other than water) bigger or longer than a predetermined size or a predetermined length from the water before treatment, and a second filter that removes finer foreign matter and molecules from the water treated with the first filter, then the above information regarding a replacement filter including the first filter, the second filter, and a buffer tank for storing the water that has passed through the first filter may be provided as replacement filter information.

The second filter treats water typically slower than the first filter, and the buffer tank allows the first filter and the second filter to have varying treatment speeds. This enables the treatment speed of the second filter to be set at an appropriate speed regardless of the treatment speed of the first filter. As a result, the quality of treated water treated with second filter can be improved, and the degradation in the second filter can be delayed. The replacement filter unit may include a second filter pump that allows the water in the buffer tank to pass through the second filter.

The above information regarding a replacement filter unit, described below, may also be provided as replacement filter information. The replacement filter unit includes the first filter, the second filter, a first flow channel that allows the water treated with the first filter to flow to a point of use (e.g., a shower nozzle, a faucet) or a point-of-use storage tank (e.g., a tank that feeds water to a shower nozzle and a faucet), a second flow channel that allows the water treated with the first filter to flow to the buffer tank, a detection means that can detect the quality of the water before treatment flowing into the first filter or the water that has passed through the first filter, and a flow channel switching means that allows the water treated with the first filter to selectively flow in the first flow channel or the second flow channel in accordance with the detection result from the detection means. The water treated with the second filter is also provided to the point of use or the point-of-use storage tank.

In this structure, for example, if the result of the measurement of the water before treatment performed by an electric conductivity sensor falls within a range of predetermined reference values, and the quality of the water before treatment is determined as a predetermined value or more, then the water treated with the first filter flows directly to the point of use or the point-of-use storage tank via the first flow channel. The second filter may not be used, and the first filter treats water typically faster than the second filter. Thus, the point of use is easily fed with enough water. When, for example, the quality of water before treatment temporarily has a predetermined value or less, the water treated with the first filter is sent to the buffer tank during this time period. The water in the buffer tank is treated with the second filter. Thus, even if the quality of water before treatment decreases, the quality of the treated water can be maintained.

The quality of water before treatment may vary temporarily during, for example, the treatment of shower wastewater, kitchen wastewater, and toilet sewage.

Similarly, information regarding the following replacement filter units may also be provided as replacement filter information. One replacement filter unit includes a sludge filter that is located upstream of the first filter and removes sludge from the water before treatment. Another replacement filter unit includes such a sludge filter in place of the first filter. In such a case, the above information regarding multiple types of replacement filter units including various sludge filters further enhances the user convenience.

In addition, similarly, information regarding the following replacement filter units may also be provided as replacement filter information. One replacement filter unit includes a biological treatment filter that is located upstream of the first filter and treats the water before treatment using organisms. Another replacement filter unit includes such a biological treatment filter in place of the first filter. In such a case, the above information regarding multiple types of replacement filter units including various sludge filters further enhances the user convenience.

In the 21st aspect, the household water treatment apparatus may further include an additive container that contains one or more types of additive ingredients, an additive ingredient feed means that feeds the additive ingredients in the additive ingredient container to the treated water, and an additive ingredient control unit that controls the additive ingredient feed means in accordance with the water quality request. For example, in a mineral addition system including a water quality request reception unit that receives a water quality request from a user, these components enable hard water or soft water to be provided in accordance with the user preference, and allow water to be provided containing nutrients (mineral ingredients) corresponding to the user request. Furthermore, the addition of chlorine, hypochlorous acid, or the like for disinfection can extend the retention period during which water does not worsen.

In the 21st aspect, the household water treatment apparatus may further include a water quality request reception unit that receives a water quality request from a user, a mineral ingredient container that contains one or more types of mineral ingredients, a mineral ingredient feed means that feeds the mineral ingredients in the mineral ingredient container to the treated water, and a mineral ingredient control unit that controls the mineral ingredient feed means in accordance with the water quality request.

These components enable hard water or soft water to be provided in accordance with the preference of the user, and allow water to be provided containing nutrients (mineral ingredients) corresponding to the user request.

A 22nd aspect of the present invention is a water treatment system that treats water before treatment (various types of wastewater such as shower wastewater, toilet wastewater, laundry wastewater, cooking wastewater, dish washing wastewater, and lavatory wastewater) with at least one type of filter, and feeds the treated water to water outlets (various water outlets such as a shower head and a faucet).

The water before treatment is treated using the household water treatment apparatus in the 20th aspect or the 21st aspect, and the treated water is fed to the water outlets.

In the 22nd aspect, preferably, the water treatment system includes a main section for using treated water entered by a user to use treated water coming from the water outlets. The main section for using treated water includes, for example, at a position visible to the user, a display or a voice generator that shows or gives notice of the quality of the treated water being or to be fed by the household water treatment apparatus.

This notification allows the user to know the water conditions, and thus the user can use water without anxiety. Furthermore, different users have different preferences, and a user recognizes his or her own desired water quality. This quality is a criterion based on which the filter unit is replaced or improved.

In the 22nd aspect, preferably, the water treatment system includes a main section for using treated water entered by a user to use treated water coming from the water outlets. The main section for using treated water and the household water treatment apparatus can be freely connected to and detached from each other.

In the aforementioned aspect, because the main section for using treated water and the household water treatment apparatus are detachably connected to each other, for example, the household water treatment apparatus may be disconnected and the treated water can be used for other applications. Thus, the number of household water treatment apparatuses needed in each home may be freely determined. Furthermore, a household water treatment apparatus may be moved to the place where the user temporarily stays, and the household water treatment apparatus may be used there.

In the 22nd aspect, preferably, the water treatment system includes at least one connection tube containing a water-before-treatment pipe that sends the water before treatment from the main section for using treated water to the household water treatment apparatus, a treated water pipe that sends the treated water from the household water treatment apparatus to the body washing main section, and a communication line that connects the main section for using treated water to the household water treatment apparatus. One end of the connection tube can be connected to and detached from the main section for using treated water, whereas the other end of the connection tube can be connected to and detached from to the household water treatment apparatus. As a result, the main section for using treated water and the household water treatment apparatus can be connected to and detached.

In the aforementioned aspect, one connection tube contains the water-before-treatment pipe, the treated water pipe, and the communication line. The main section for using treated water and the household water treatment apparatus can be connected to each other by simply connecting one end and the other end of the connection tube respectively to the main section for using treated water and the household water treatment apparatus. This is effective in improving the user convenience.

Additionally, the one connection tube may contain a power cable together with or in place of the communication line. In this case, for example, with a household water treatment apparatus including a battery, when the other end of the connection tube is detachably connected to the household water treatment apparatus as described above, the main section for using treated water can be supplied with power from the battery of the household water treatment apparatus via the power cable in the connection tube. Thus, even if the main section for using treated water has no battery, a lamp and various pieces of electrical equipment in the main section for using treated water will serve. Conversely, if the main section for using treated water has a power source such as a battery, the household water treatment apparatus can operate without using the power in the household water treatment apparatus.

The main section for using treated water may also store operation method information for the household water treatment apparatus and data used for water type estimation. For example, a main section for using treated water may be installed in a desert region and shower wastewater may be discharged as water before treatment. Unlike other regions, if water before treatment contains a large amount of sand, depending on the particular circumstances, the operation method information includes information regarding the pump working speed (output), and the data used for water type estimation includes data indicating sand types and contents. For example, the data used for water type estimation may include historical wastewater data (e.g., the detection results of the water quality from an electric conductivity sensor, the detection results from an odor sensor, and their changes over time).

The operational information of the main section for using treated water may also be stored. For example, if a shower head is equipped with sensors such as a flow sensor, a water quality sensor, and an acceleration sensor, then the household water treatment apparatus or the main section for using treated water may store the time-series data from these sensors. Knowledge about the usage in a real environment is highly effective in developing shower heads.

The main section for using treated water may include sensors for water temperature and water quality and parts such as a dedicated pump, and store information regarding a recommended method for controlling the parts and the data used for water type estimation. For example, the main section for using treated water may be a main section for using treated water in a shower system including a scale, an image sensor, a thermograph, and a dedicated pump for outputting a fixed flow and a fixed water pressure from a shower head. When the household water treatment apparatus is, via connection using the connection tube, notified of information regarding the types of these sensors and actuators and their numbers, and of a way of using them, an appropriate parts and an appropriate operation method can be selected. For example, the shower head manufacturer may have recommended values about flow velocity and water pressure. If the pump of the household water treatment apparatus cannot achieve the values, a dedicated pump installed in the main section for using treated water can meet the requirements. In addition, the image sensor can output and store the form of a body in each entry into the shower. Checking a time-varying body form and comparing the form with the forms of others based on this information can contribute to an improvement in user health. Furthermore, a cold part of the body may be sensed using thermography, and the user may be notified of the sensed part. This notification allows the user to apply enough hot water to the cold part of the body, which can bring improved comfort to the user. In other cases, the control unit may be informed of a cold part, and the shower head may automatically pour hot water over the cold part.

The connection via the connection tube allows the stored operation method information and data used for water type estimation to be sent to the household water treatment apparatus. In some cases, the main section for using treated water may also wirelessly transmit the information to the household water treatment apparatus and the computer used by the user regardless of the presence or absence of the connection via the connection tube.

In this manner, the household water treatment apparatus can fit the particular situation associated with the main section for using treated water. This is highly effective in maintaining the function and the life of the filter and the pump.

Moreover, the main section for using treated water may transmit the operation method information and the data used for the water type estimation to the water treatment management system.

In this case, the information feed means of the water treatment management system is enabled to create and transmit the above various types of information based on the received information and data.

Furthermore, a household water treatment apparatus and a user terminal may transmit type identification information and function identification information regarding the in-service filter (filter unit) of the household water treatment apparatus, and type identification information and function identification information regarding the in-service pump to the water treatment management system. In addition, when the information regarding the place for a temporary stay is transmitted, the various types of information regarding the main section for using treated water can be received from the information feed means.

In this case, the user can change the configuration of the household water treatment apparatus including a filter and a pump to fit the place for a temporary stay before going to the place.

In the main section for using treated water, a connection part to which the connection tube is connected preferably has a common shape and specifications. More specifically, the connection part of this main section for using treated water as well as the connection parts of other main sections for using treated water preferably have the same shape and specifications. In addition, the connecting part at the end of the connection tube to connect to the main section for using treated water preferably fits the common connection part. This enables the user to use various main sections for using treated water via the connection channel containing a water pipe and a power cable or a communication line, which can enhance the user convenience.

The 23rd aspect of the present invention is a water treatment system that treats water before treatment (various types of wastewater such as shower wastewater, toilet wastewater, laundry wastewater, cooking wastewater, dish washing wastewater, and lavatory wastewater) with at least one type of filter, and feeds the treated water to water outlets (various water outlets such as a shower head and a faucet).

The water treatment system includes:

at least one treated water using room entered by a user to use treated water coming from the water outlets;

a locking means that locks the door of each treated water using room; and an unlocking information providing means that receives application-for-use information from the computer used by the user or an input device provided in the water treatment system, and sends unlocking information for unlocking the door of a predetermined treated water using room at least during the time period associated with the application-for-use information, to the corresponding locking mechanism.

This aspect allows a water treatment system located in a shared space to be used only by a particular user. More specifically, the system cannot be used unless the computer approves the application for use. For example, unregistered people cannot use water treatment systems without permission, but only registered people can use the water treatment systems. Thus, the cost of maintenance can be shared by registered individuals, and the system can charge for each use.

In the 23rd aspect, preferably, the water treatment system includes a usage information storage means that stores usage information regarding the treated water using room in each use of the treated water using room. The usage information is data containing at least the use time period and the amount of used water associated with the user.

In the aforementioned aspect, the usage for each user can be checked, and thus usage-based charging and calling a user attention to the usage are possible.

The household water treatment apparatus or the water treatment system in the 20th to 23rd aspects preferably includes a first pipe in which a first quality of water flows, a second pipe in which a second quality of water flows, and a conduit containing the first and second pipes. The second pipe is provided along the first pipe. The walls of the first and second pipes further include pipe parts formed of an elastic material such as rubber. The first and second pipes expand within the conduit when water flows in the pipes.

In the aforementioned aspect, the first and second pipes are put together within the conduit. The conduit itself has an unchanged size and shape regardless of whether water flows in the first and second pipes, and thus the user can more easily change a pipe.

A 24th aspect of the present invention is a water treatment apparatus management system which manages a household water treatment apparatus that is located at or near a place of water use, treats water before treatment with a filter unit including at least one filter and with a pump that sends water to the in-service filter, and feeds treated water to the place of water use.

The water treatment apparatus management system includes:

a filter information storage unit that stores information regarding the in-service filter unit used in the household water treatment apparatus; and an information feed means that transmits information regarding the operation method for the pump to the household water treatment apparatus based at least on the in-service filter unit information stored in the filter information storage unit.

In the aforementioned aspect, the information feed means transmits information regarding the operation method for the pump appropriate for delaying the degradation in the in-service filter based at least on the information regarding the in-service filter unit.

Each filter has allowable ranges of water pressures and amounts of water. The ranges include points in water pressure and an amount of water that lead to longer filter unit life. The points vary depending on the type of the filter unit, that is, the types and the combination of the individual filters forming the filter unit, and also depending on the size and the like. Each household water treatment apparatus has different places for use, different purposes for use, and different types of water before treatment. Thus, for example, even if two household water treatment apparatuses each include the same filter unit and use the same pump to pass the same output of water through the filter unit, different water pressures will be applied to the filter units. In this case, if the household water treatment apparatus includes, for example, a pressure sensor that detects the water pressure applied to the whole of or a part of the filter unit, then information regarding the operation method is transmitted so that the detected water pressure will fall within the predetermined range.

Thus, in an example, the water treatment apparatus management system may store data regarding a range of an appropriate water pressure or a range of an appropriate amount of water for each of the individual types of filter unit in the memory device, and transmit the information regarding the operation method based on the data.

The aforementioned aspects require no huge-scale construction, copes with a sudden sharp increase or decrease in population, and enables wastewater treatment and feeding of water for use even in areas with limited water resources.

REFERENCE SIGNS LIST 1 water before treatment inlet
2 treated water outlet
10 filter unit
11 first filter
12 second filter
20 pump
30 control unit
41 first three-way valve
42 second three-way valve
43 third three-way valve
44 fourth three-way valve
45 fifth three-way valve
57 reference water flow channel
61 pressure sensor
62 flow sensor
63 electric conductivity sensor
64 odor sensor
100 filter information storage unit
110 in-service filter information
120 replacement filter information
130 water supply place information

What is claimed is:

1. A water treatment apparatus management system which manages a household water treatment apparatus that is located at or near a place of water use and that treats water before treatment with at least one type of filter to produce treated water to be fed to the place of water use, the system comprising:

an information receiver that receives, from the household water treatment apparatus, information regarding performance change of an in-service filter being actually used in the household water treatment apparatus;

a memory device that stores reference information of performance change, the reference information of performance change indicating how performance of a same or a same type of filter as the in-service filter changes by each of multiple types of water before treatment; and a control unit that estimates a water type of the water before treatment not only based on the information regarding performance change received from the household water treatment apparatus but based on the information regarding performance change received from the household water treatment apparatus and also the reference information of performance change stored in the memory device, wherein the multiple types of water before treatment include at least one of water which has been used at the place of water use and water taken from natural water including river water, swamp water, lake water, seawater, and rainwater, wherein the place of water use includes at least one of: a place with a body washer including a shower room, a bathroom, a place to wash hands, a place to wash feet, and a place for washing animals; a place with a clothing washer including a washing machine and a washing appliance; a place with a excrement disposer including a toilet; and a place with a tool or machine to wash foods and dishes including a kitchen, and wherein the control unit determines which of the reference information of performance change of the same or the same type of filter as the in-service filter for the multiple types of water before treatment is close to the information regarding performance change received from the household water treatment apparatus and estimates the water type based on that determination.

2. A water treatment apparatus management system which manages a household water treatment apparatus that is located at or near a place of water use and that treats water before treatment with a filter unit to produce treated water to be fed to the place of water use, the system comprising:

an information receiver that receives, from the household water treatment apparatus, information regarding performance change of an in-service filter unit being actually used in the household water treatment apparatus;

a memory device that stores reference information of performance change, the reference information of performance change indicating how performance of a same or a same type of filter unit as the in-service filter unit changes by each of multiple types of water before treatment; and a control unit that estimates a water type of the water before treatment, not only based on the information regarding performance change received from the household water treatment apparatus but on the information regarding performance change received from the household water treatment apparatus and also the reference information of performance change stored in the memory device, wherein the multiple types of water before treatment include at least one of water used at the place of water use and water taken from natural water including river water, swamp water, lake water, seawater, and rainwater, wherein the place of water use includes at least one of: a place with a body washer including a shower room, a bathroom, a place to wash hands, a place to wash feet, and a place for washing animals; a place with a clothing washer including a washing machine and a washing appliance; a place with a excrement disposer including a toilet; and a place with a tool or machine to wash foods and dishes including a kitchen, and wherein the control unit determines which of the reference information of performance change of the same or the same type of filter unit as the in-service filter unit for each of the multiple types of water before treatment is close to the information regarding performance change received from the household water treatment apparatus and estimates the water type based on that determination.

3. The water treatment apparatus management system according to claim 1, wherein the memory device stores replacement filter information about a replacement filter or a replacement filter unit with which the filter in service can be replaced, the replacement filter information includes reference information of performance change of at least one replacement filter or a replacement filter unit for each of multiple types of water before treatment, and the control unit refers to at least the replacement filter information, and if any replacement filter or replacement filter unit is capable of improving the performance change for the water type estimated in the control unit compared with the filter in service, the control unit transmits filter replacement information including information about the replacement filter or the replacement filter unit to the household water treatment apparatus or a computer used by a user.

4. The water treatment apparatus management system according to claim 3, wherein the memory device stores replacement filter information about a replacement filter or a replacement filter unit with which the filter unit in service can be replaced, the replacement filter information includes reference information of performance change of at least one replacement filter or a replacement filter unit for each of multiple types of water before treatment, and the control unit refers to at least the replacement filter information, and if any replacement filter or replacement filter unit is capable of improving the performance change for the water type estimated in the control unit compared with the filter unit in service, the control unit transmits filter replacement information including information about the replacement filter or the replacement filter unit to the household water treatment apparatus or a computer used by a user.

5. The water treatment apparatus management system according to claim 1, wherein the control unit transmits at least one of operation method information appropriate for the water type estimated in the control unit to the household water treatment apparatus or a computer used by a user and maintenance information corresponding to the water type estimated in the control unit to the household water treatment apparatus or the computer used by the user.

6. The water treatment apparatus management system according to claim 3, further comprising:

the control unit accumulates at least one of information regarding performance change of an in-service filter being actually used in the household water treatment apparatus and information regarding performance change of the in-service filter unit, and also the water type estimated in the control unit, and uses the accumulated information to create at least one of reference information of performance change, in-service filter information, in-service filter unit information, and replacement filter information.

7. A household water treatment apparatus comprising:
a water before treatment inlet;
a filter unit or a filter through which water before treatment coming from the water before treatment inlet passes;
a pump that is located upstream or downstream of the filter unit or the filter and that brings the water before treatment into the filter unit or the filter;
a treated water outlet that allows treated water treated by passing through the filter unit or the filter to go out through the treated water outlet; and
a control unit that receives filter replacement information from the water treatment apparatus management system according to claim 3.

8. A household water treatment apparatus comprising:
a water before treatment inlet;
a filter unit or a filter through which water before treatment coming from the water before treatment inlet passes;
a pump that is located upstream or downstream of the filter unit or the filter and that brings the water before treatment into the filter unit or the filter;
a treated water outlet that allows treated water treated by passing through the filter unit or the filter to go out through the treated water outlet; and
a control unit that controls at least the pump,
wherein the control unit controls the pump based on the operation method information from the water treatment apparatus management system according to claim 5.

9. The water treatment apparatus management system according to claim 1, wherein
the memory device has sanitation control information that is information for controlling a sanitary condition in the household water treatment apparatus, and
the control unit transmits the sanitation control information to the household water treatment apparatus.

10. The water treatment apparatus management system according to claim 1, wherein
the control unit is configured to obtain a detection result from at least one of GPS included in the household water treatment apparatus, sound sensor that detects sound inside or outside the household water treatment apparatus, odor sensor that detects odor outside the household water treatment apparatus, vibration sensor that detects vibration inside or outside the household water treatment apparatus, and temperature sensor that detects temperature inside or outside the household water treatment apparatus.

11. The water treatment apparatus management system according to claim 1, further comprising:
the household water treatment apparatus; and
a water passage through which the water having been used at the place of water use flows into the household water treatment apparatus;
wherein the at least one type of filter of the household water treatment apparatus treats the water having been used at the place of water use which flows into the household water treatment apparatus through the water passage.

12. The water treatment apparatus management system according to claim 2, further comprising:
the household water treatment apparatus; and
a water passage through which the water having been used at the place of water use flows into the household water treatment apparatus;
wherein the filter unit of the household water treatment apparatus treats the water having been used at the place of water use which flows into the household water treatment apparatus through the water passage.

\* \* \* \* \*